(12) United States Patent
Kight et al.

(10) Patent No.: US 12,400,261 B2
(45) Date of Patent: Aug. 26, 2025

(54) SYSTEMS AND METHODS FOR MOBILE DIGITAL CURRENCY FUTURE EXCHANGE

(71) Applicant: HDR SG PTE. LTD., Singapore (SG)

(72) Inventors: Lawson Kight, San Francisco, CA (US); Brandon Schlenker, San Francisco, CA (US); Victor Levasseur, Alameda, CA (US); Jinny Wong, San Francisco, CA (US); Joshua Philippe, San Francisco, CA (US); Michael Curry, Oakland, CA (US); Bradley Cruce, San Francisco, CA (US)

(73) Assignee: HDR SG PTE. LTD., Singapore (SG)

( * ) Notice: Subject to any disclaimer, the term of this patent is extended or adjusted under 35 U.S.C. 154(b) by 0 days.

(21) Appl. No.: 17/013,170

(22) Filed: Sep. 4, 2020

(65) Prior Publication Data
US 2021/0065295 A1 Mar. 4, 2021

Related U.S. Application Data

(60) Provisional application No. 63/054,172, filed on Jul. 20, 2020, provisional application No. 62/895,573, filed on Sep. 4, 2019.

(51) Int. Cl.
*G06Q 40/04* (2012.01)
*G06Q 20/06* (2012.01)
*G06Q 20/36* (2012.01)

(52) U.S. Cl.
CPC ........... *G06Q 40/04* (2013.01); *G06Q 20/065* (2013.01); *G06Q 20/3674* (2013.01)

(58) Field of Classification Search
CPC ........ G06Q 40/04; G06Q 20/36; G06Q 20/06; G06Q 20/065; G06Q 20/3674
USPC ........................................................ 705/37
See application file for complete search history.

(56) References Cited

U.S. PATENT DOCUMENTS

| | | | |
|---|---|---|---|
| 7,464,052 B1 | 12/2008 | Coppola, III | |
| 2002/0116317 A1* | 8/2002 | May | G06Q 30/08 705/37 |
| 2003/0236738 A1 | 12/2003 | Lange et al. | |
| 2004/0162773 A1 | 8/2004 | Del Rey et al. | |

(Continued)

FOREIGN PATENT DOCUMENTS

| | | |
|---|---|---|
| AU | 2014277864 | 1/2015 |
| CN | 104380330 A | 2/2015 |

(Continued)

OTHER PUBLICATIONS

ISA; International Search Report and Written Opinion dated Apr. 16, 2021 in Application No. PCT/IB2020/000711.

(Continued)

*Primary Examiner* — Bennett M Sigmond
*Assistant Examiner* — Michael J Warden
(74) *Attorney, Agent, or Firm* — SNELL & WILMER L.L.P.

(57) ABSTRACT

A system for a mobile digital currency exchange is disclosed. The system may receive a sign-in data. The system may generate an authentication request based on the sign-in data. The system may receive an authentication data. The system may display a trading interface comprising a portfolio drawer based on the authentication data, wherein the portfolio drawer is configured to display an instrument detail and an account summary.

14 Claims, 69 Drawing Sheets

(56) References Cited

U.S. PATENT DOCUMENTS

| | | | | |
|---|---|---|---|---|
| 2005/0240511 | A1* | 10/2005 | Chadwick | G06Q 40/04 705/37 |
| 2006/0059064 | A1* | 3/2006 | Glinberg | G06Q 40/00 705/35 |
| 2014/0108293 | A1* | 4/2014 | Barrett | G06Q 40/06 705/36 R |
| 2015/0220928 | A1 | 8/2015 | Allen | |
| 2015/0356555 | A1 | 12/2015 | Pennanen | |
| 2016/0155200 | A1 | 6/2016 | Basu et al. | |
| 2017/0076392 | A1 | 3/2017 | Sujir | |
| 2018/0139569 | A1 | 5/2018 | Padgett et al. | |
| 2019/0012737 | A1 | 1/2019 | Ohanissian | |

FOREIGN PATENT DOCUMENTS

| | | |
|---|---|---|
| CN | 108537662 A | 9/2018 |
| CN | 109240910 A | 1/2019 |
| CN | 109584073 A | 4/2019 |
| JP | 2220993 A | 8/1994 |
| JP | H06236383 A | 8/1994 |
| JP | 2006331171 | 12/2006 |
| JP | 4713694 B1 | 6/2011 |
| JP | 2015064681 A | 4/2015 |
| JP | 2017138771 A | 8/2017 |
| KR | 20040010036 A | 1/2004 |
| KR | 10-0717590 | 5/2007 |
| KR | 10-2013-0123339 | 11/2013 |
| KR | 10-2019-0099880 | 8/2019 |
| RU | 2018128717 A | 8/2019 |
| TW | I364722 B | 5/2012 |
| WO | 2012046304 | 4/2012 |

OTHER PUBLICATIONS

Office Action dated Mar. 6, 2023 in Australian Patent Application No. 2020343476.

Office Action dated Mar. 3, 2023 in Canadian Patent Application No. 3,152,657.

Office Action dated May 8, 2023 in Japanese Patent Application No. 2022-514513.

Office Action dated Apr. 20, 2023 in Russia Patent Application No. 2022108497.

Office Action dated Oct. 20, 2023 in Australian Patent Application No. 2020343476.

Office Action dated Dec. 12, 2023 in Russia Patent Application No. 2022108497.

The Wayback Machine, How to Calculate the Marginality of a Project in a Marketing Agency?, Project Management System Blog, Jul. 4, 2017. https://web.archive.org/web/20180806170113/https://worksection.com/blog/profit-margin.html.

ALL ETF, Our Channel in Telegram, Other Types of Trading Order, http://alletf.ru/articles/tipy_torgovykh_prikazov/prochie_tipy_torgovykh_prikazov/.

Decision to Grant a Patent dated Oct. 31, 2023 in Japanese Patent Application No. 2022-514690.

Notice of Allowance dated Oct. 30, 2023 in Japanese Patent Application No. 2022-514690.

China National Intellectual Peroperty Administration, Second Office Action Received in CN Application No. 202080073776X, dated Jan. 25, 2025.

Russian Patent Office, Office Action Received in Application No. 2022108497, dated Dec. 12, 2022.

European Patent Office, Extended European Search Report Received in Application No. 20860370.4, dated Aug. 24, 2023.

Chinese Patent Office, Third Office Action Received in Application No. 202080073776X, dated May 31, 2025.

\* cited by examiner

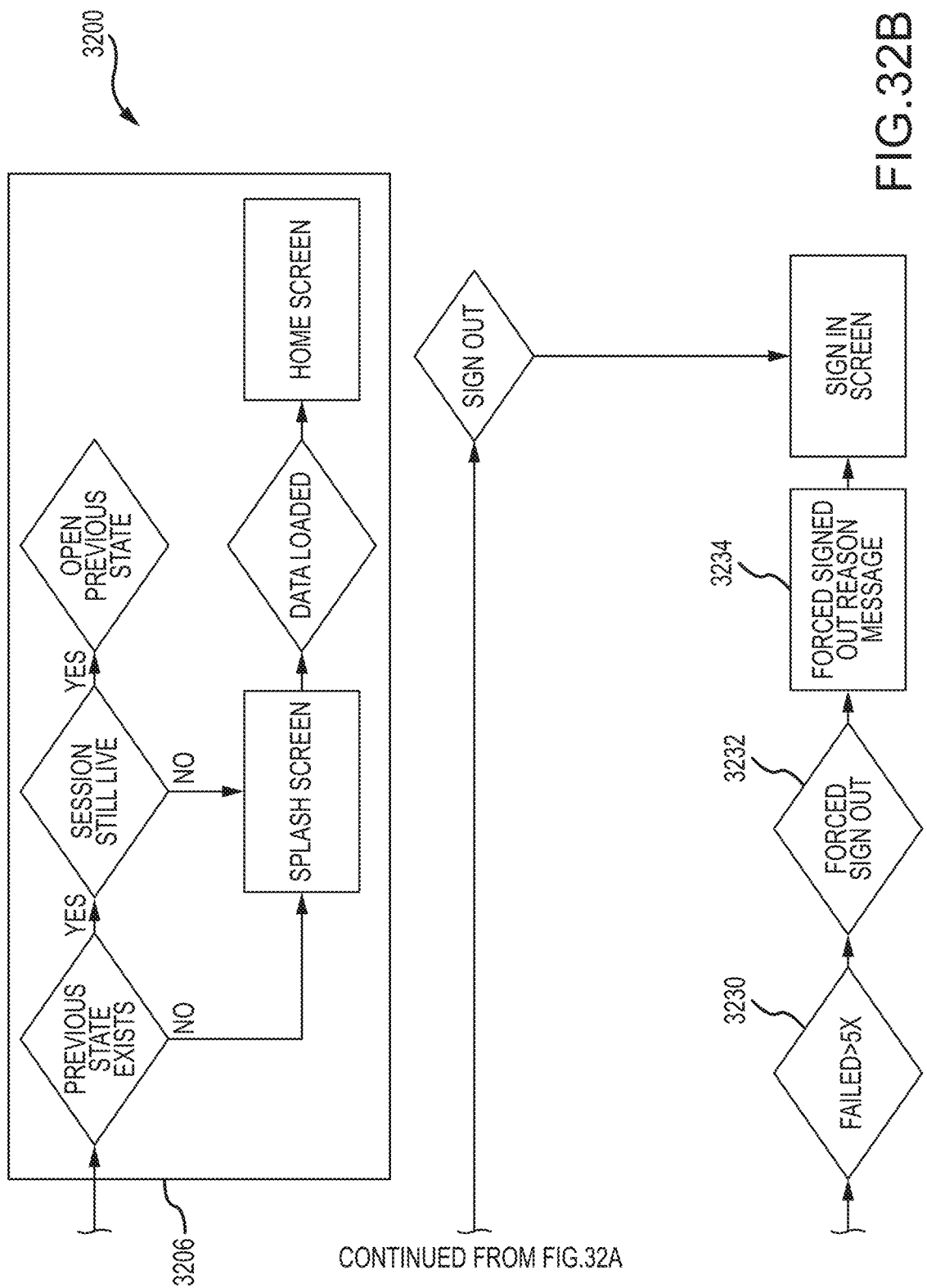

SYSTEMS AND METHODS FOR MOBILE DIGITAL CURRENCY FUTURE EXCHANGE

CROSS REFERENCE TO RELATED APPLICATIONS

This application is a non-provisional of, and claims priority to and benefit of, U.S. Provisional Application No. 62/895,573 filed on Sep. 4, 2019 and entitled "SYSTEMS AND METHODS FOR MOBILE DIGITAL CURRENCY FUTURE EXCHANGE." This application is also a non-provisional of, and claims priority to and the benefit of, U.S. Provisional Application No. 63/054,172 filed on Jul. 20, 2020 and entitled "SYSTEMS AND METHODS FOR MOBILE DIGITAL CURRENCY FUTURE EXCHANGE." Each of the foregoing applications is hereby incorporated by reference in its entirety for all purposes (except for any subject matter disclaimers or disavowals, and except for any conflict with the present disclosure, in which case the express disclosure herein shall control).

TECHNICAL FIELD

The present disclosure generally relates to mobile devices, and in particular to systems and methods for mobile and automated command and control of exchange trading platforms and applications.

BACKGROUND

Traditionally, exchange and electronic trading platforms are connected via private networks and dedicated terminals. Such platforms tend to be limited in capability and may only be accessible during market hours or may otherwise be restricted in geographic or temporal availability. Additionally, options for viewing positions and executing orders may be limited. Accordingly, improved mobile trading platforms, for example platforms for trading cryptocurrency derivatives, remain desirable.

SUMMARY

In various embodiments, systems, methods, and articles of manufacture (collectively, the "system") for mobile digital currency exchanges are disclosed. In various embodiments, the system may receive a sign-in data. The system may generate an authentication request based on the sign-in data. The system may receive an authentication data. The system may display a trading interface comprising a portfolio drawer based on the authentication data, wherein the portfolio drawer is configured to display an instrument detail and an account summary.

In various embodiments, may receive an instrument details selection. The system may start an order flow process in response to the instrument details selection. The system may receive an order flow input. The system may generate a platform command set based on the order flow input. The system may control a trading platform based on the platform command set. In various embodiments, the order flow input comprises at least one of a buy order, a sell order, an order modification, a leverage setting, or a close position command. In various embodiments, the system may start an anonymous mode process in response to the sign-in data. In various embodiments, the system may determine a user identity based on the authentication data, wherein the authentication data includes biometric data.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 32B illustrates a biometric authentication process of a mobile digital currency exchange system, in accordance with various embodiments.

DETAILED DESCRIPTION

Figure 1:
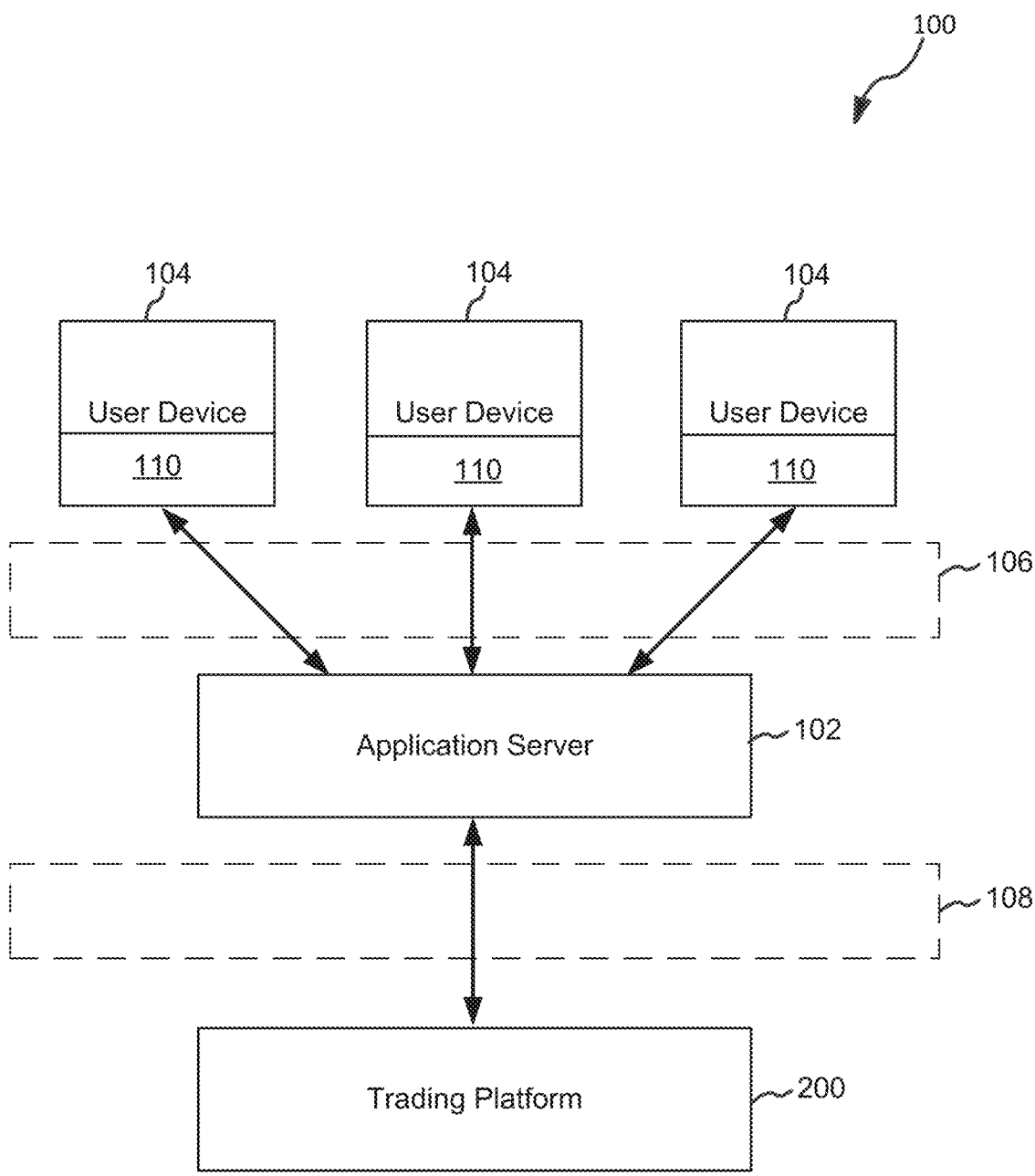
FIG. 1 is a block diagram illustrating various system components of a mobile digital currency exchange system, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for mobile device application design and implementation, as well as conventional mobile device communications techniques, interface elements, and so forth, and/or the like, may not be described in detail herein. Furthermore, the connecting lines shown in various figures contained herein are intended to represent exemplary functional relationships and/or physical or communicative couplings between various elements. It should be noted that many alternative or additional functional relationships or communicative connections may be present in a practical system or related methods of use, for example a mobile trading application for cryptocurrency derivatives.

Various shortcomings of mobile device applications can be addressed by utilizing mobile device applications and/or related cloud-based systems configured in accordance with principles of the present disclosure. For example, the present system improves upon existing technology by optimizing displays into modes which carry out platform activities including setting leverage, by providing a single assembly flow for any order type, monitoring each of a balance, an order set, and positions associated with an account, and by visualizing risk levels associated with a specific position.

In various exemplary embodiments, the system may provide a greater level of sophistication and/or control for digital currency exchange systems. For example, data may be gathered from multiple data sources comprising multiple dissimilar rows and columns and may be distributed across multiple platforms. While prior art systems typically include the technical problem of limited availability, multiple user interactions to execute an order or view displays, obfuscating position specific risk and/or the like, the current system provides a technical solution by tending to enable a single flow irrespective or order type and by visualizing position specific risk levels. In this regard, the system may enable accelerated trading via an integrated order flow and optimized data presentation. As such, the system may eliminate or reduce information gaps, reduce re-entry of data, and reduce record duplication, and reduce development time. The system may also reduce the cost of development or system processing time for data entry, reduce network utilization, and/or reduce data storage overhead. The system may increase data reliability and/or accuracy by enabling comparison of data between environments at an increased frequency. The system may also reduce redundant or duplicate comparison tasks, thereby reducing a demand for system resources. The system may simplify data acquisition and enhance the user experience by decreasing the number of user interactions (e.g., for an order within the order flow, all options to assemble all supported order types are presented to quickly view full details and modify only the options necessary therefore the user does not need to switch order types and reset previous selections). Moreover, benefits of the present disclosure may apply to any suitable electronic exchange or trading platform.

Processes disclosed herein improve the functioning of the computer. In various s embodiments, order processing speeds may be accelerated via a reduced interaction set enabled by a single inline order flow. The system may further reduce inputs by enabling a universally accessible portfolio drawer thereby connecting order functionality with the context of a data display. In various embodiments, the system may reduce graphics processing overhead by tending to reduce the need for multiple scrolls and clicks to access the data that is most frequently viewed. For example, the system may display a standardized data set including balances and market positions on sign-in. Similarly, the process increases the reliability and speed of data presentation by enabling direct comparison of real time data between environments on the basis of metadata elements. The system may automatically update its context to help provide information about a current position size and contract specific uPnL. The system increases the reliability and speed of analysis by enabling a real-time view of positions and margin levels across asset classes. For example, the system may enable position modification actions in a single click with buy, sell, close position, close order, and close stops shown in context of a contract display. Thus, the system may tend to enable context based prediction of user inputs and further accelerate order flows. In this regard, by transmitting, storing, and/or accessing data using the processes described herein, the informational utility of the data is improved, and errors are reduced. Such improvements may also increase the efficiency of the network by reducing a portion of duplicated effort as additional data sources are identified for comparison.

In various embodiments, and with reference now to FIG. 1, a system 100 may comprise an application server 102, a user device 104, and a trading platform 200. Any of these components may be outsourced and/or be in communication with the data comparator application server 102 and/or trading platform 200 via a network such as, for example a first network 106 and a second network 108.

System 100 may be computer-based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the application server 102 and/or trading platform 202 may be configured as a central network element or hub to access various systems, engines, and components of system 100. The application server 102 may comprise a network (e.g., network 106), a computer-based system, and/or software components configured to provide an access point to various systems, engines, and components of system 100. The application server 102 may be in operative and/or electronic communication with user devices 104 via the first network 106 and the trading platform 200 via the second network 108. In this regard, the application server 102 may allow communication from the user devices 104 to systems, engines, and components of system 100 (such as, for example, trading platform 202). In various embodiments, the application server 102 may receive commands and/or metadata from the user devices 104 and may pass replies to the user devices 104.

In various embodiments, application server 102 may include one or more computing devices described above, rack mounted servers, and/or virtual machines providing load balancing, application services, web services, data query services, data transfer services, reverse proxy services, or otherwise facilitating the delivery and receipt of data across networks (106, 108).

In various embodiments, a user device 104 may comprise software and/or hardware in communication with the system 100 via a network (e.g. network 106) comprising hardware and/or software configured to allow a user, and/or the like, access to the application server 102. The user device may comprise any suitable device that is configured to allow a user to communicate with a network and the system 100. The user device may include, for example, a personal computer, personal digital assistant, cellular phone, kiosk, and/or the like and may allow a user to transmit comparison requests to the system 100. In various embodiments, the user device 104 described herein may run a web application or native application to communicate with application server 102. A native application 110 may be installed on the user device 104 via download, physical media, or an app store, for example. The native application 110 may utilize the development code base provided for use with the operating system and capable of performing system calls to manipulate the stored and displayed data on the user device 104 and communicates with application server 102. A web application may be web browser compatible and written specifically to run on a web browser. The web application may thus be a browser-based application that operates in conjunction with application server 102.

In various embodiments, the native application 110 running on the user device 104 may be in communication with the application server 102 to support real-time updates. For example, data pertaining to the trading platform 200 may synchronize across the various user devices 104 used by any number of users interacting with the application server 102 and/or trading platform 200. In this regard, the application server 102 may serve data from trading platform 200 to each of the user devices 104 and may serve commands from the user devices 104 to the trading platform 200. In various embodiments, application server 102 may apply access permissions to restrict the data transmitted between the networks (106, 108) and/or the various components of system 100. Users may be authenticated on the native application 110, for example, via a user name, password, dual factor authentication, private cryptographic key, one-time password, security question, biometrics, or other suitable authentication techniques know to those skilled in the art.

In various embodiments a trading platform 200 in a digital currency future exchange system (e.g., system 100) is disclosed. Trading platform 200 may include an API interface, an order book, an order processing engine, a leverage engine, a matching engine, and/or the like.

Figure 2:
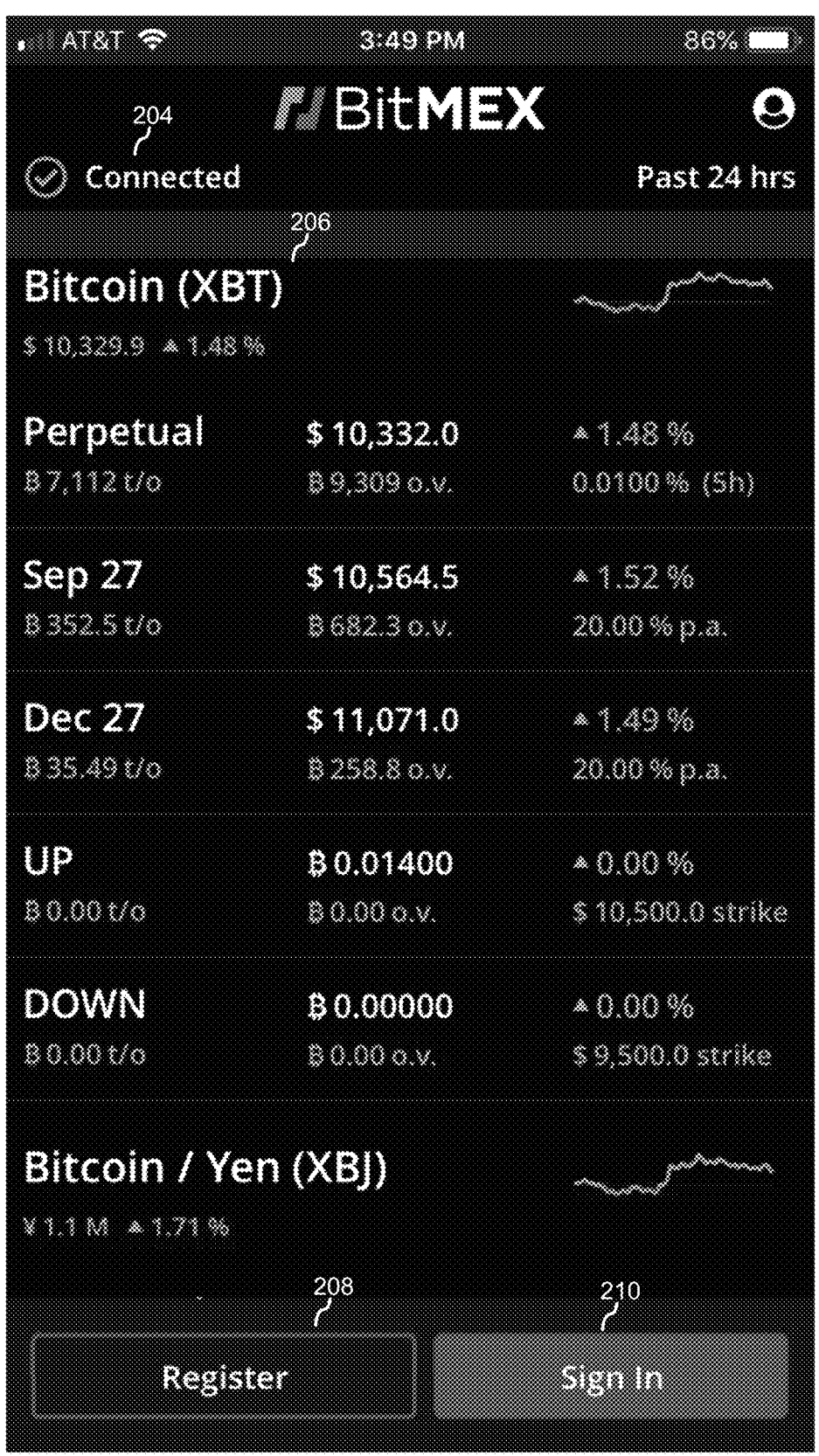
FIG. 2 illustrates a launch interface of a mobile digital currency exchange system, in accordance with various embodiments.

With additional reference to FIG. 2, a launch interface 202 of platform 200 is illustrated in accordance with various embodiments. System 100 may display the launch interface 202 in response to executing via the user device 104 the native application 110. In various embodiments, the system may determine a connection status 204 between the trading platform 200 and the user device 104 and display a connection status indicator via the launch interface 202. The system may display one or more details of market data 206 such as, for example, a currency price, a currency pair, a derivatives price, an index price, and/or the like. The launch interface 202 may be configured to receive one or more inputs from the user device 104 such as a register action and a sign-in action. For example, the system may receive the register action from the user device 104 in response to sensing a user interaction with the register button 208 and may receive the sign-in action from the user device 104 in response to a user interaction with the sign-in button 210. In various embodiments, launch interface 202 may be configured to enable interactions with the elements of market data 206. In response to determining an interaction with an element of the market data, the system may generate a market detail request associated with the element.

Figure 3:
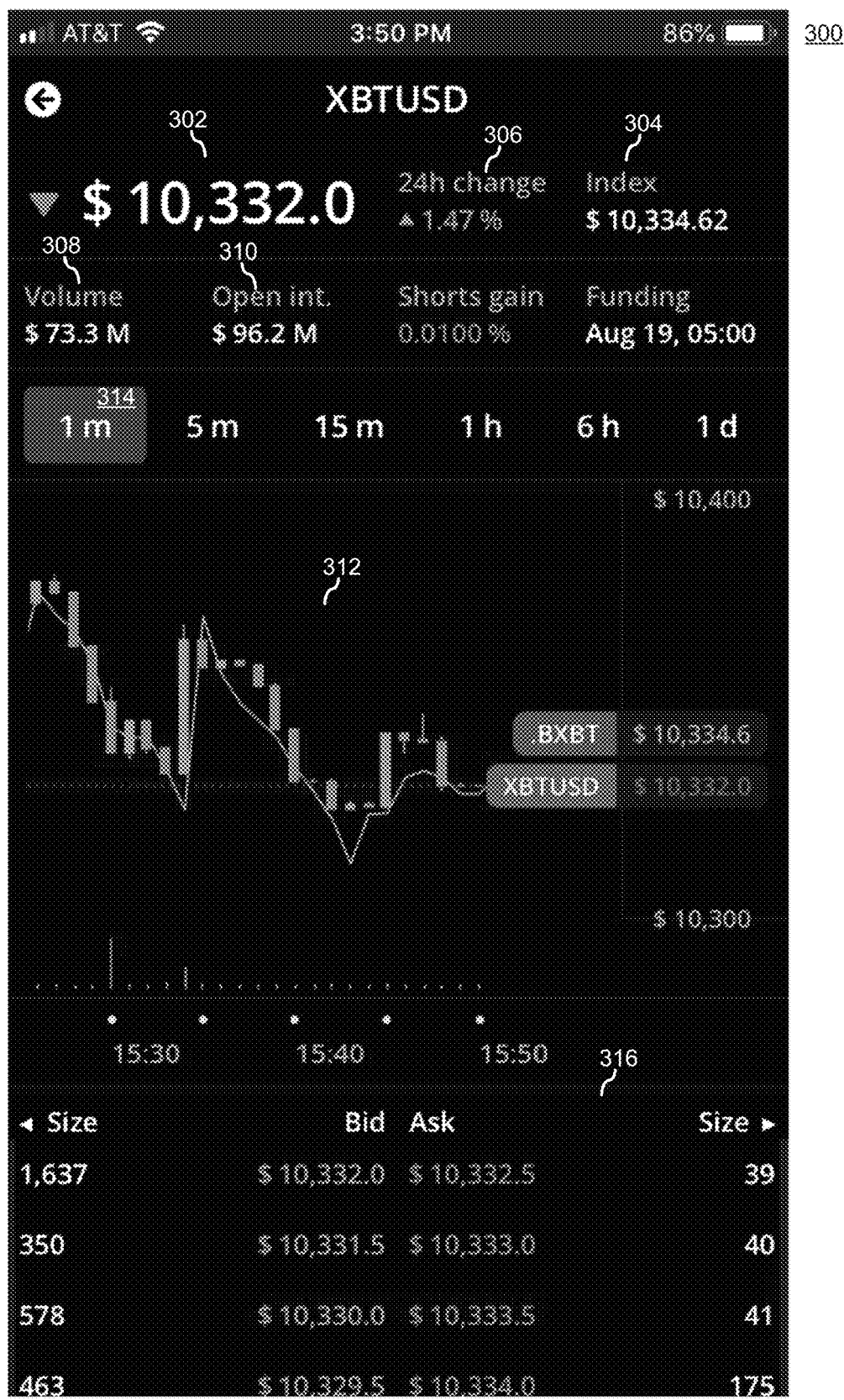
FIG. 3 illustrates a currency pair display of a mobile digital currency exchange system, in accordance with various embodiments.

For example, the system may register an interaction with the "Bitcoin (XBT)" market data 206 and, in response, may generate (e.g., via the native application) a Bitcoin (XBT)" market data detail request which may be received by the trading platform 200. In response to receiving the market data detail request, the system may display expanded market details associated with the market detail request. For example, the system may display a currency pair display as illustrated in FIG. 3. With additional reference to FIG. 3, currency pair display 300 may be associated with the "Bitcoin (XBT)" market data and displayed in response to receiving the associated market detail request. The currency pair display 300 may include various market details associated with the currency pair such as, for example, a current price 302, an index price 304, a 24 hour % change in price 306, an exchange volume 308, an open instrument value 310, and/or the like. In various embodiments, the currency pair display 300 may include a real-time graphical display of the market (i.e., market graph 312). In various embodiments, the market graph 312 may be a candlestick chart and may be selectable across various time intervals. Currency pair display 300 may be configured to receive market graph time interval inputs via radio buttons 314. In various embodiments, the currency pair display 300 may include order book data 316.

Figure 4:
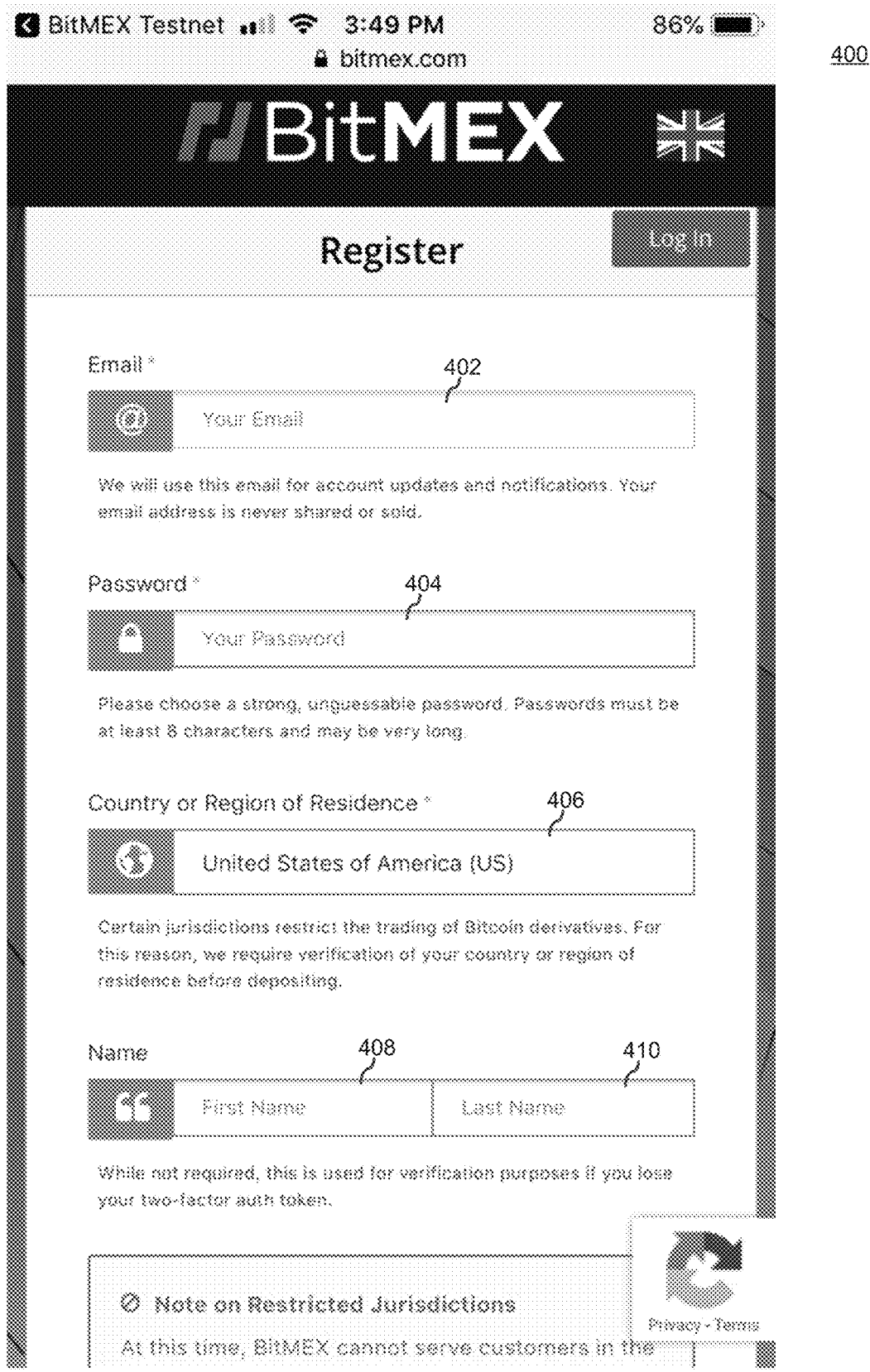
FIG. 4 illustrates a registration interface of a mobile digital currency exchange system, in accordance with various embodiments.

In various embodiments and with additional reference to FIG. 4 a registration interface 400 of system 100 is illustrated in accordance with various embodiments. The system may display the registration interface 400 in response to the register action. The registration interface 400 may be configured to receive one or more elements of registration data which may be associated by the system with a user profile and/or the like. In various embodiments the system may be configured to receive an email address 402, a password 404, a country or region 405, a first name 480, a last name 410, biometric information (e.g., fingerprint, faceprint, voice sample, iris image, etc.), device fingerprint (e.g., metadata associated with the user device 104 such as, for example, mac address, operating system data, network information, version information, etc.), and/or the like. In response to receiving the registration data the system may generate a user account and associate the registration data therewith as account information. In various embodiments, the system may generate an authentication token and associate the authentication token with the user account. In this regard, the system may support token authentication such as two-factor authentication and/or the like.

Figure 5A:
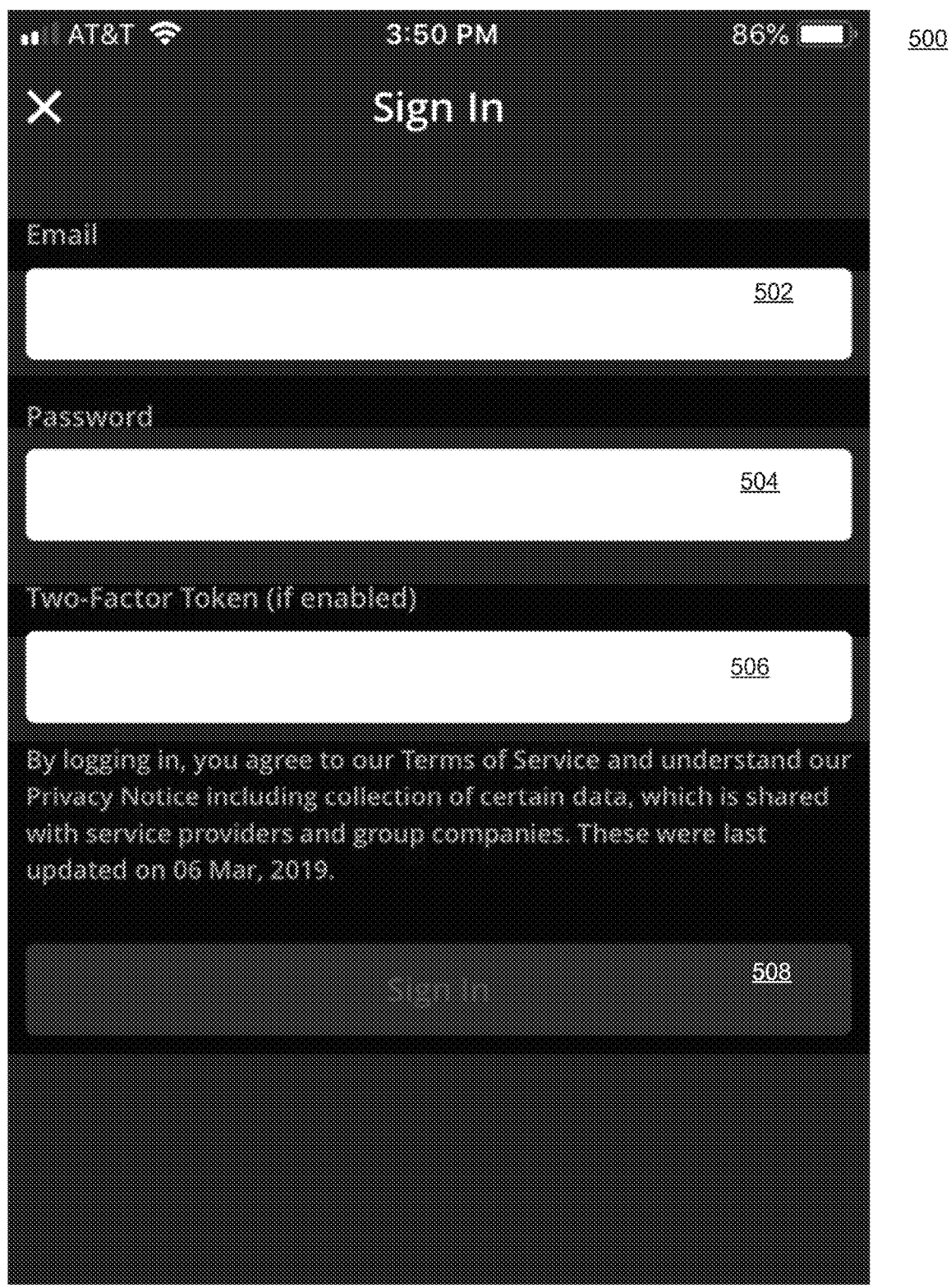
FIG. 5A illustrates a sign-in interface of a mobile digital currency exchange system, in accordance with various embodiments.

In various embodiments and with additional reference to FIG. 5A, a sign-in interface 500 of system 100 is illustrated. The sign-in interface 500 may be configured to receive sign-in data. For example, the system may receive an email address 502, a password 504, and a two-factor token 506 via the sign-in interface 500. In various embodiments, the system may generate a sign-in request via the user device 104 in response to an interaction with the sign in button 508. The sign in request may comprise the sign-in data which may be compared to the account information as part of an authentication process. In various embodiments, the system may generate an authentication request based on the sign-in data.

Figure 5B:
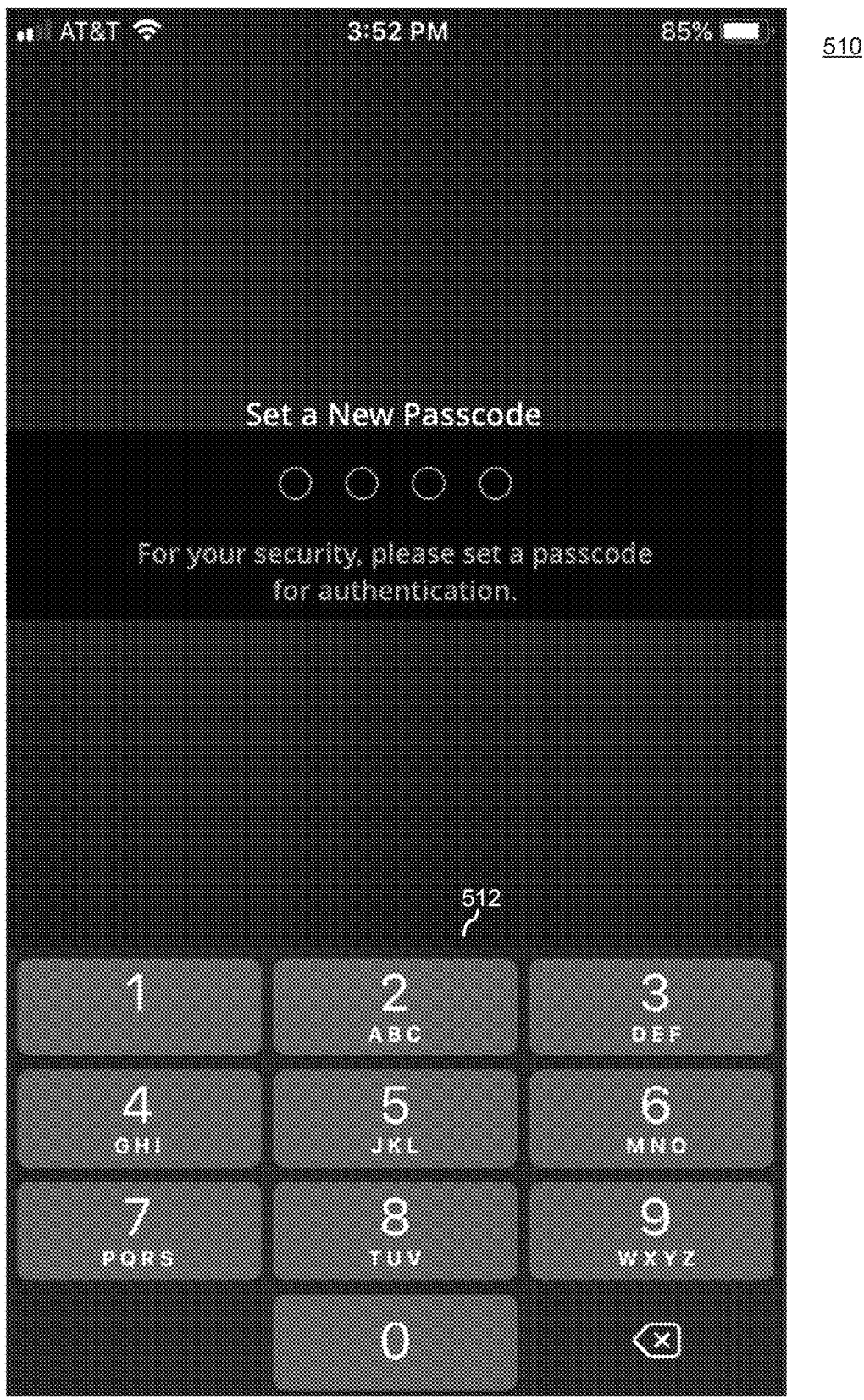
FIG. 5B illustrates an authentication interface of a mobile digital currency exchange system, in accordance with various embodiments.
Figure 5C:
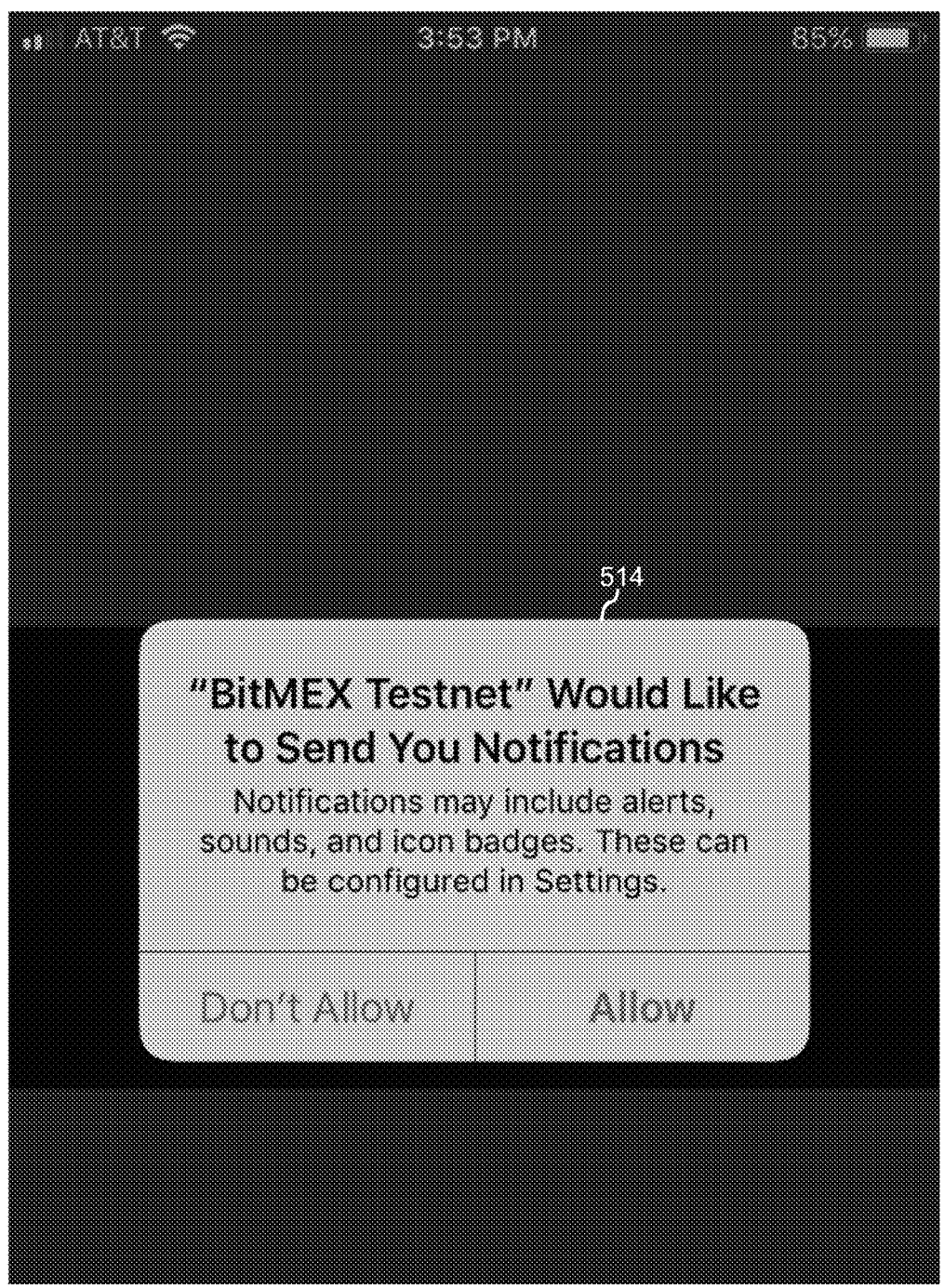
FIG. 5C illustrates a push notification prompt of a mobile digital currency exchange system, in accordance with various embodiments.

In various embodiments and with additional reference to FIG. 5B, an authentication interface 510 of system 100 is illustrated. The system may display the authentication interface 510 in response to the authentication request. The authentication interface 510 may include a prompt to set or enter authentication data such as, for example, a numeric passcode, a touch pattern, a biometric data, and/or the like. In various embodiments, authentication interface 510 may be configured to receive the authentication data which may be associated with the user data as account information. For example, the authentication interface 510 may be configured to receive a numeric passcode via numeric keypad 512. The system may receive the authentication data with the sign-in data and compare the authentication data and the sign-in data with the account information to enable access to the various systems, features, and engines of the trading platform 200. With brief additional reference to FIG. 5C, the system may display a push notification prompt 514 in response to receiving the authentication data. The system may enable push notifications from the trading platform 200 to the user device 104 in response to receiving an 'allow' interaction with the push notification prompt 514.

Figure 6:
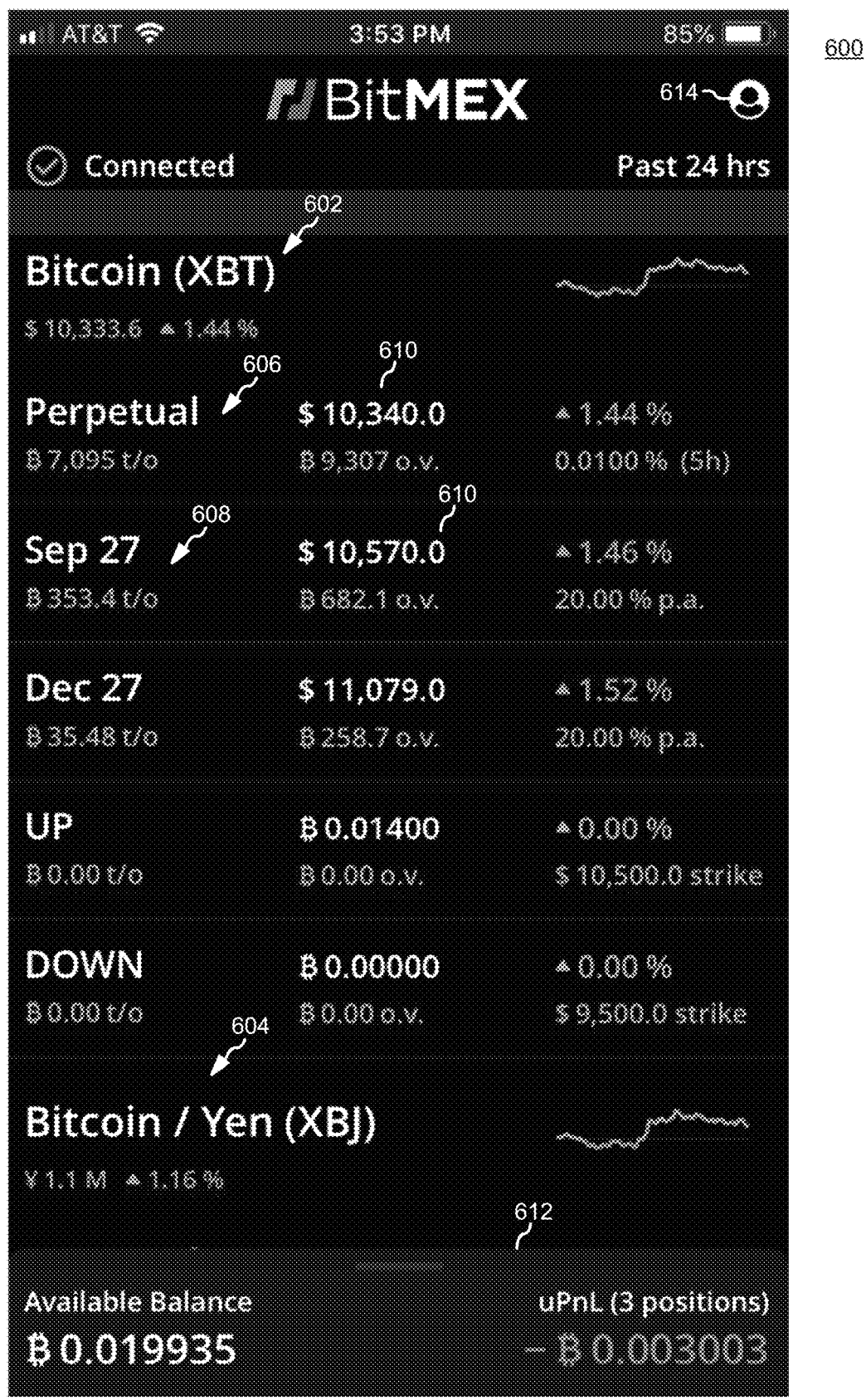
FIG. 6 illustrates a market/portfolio interface of a mobile digital currency exchange system, in accordance with various embodiments.

In various embodiments and in response to receiving the authentication data and the sign-in data, the system may display a splash screen and/or a market/portfolio interface 600 as illustrated in FIG. 6. The market/portfolio interface 600 may include selectable market data for cryptocurrencies 602 and/or currency pairs 604. The system may display selectable market data for one or more instruments associated with the cryptocurrency 602 and/or currency pairs 604. For example, the system may display futures contracts 606 associated with the cryptocurrency 602 such as a perpetual contract, or various finite contracts 608 (e.g., closing at one month intervals 'September 27', 'December 27', and/or the like). The system may display current price data 610, index price data, strike price data, volume data, velocity data, or any other market data associated with the cryptocurrencies 602, currency pairs 604, and or instruments. In various embodiments, the market/portfolio interface 600 may be configured to display an account balance drawer 612. In various embodiments, the market/portfolio interface 600 may be configured to display an account settings icon 614. In response to receiving an interaction with the account settings icon 614, the system may display an account configuration interface.

Figure 7A:
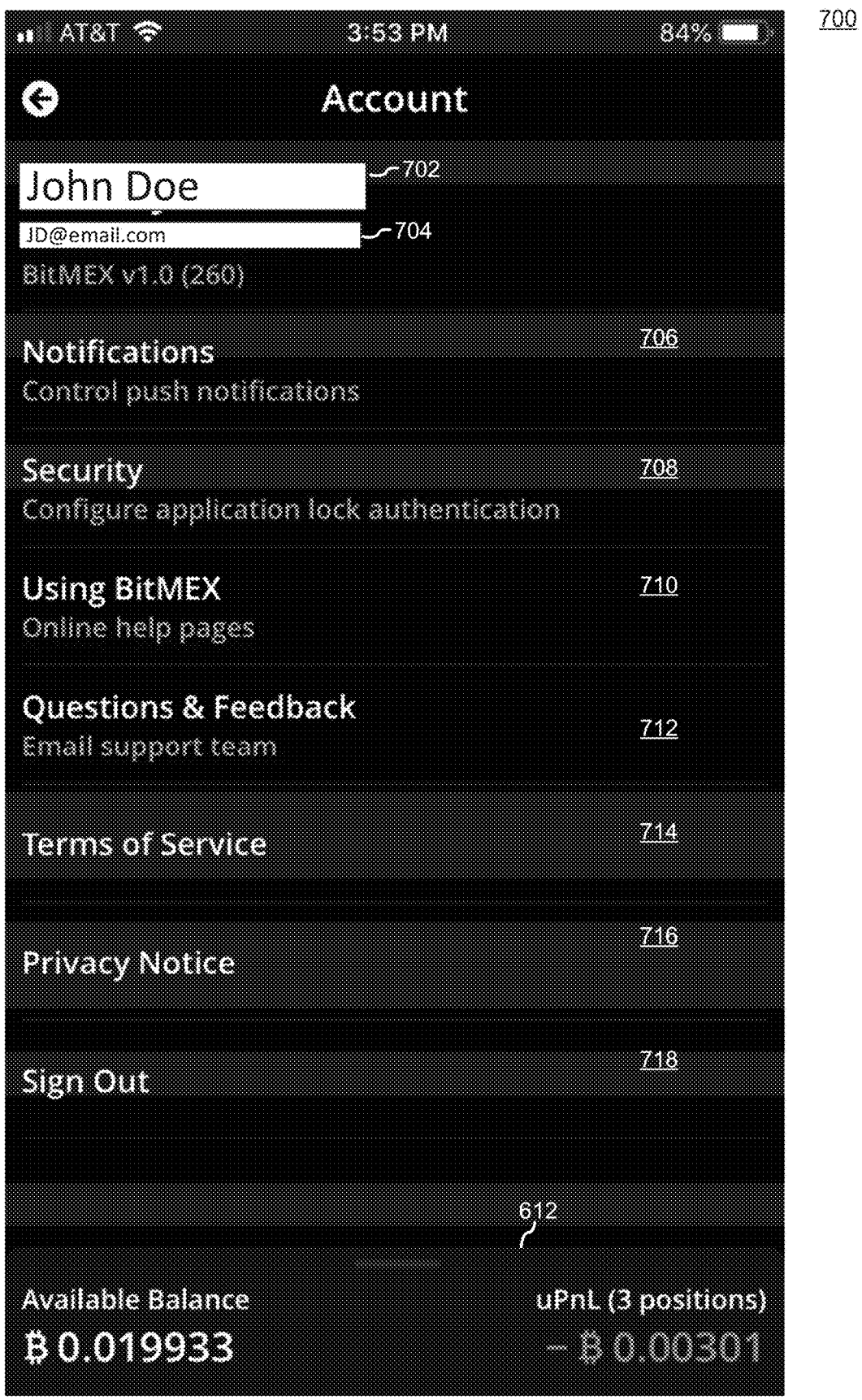
FIG. 7A illustrates an account configuration interface of a mobile digital currency exchange system, in accordance with various embodiments.

With additional reference to FIG. 7A, an account configuration interface 700 of system 100 is illustrated in accordance with various embodiments. The account configuration interface 700 may display various elements of account information associated with the user account such as a user name 702 and an email 704. In various embodiments, the account configuration interface 700 may be configured to enable access to one or more configuration settings pages of the system such as, for example, via interaction with a notifications settings button 706, a security settings button 708, a user guide button 710, an a help request button 712. In various embodiments, the account configuration interface 700 may be configured to display informational pages in response to receiving an interaction via a terms of service button 714 and a privacy notice button 716. In various embodiments, the system may be configured to terminate an authenticated session in response to receiving an interaction with a sign-out button 718. In this regard, the system may disable access to the various systems, features, and engines of the trading platform 200 in response to the interaction with the sign-out button 718. In various embodiments, the account configuration interface 700 may be configured to display the account balance drawer 612.

Figure 7B:
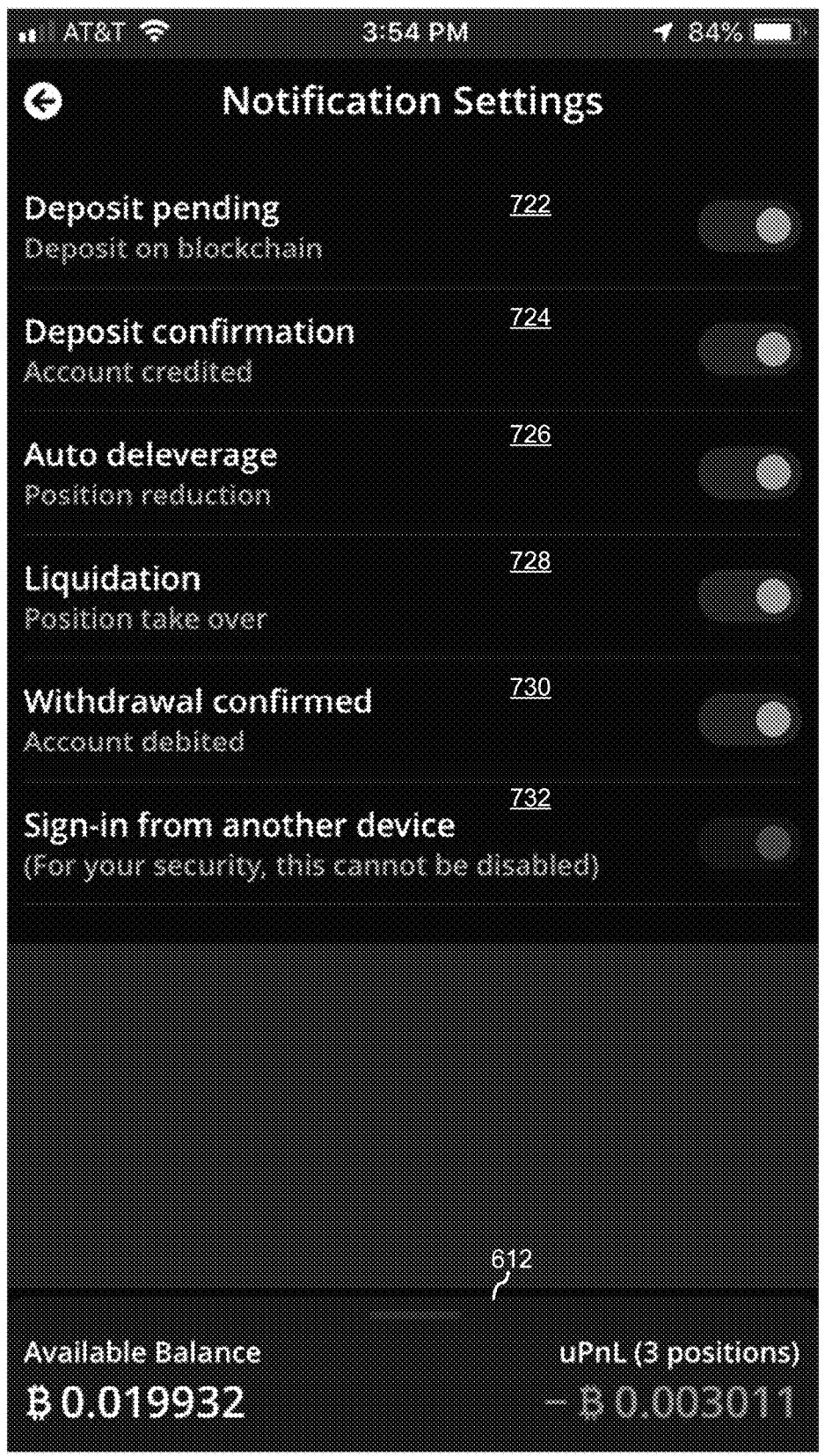
FIG. 7B illustrates a notification settings interface of a mobile digital currency exchange system, in accordance with various embodiments.

In various embodiments and with additional reference to FIG. 7B, in response to receiving the interaction with the notifications settings button 706 the system may display a notification settings interface 720. The notification settings interface 720 may be configured to receive notifications settings inputs and, in response, enable or disable various push notifications from the trading platform 200 to the user device 104. For example, notification settings interface 720 may be configured to receive interactions with one or more switches to enable/disable notifications for deposit pending 722, deposit confirmation 724, automatic delivering events 726, liquidation events 728, withdrawal confirmation 730, and alternate device sign-in 732. For example, the system may compare device fingerprints associated with a user account as account information. The system may generate an alternate device sign-in notification where a device fingerprint received with the sign-in data does not match the device fingerprint stored as the account information. Stated another way, the system may receive a first device fingerprint and a first sign-in data from a first user device and a second device fingerprint and the first sign in-data from a second user device. The system may generate the alternate device sign-in notification in response to receiving the second device fingerprint and the first sign in-data from the second user device. The system may transmit the alternative device sign-in notification to the first user device. In various embodiments, the notification settings interface 720 may be configured to display the account balance drawer 612.

Figure 7C:
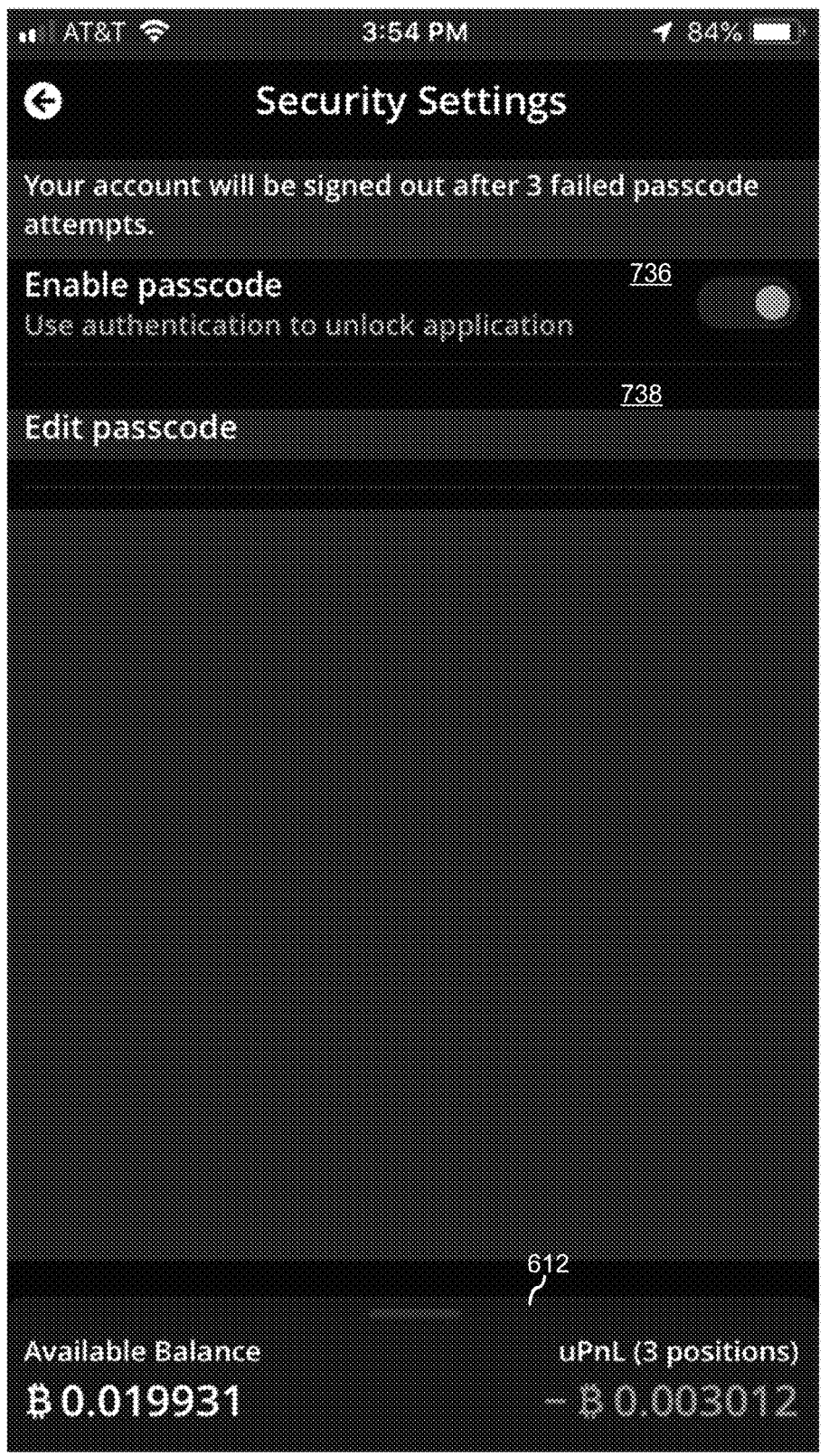
FIG. 7C illustrates a security settings interface of a mobile digital currency exchange system, in accordance with various embodiments.

In various embodiments and with additional reference to FIG. 7C, in response to receiving the interaction with the security settings button 708 the system may display a security settings interface 734. The security settings interface 734 may be configured to enable and/or disable the authentication interface 510 and associated system processes. For example, the authentication interface 510 may be disabled in response to receiving receive interactions with an enable/disable command switch 736. In various embodiments, the security settings interface 734 may be configured to edit or reconfigure the authentication data. For example, the system may enable editing of the numeric passcode via an interaction with the edit passcode button 738. In various embodiments, the security settings interface 734 may be configured to display the account balance drawer 612.

Figure 7D:
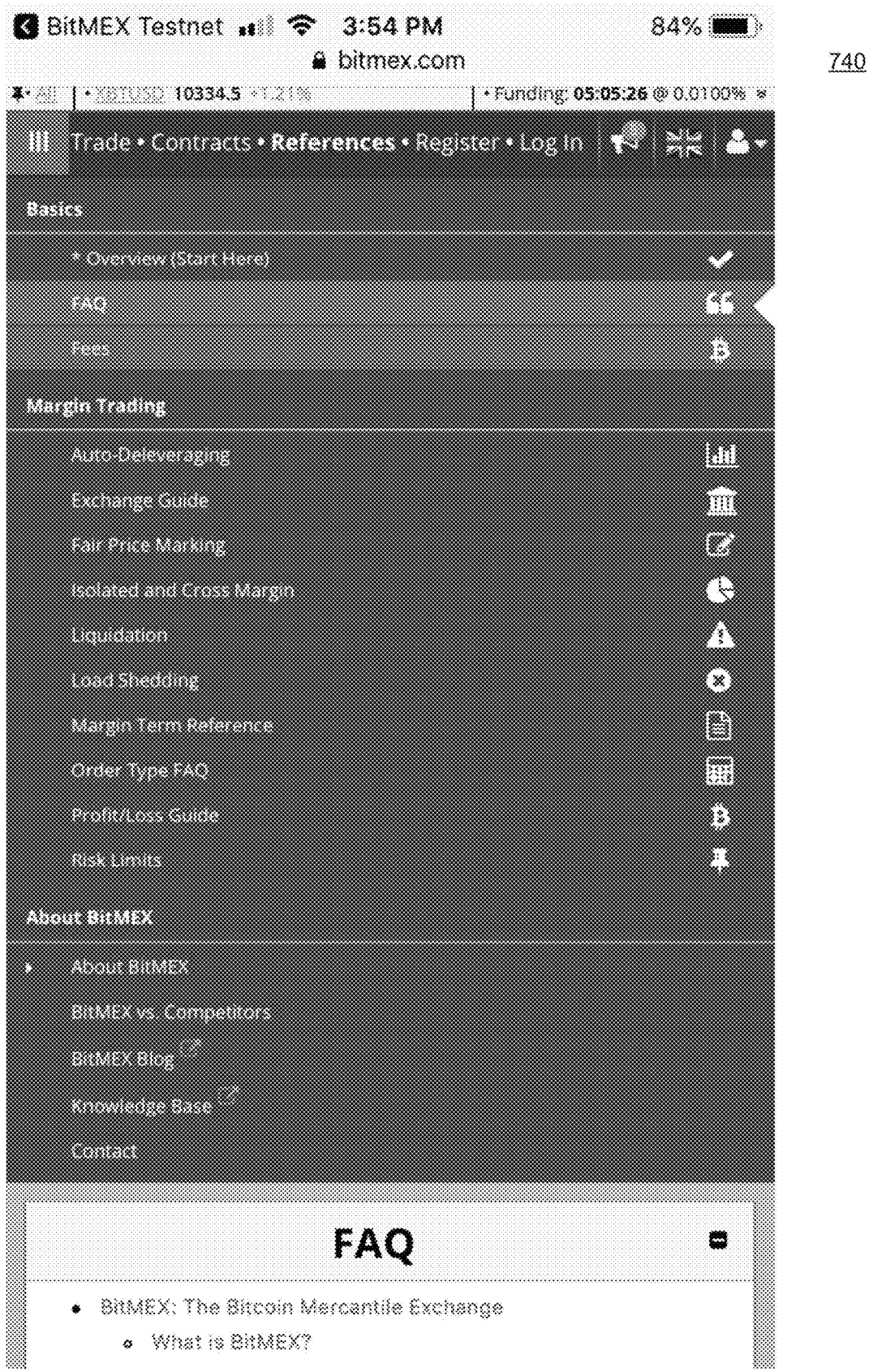
FIG. 7D illustrates a user guide page of a mobile digital currency exchange system, in accordance with various embodiments.

In various embodiments and with additional reference to FIG. 7D, in response to receiving the interaction with the user guide button 710 the system may display a user guide page 740. In various embodiments, the system may start a web punch out process and the native app 110 may communicate with one or more web servers to display the a user guide page 740.

Figure 7E:
FIG. 7E illustrates a help request page of a mobile digital currency exchange system, in accordance with various embodiments.

In various embodiments and with additional reference to FIG. 7E, in response to receiving the interaction with the help request button 712, the system may display a help request page 742. In various embodiments, the system may start a web punch out process and the native app 110 may communicate with one or more web servers to display the a help request page 742. In various embodiments, the help request page 742 may be configured to receive help request information. The help request information may comprise text inputs such as, for example, an email address 744, a subject line 746, a problem description 748, and/or the like. In various embodiments, the help request information may include graphical data or data files which may be included as an attachment 750.

In various embodiments and in response to receiving an interaction with the account balance drawer 612, the system may display an account balance page 800. For example, the system may receive and interaction from the user device 104 such as dragging the account balance drawer 612 upward and, in response, expand the account balance drawer 612 to display the account balance page 800. In various embodiments, the account balance page 800 may be configured to display account balance and position data an associated with a user account. The account balance page may display a total available balance 802, a total margin balance 806, a total margin composition indicator 808, an overall PnL 804 (which may be realized or unrealized) and/or the like. The total margin composition indicator 808 may be a graphical indicator such as, for example, a bar graph showing the total values of all positions and all current orders as a portion of total available margin. Each component may be displayed in different colors and thereby serve to quickly distinguish between the all positions value, the open orders value, and the total available margin value. For example, the bar graph may fill toward the right of the account balance page 800 as margin is used on various open positions and orders and thereby reduce the relative size of the displayed total available margin in the bar graph.

In various embodiments, the account balance page 800 may include a position breakout by currency pair providing details of the components of the overall position associated with the user account such as positions categorized in terms of currency pairs. For example, the system may display a XBTUSD position details 810 and a ETHUSD position details 812. Either of the position details displays (810, 812) may include associated market data such as a count of active orders and/or order types 814, position size 816, return calculation 818, PnL calculations 820, position value 822, and a liquidation details frame 824.

Figure 8A:
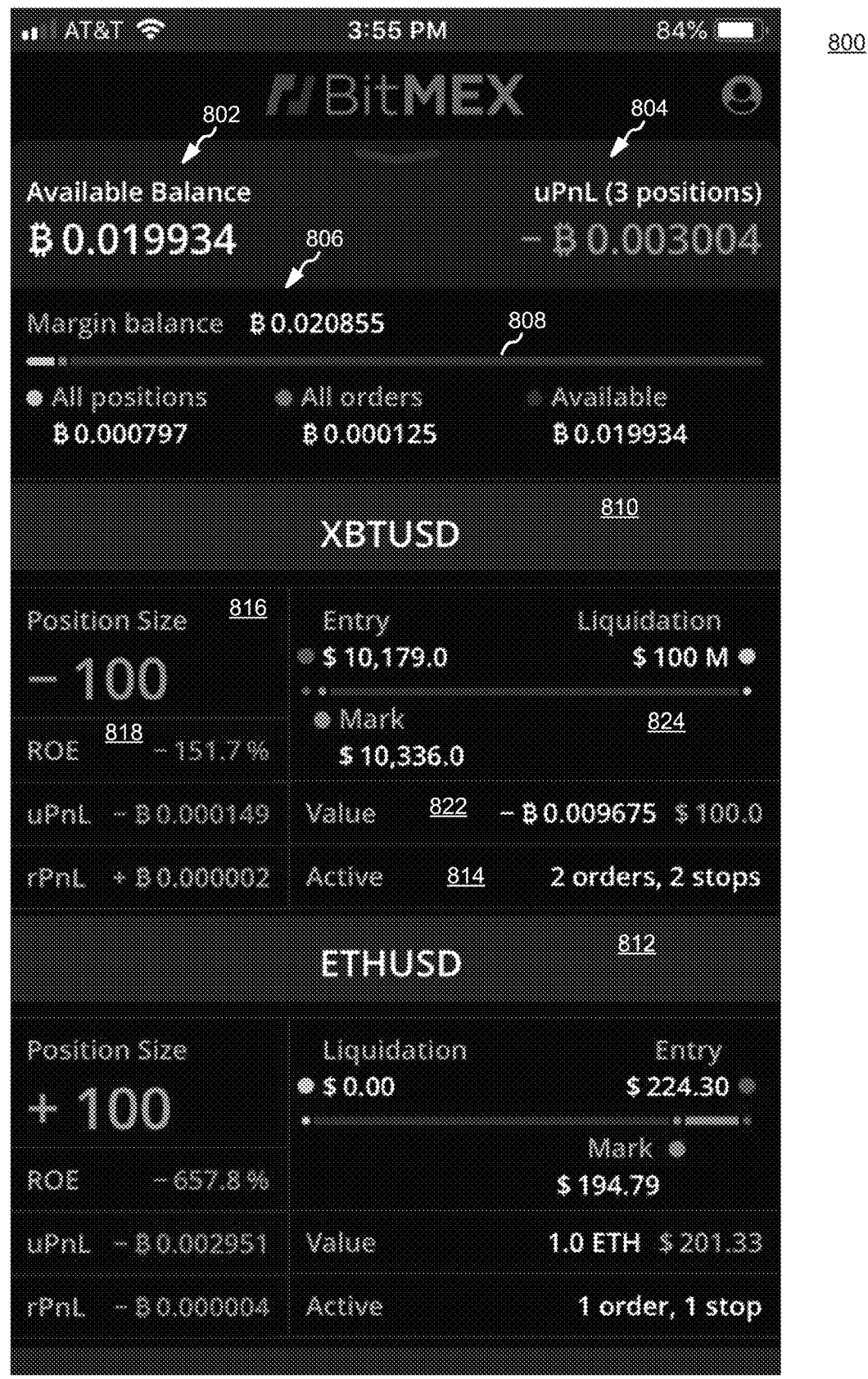
FIG. 8A illustrates an account balance page of a mobile digital currency exchange system, in accordance with various embodiments.
Figure 8B:
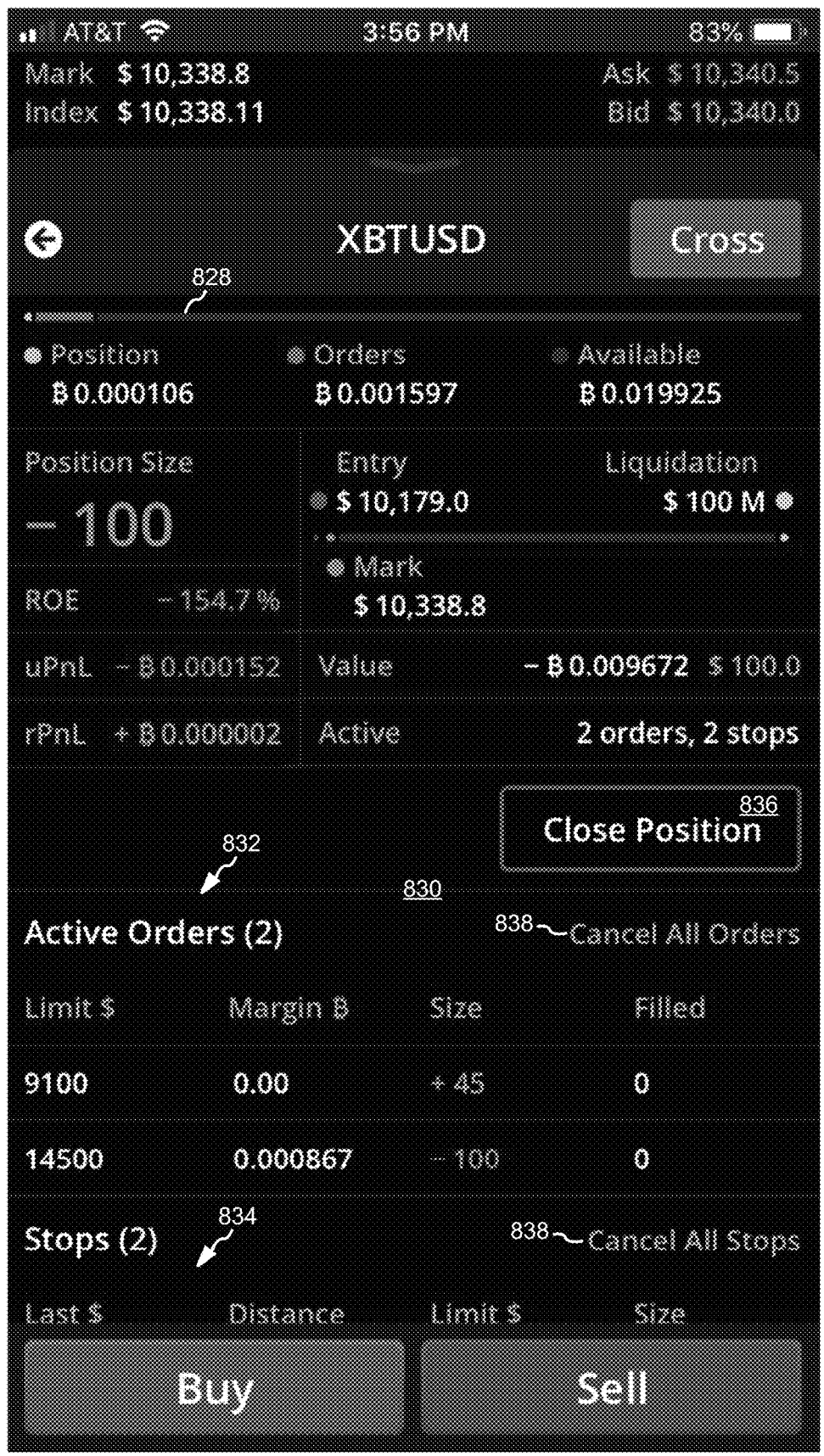
FIG. 8B illustrates a position details page of a mobile digital currency exchange system, in accordance with various embodiments.
Figure 8C:
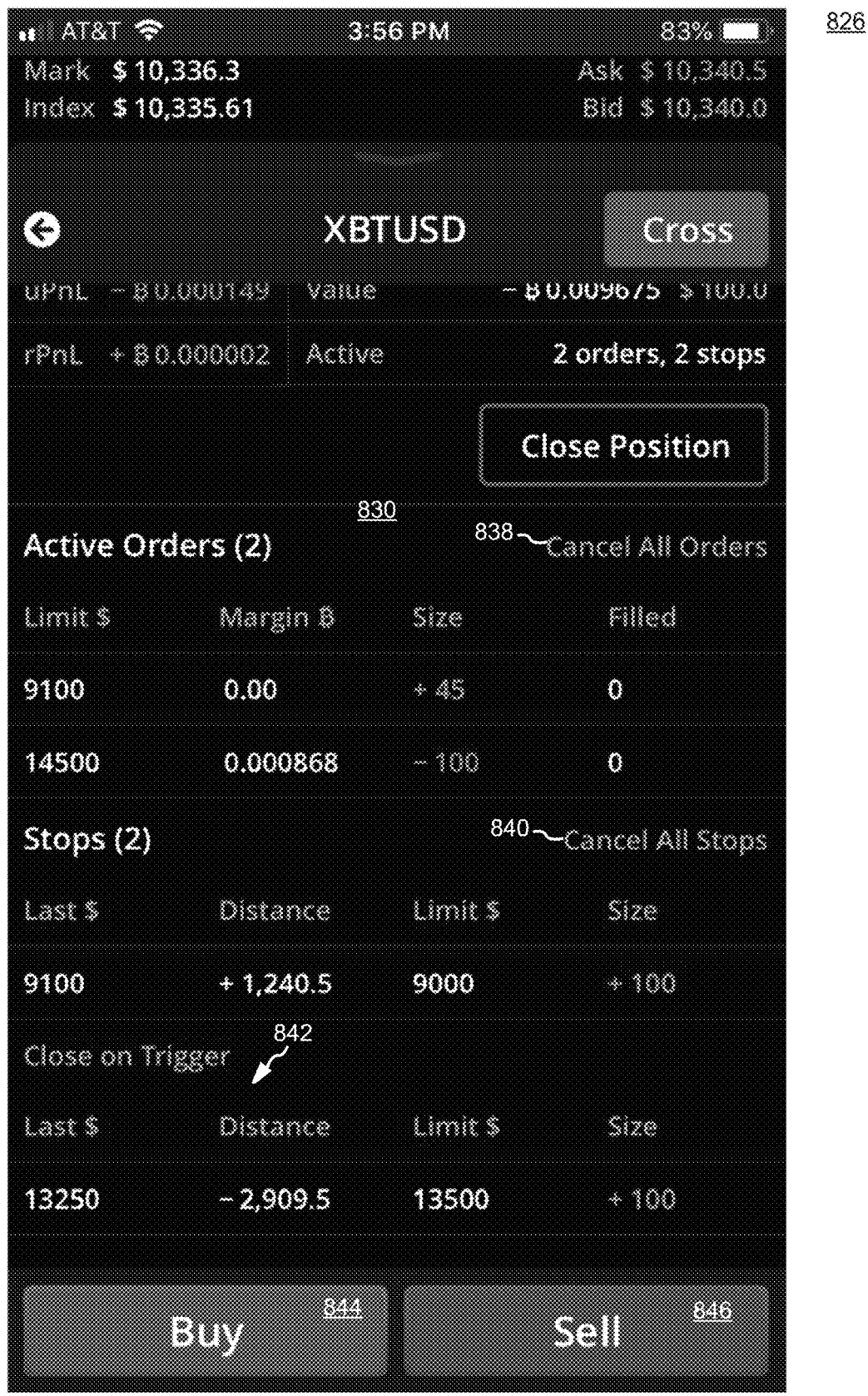
FIG. 8C illustrates a position details page of a mobile digital currency exchange system, in accordance with various embodiments.

In various embodiments and with additional reference to FIGS. 8B and 8C, in response to receiving an interaction with one of the position details (810, 812) the system may display a position details page 826. FIG. 8B illustrates a first portion of the position details page 826 and FIG. 8B illustrates a second portion of the position details page which has been scrolled to reveal additional details of the active stops. In various embodiments, the position details page 826 may be configured to display position specific data associated with the user account, such as, for example, all positions associated with the selected currency pair. The position details page 826 may include pair specific margin composition indicator 828. The pair specific margin composition indicator 828 may be configured to function in a like manner as the total margin composition indicator 808, but may make calculations and displays based only on those positions associated with the selected position details (e.g., only XBTUSD positions). The position details page 826 may include an order details frame 830 which may display details of all active orders 832, all active stops 834, and close on trigger conditions 842 associated with the active stops 834.

In various embodiments, the position details page 826 may be configured command the trading platform 200 to close all positions associated with the selected currency pair in response to an interaction with a close position button 836. In response to receiving an interaction with the close position button 836, the system may automatically generate one or more orders configured to unwind the associated position and, in response, may execute a plurality of transactions based on the orders. In like regard, the position details page 826 may be configured command the trading platform 200 to cancel all orders and/or to cancel all stops associated with the selected currency pair in response to an interaction with a corresponding cancel all orders button 838 and a cancel all stops button 840. In response to receiving an interaction with the cancel all orders button 838, the system may remove all active orders associated with the selected currency pair from an order book of the trading platform 200. In response to receiving an interaction with the cancel all stops button 840, the system may remove all active stop orders associated with the selected currency pair from an order book of the trading platform 200. In various embodiments, the position details page 826 may be configured start an order flow process of the system. For example, the position details page 826 may include a buy button 844 and/or a sell button 846 and the system may start the order flow process in response to receiving an interaction with the buttons (844, 846). In various embodiments, the order details frame 830 may be configured to receive an interaction with any of the active orders 832, active stops 834, and/or close on trigger conditions 842 displayed therein.

Figure 8D:
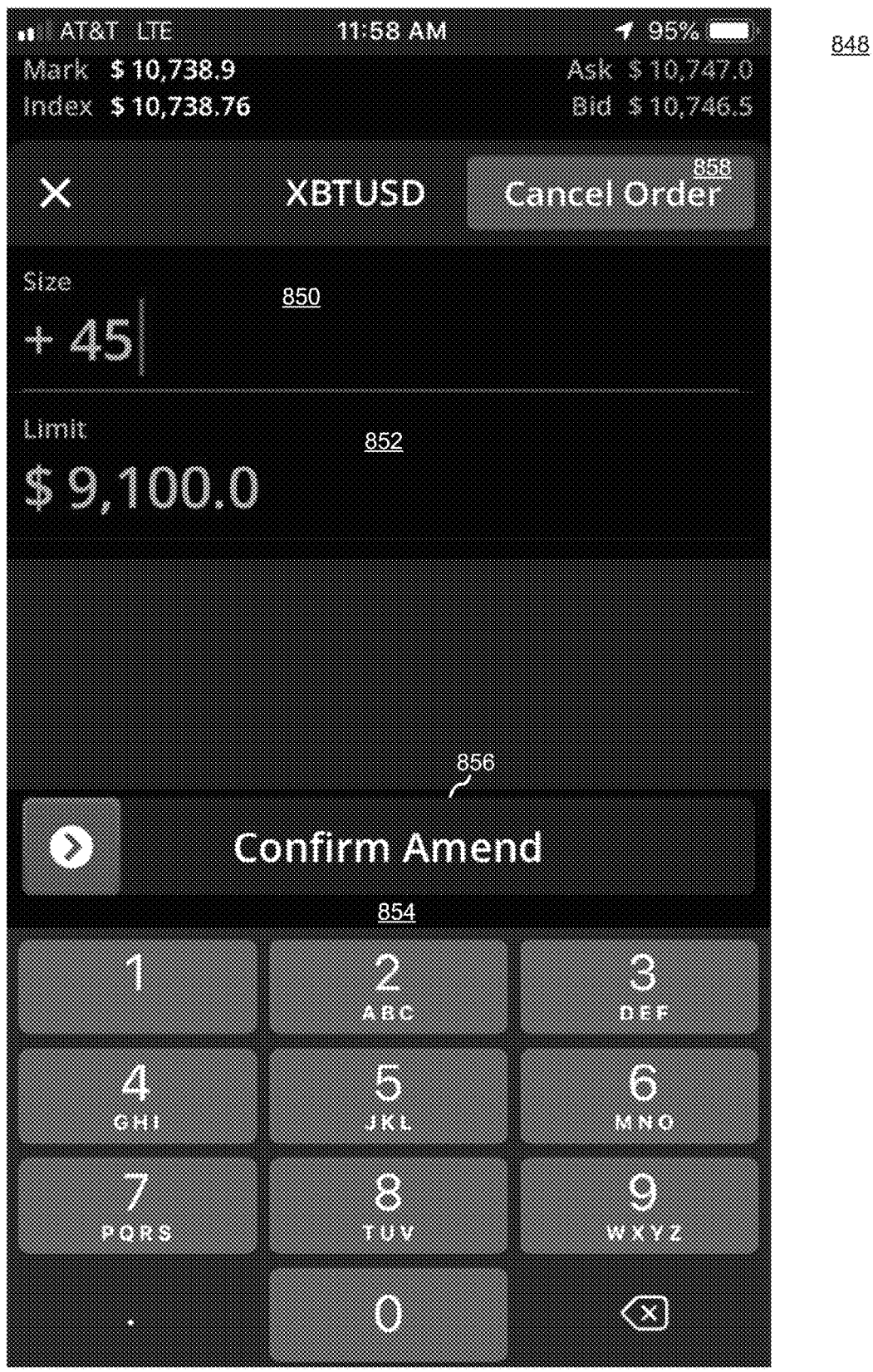
FIG. 8D illustrates an amend position interface of a mobile digital currency exchange system, in accordance with various embodiments.

In various embodiments and with additional reference to FIG. 8D, in response to receiving an interaction with the order details frame 830 the system may display an amend position interface 848. The amend position interface 848 may be configured to enable modification of various data associated with a discrete order displayed in the order details frame 830. The discrete order may be determined based on the interaction, for example, the discrete order may determined based on the system registering a touch interaction with the discrete order. The amend position interface 848 may be configured to receive a size input via size input field 850 and/or a limit input via limit input field 852. The amend position interface 848 may display current values for these inputs and, in response to receiving an interaction with either of the input fields (850, 852) may display a keypad 854. In this regard, the amend position interface 848 may facilitate altering the a current values to a new value via registering keypad 854 inputs. In various embodiments, the amend position interface 848 may prompt for a confirmation action and, in response to receiving the confirmation action, may set the current value to the new value. For example, amend position interface 848 may display a 'confirm amend' slider 856 and may receive an interaction such as dragging the slider across the amend position interface 848. In various embodiments, the amend position interface 848 may enable cancellation of the discrete order. For example, the system may receive an interaction with a cancel order button 858 and remove the associated order from the order book of the trading platform 200.

Figure 9A:
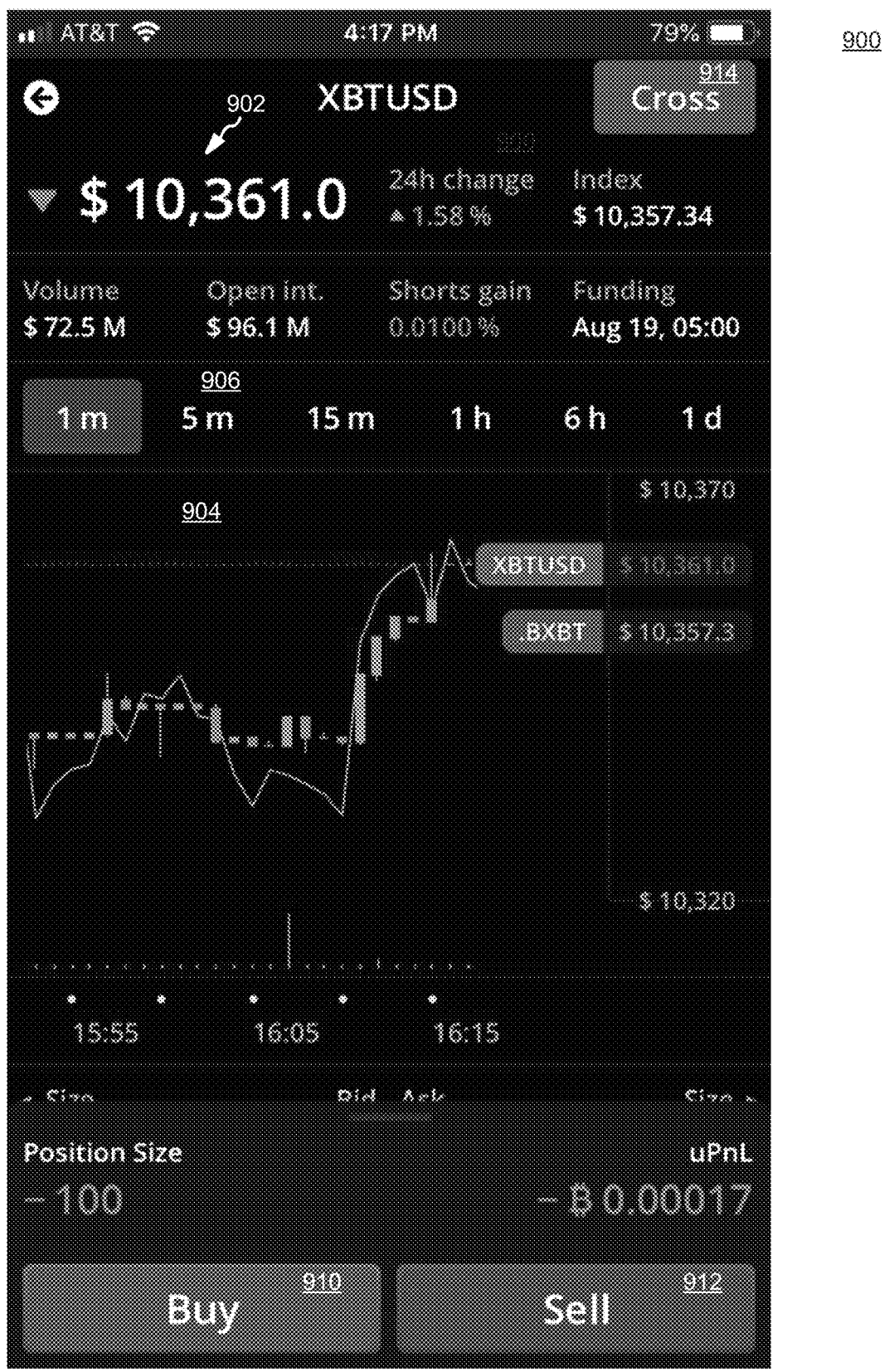
FIG. 9A illustrates a market data page of a mobile digital currency exchange system, in accordance with various embodiments.
Figure 9B:
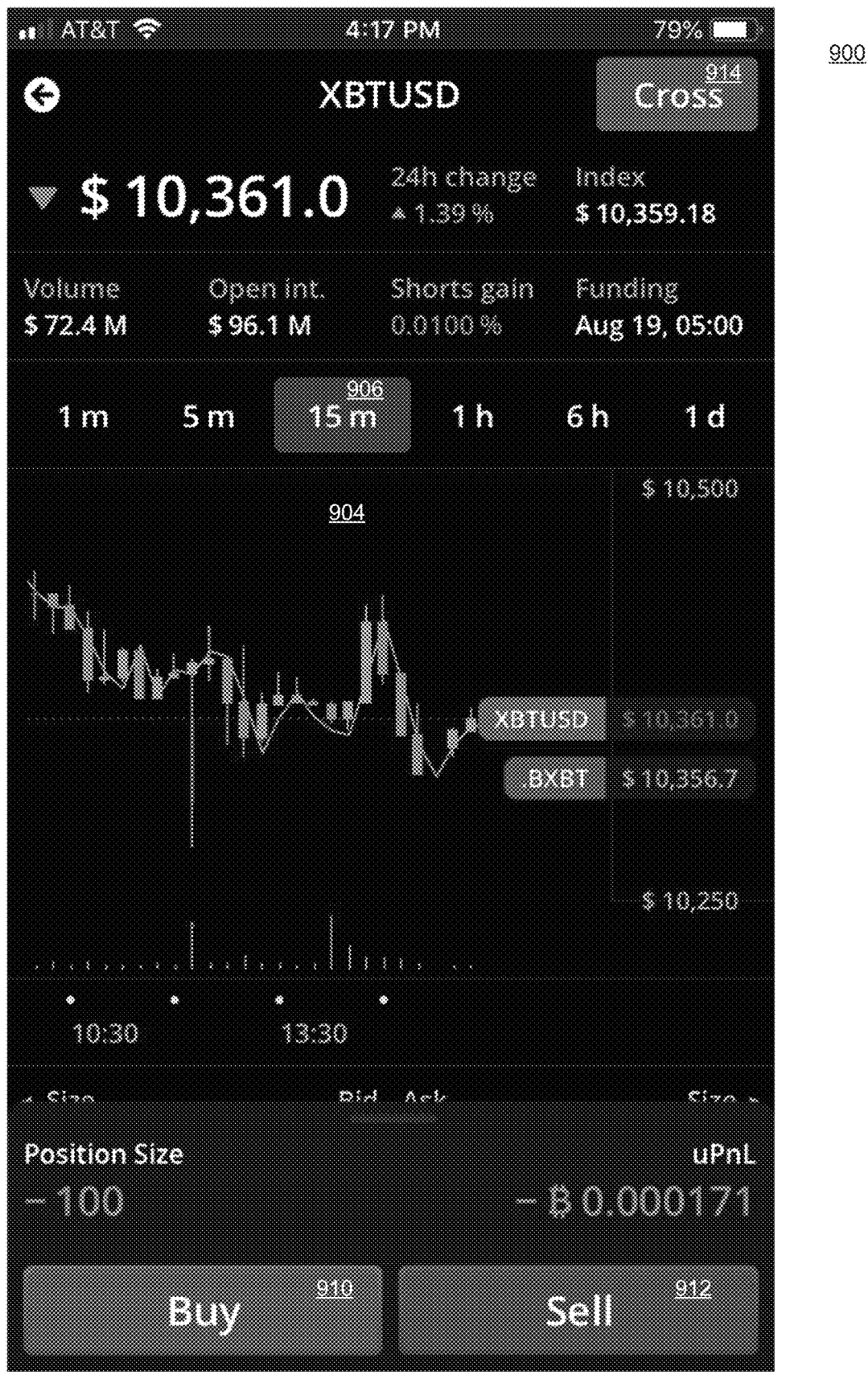
FIG. 9B illustrates a market data page of a mobile digital currency exchange system, in accordance with various embodiments.
Figure 9C:
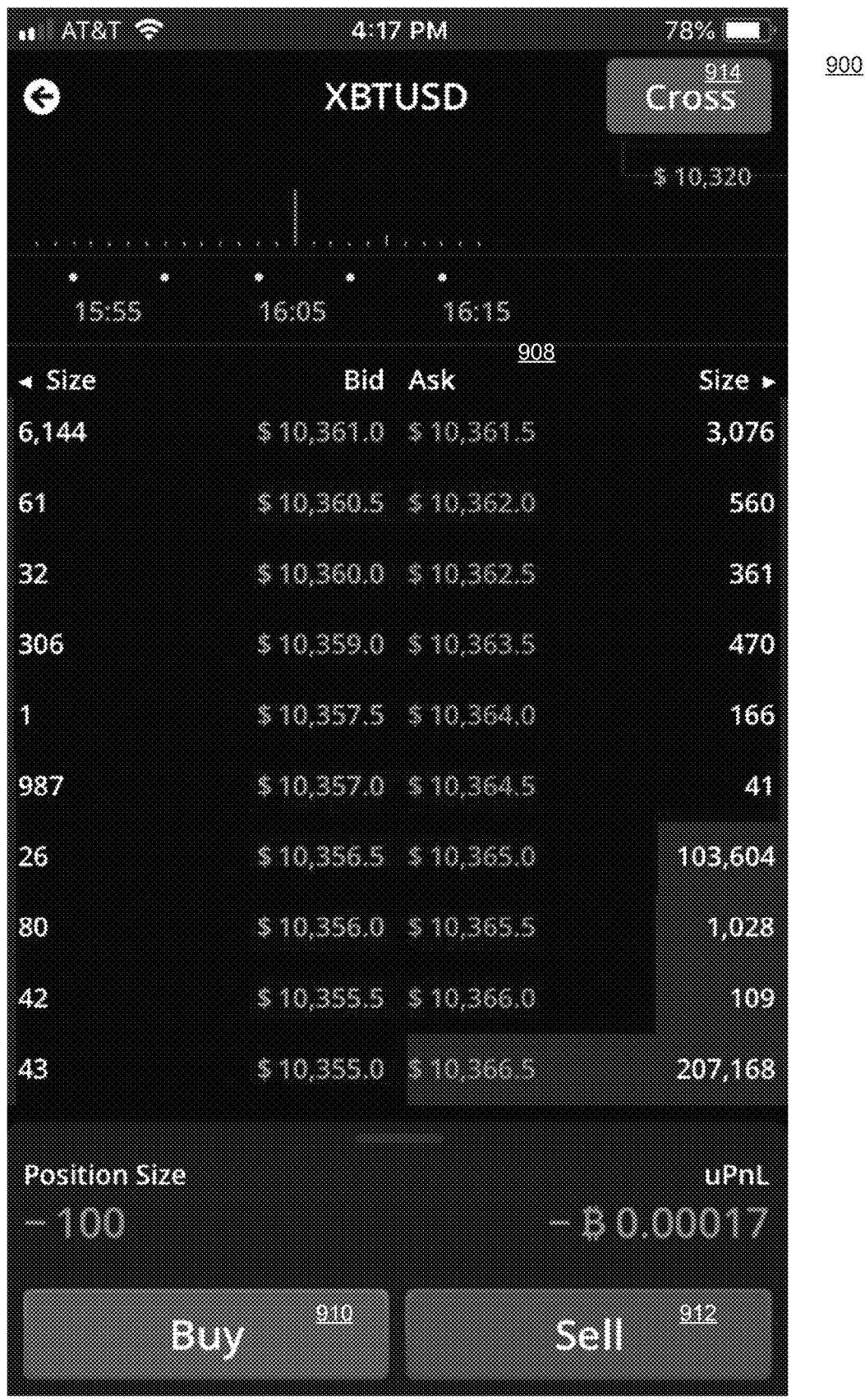
FIG. 9C illustrates an order book page of a mobile digital currency exchange system, in accordance with various embodiments.

In various embodiments and with additional reference to FIGS. 9A, 9B, and 9C a market data page 900 of the system 100 is illustrated. The market data page 900 may be configured to display various market data of a selected currency pair. For example, the market data page 900 may display market data related to the XBTUSD pair. In various embodiments, the market data page 900 may display data 902 such as a current price, a 24 hour percent change in price, an index price, a volume, a short gains, a funding window, an open instrument volume, a gain/loss indicator icon, and/or the like. With brief reference to FIG. 9C, the market data page 900 is illustrated displaying order book data frame 908. In various embodiments, the order book data frame 908 may be displayed in response to receiving an interaction with the market data page 900 such as, for example, scrolling downward or a downward swipe at the user device 104.

The market data page 900 may include a real-time graphical display of the market (i.e., market graph 904). The market graph 904 may display various market data over time such as, for example, a spot price labeled 'XBTUSD' and an index price '.BXBT'. In various embodiments, the market graph 904 may be a candlestick chart and may be selectable across various time intervals. The market data page 900 may be configured to receive market graph time interval inputs via radio buttons 906. As shown in FIG. 9A, the market graph 904 is displayed at one (1) minute intervals with the '1 m' radio button selected. With brief reference to FIG. 9B, the '15 m' radio button is shown selected and the corresponding alteration to the market graph 904 is illustrated. In various embodiments, the market data page 900 may be configured start an order flow process of the system 100. For example, the market data page 900 may include a buy button 910 and/or a sell button 912 and the system may start the order flow process in response to receiving an interaction with the buttons (910, 912). In various embodiments, the market data page 900 may be configured start an leverage setting process of the system 100. For example, the market data page 900 may include a leverage setting button 914 and the system may start the leverage setting process in response to receiving an interaction with the leverage setting button 914.

Figure 10A:
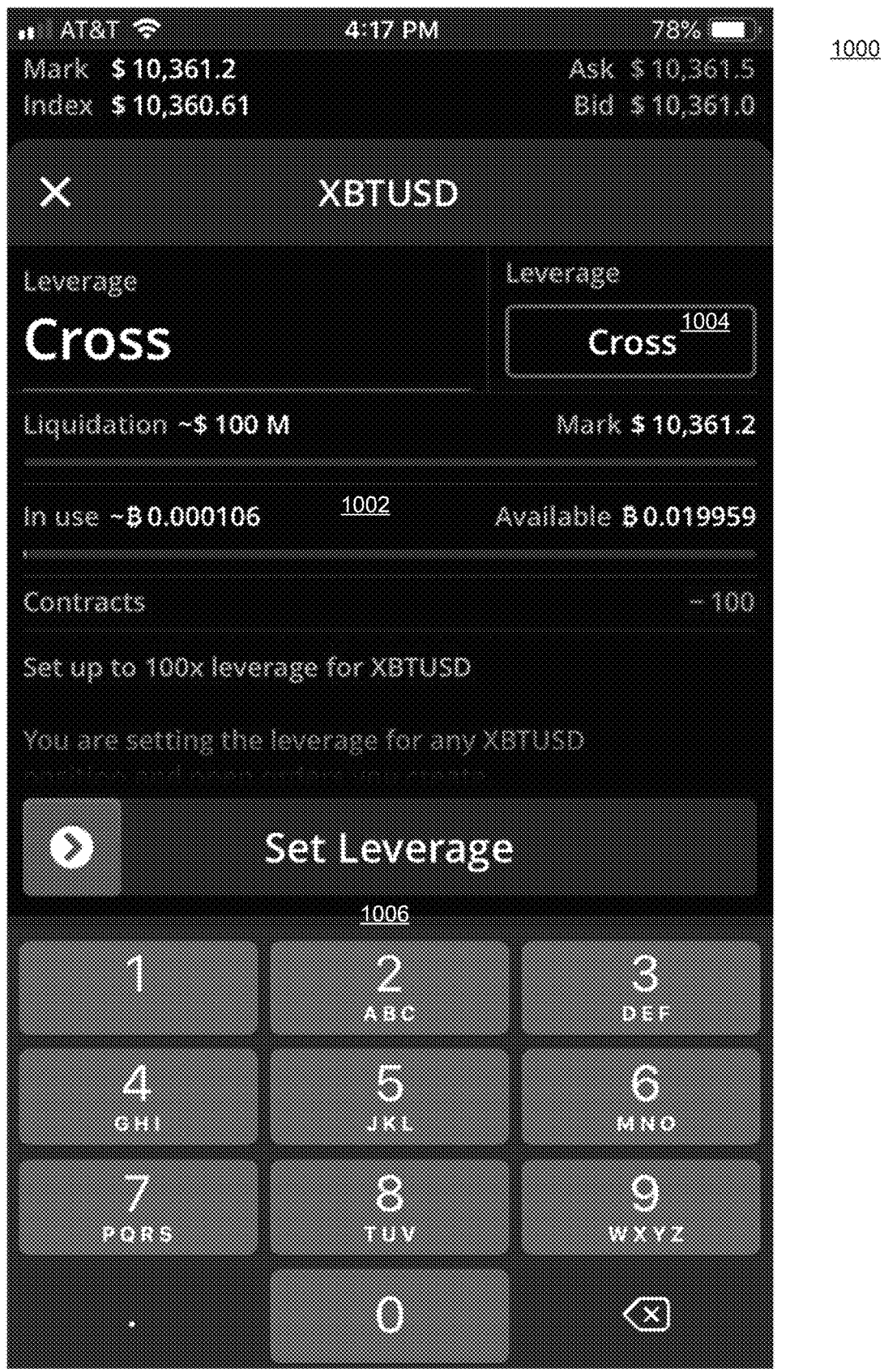
FIG. 10A illustrates a leverage interface of a mobile digital currency exchange system, in accordance with various embodiments.
Figure 10B:
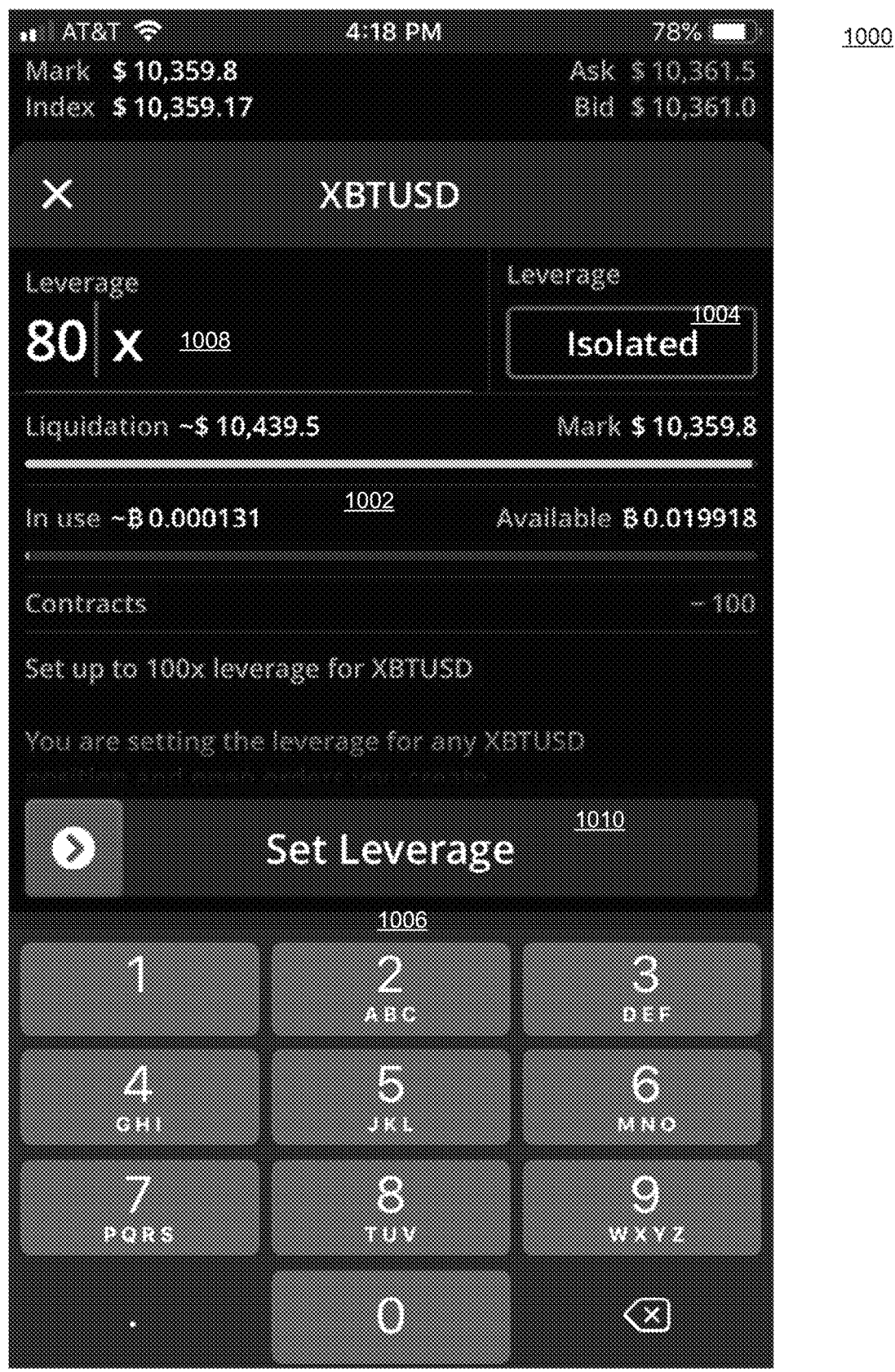
FIG. 10B illustrates a leverage interface of a mobile digital currency exchange system, in accordance with various embodiments.

In various embodiments and with additional reference to FIGS. 10A and 10B, the system may display a leverage setting interface 1000 in response to receiving the interaction with the leverage setting button 914. The leverage setting interface 1000 may be configured to enable leverage settings across orders generated in the order flow process. The leverage setting interface 1000 may include a usable margin display 1002, liquidation data, a leverage type selector 1004, and a leverage ratio 1008, and or the like. The leverage setting interface 1000 may be configured to receive a leverage type input via an interaction with the leverage type selector 1004 and a leverage ratio input via the keypad 1006. In various embodiments, the usable margin display may be a bar graph. In various embodiments, the leverage setting interface 1000 may prompt for a confirmation action and, in response to receiving the confirmation action, may set the current leverage data to the new data. For example, leverage setting interface 1000 may display a 'set leverage' slider 1010 and may receive an interaction such as dragging the slider across the leverage setting interface 1000.

With additional reference to FIGS. 11A through 11F, various pages and frames of an order interface 1100 of system 100 are illustrated in accordance with various embodiments. In response to starting the order flow process, the system may display the order interface 1100. The order interface 1100 is configured to receive various order flow inputs which define generation of a platform command. For example, the order flow interface may be configured to receive data or inputs associated with a buy order, a sell order, an order modification, a leverage setting, or a close position command. The system may generate the platform command based on these inputs. The platform command may be received by the trading platform 200 which may, in response, execute one or more transactions based on the platform command. In various embodiments, one or more platform commands may be batched by the system or generated as a platform command set which may be executed simultaneously or sequentially by the trading platform 200.

Figure 11A:
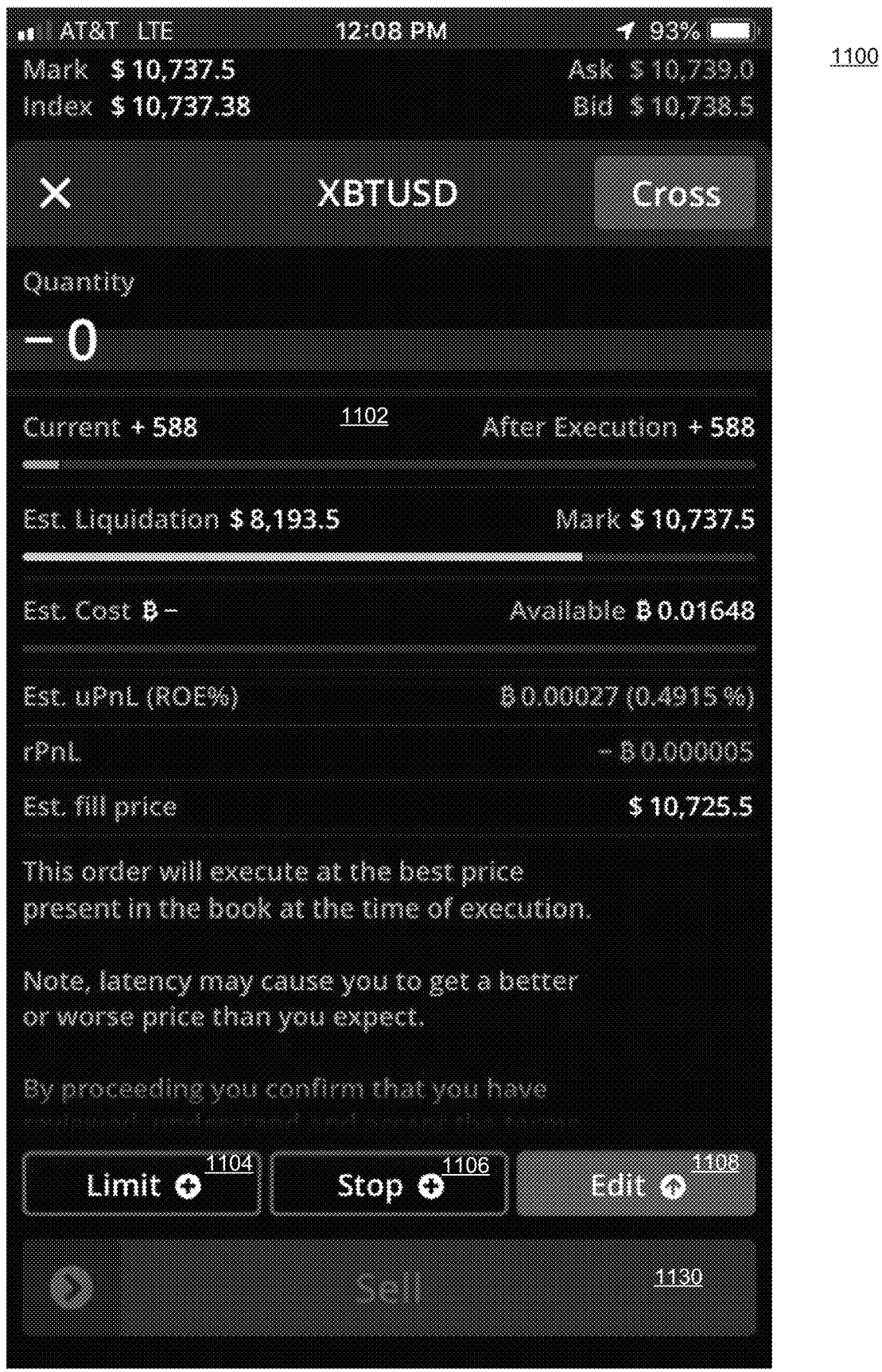
FIG. 11A illustrates an order interface of a mobile digital currency exchange system, in accordance with various embodiments.
Figure 11B:
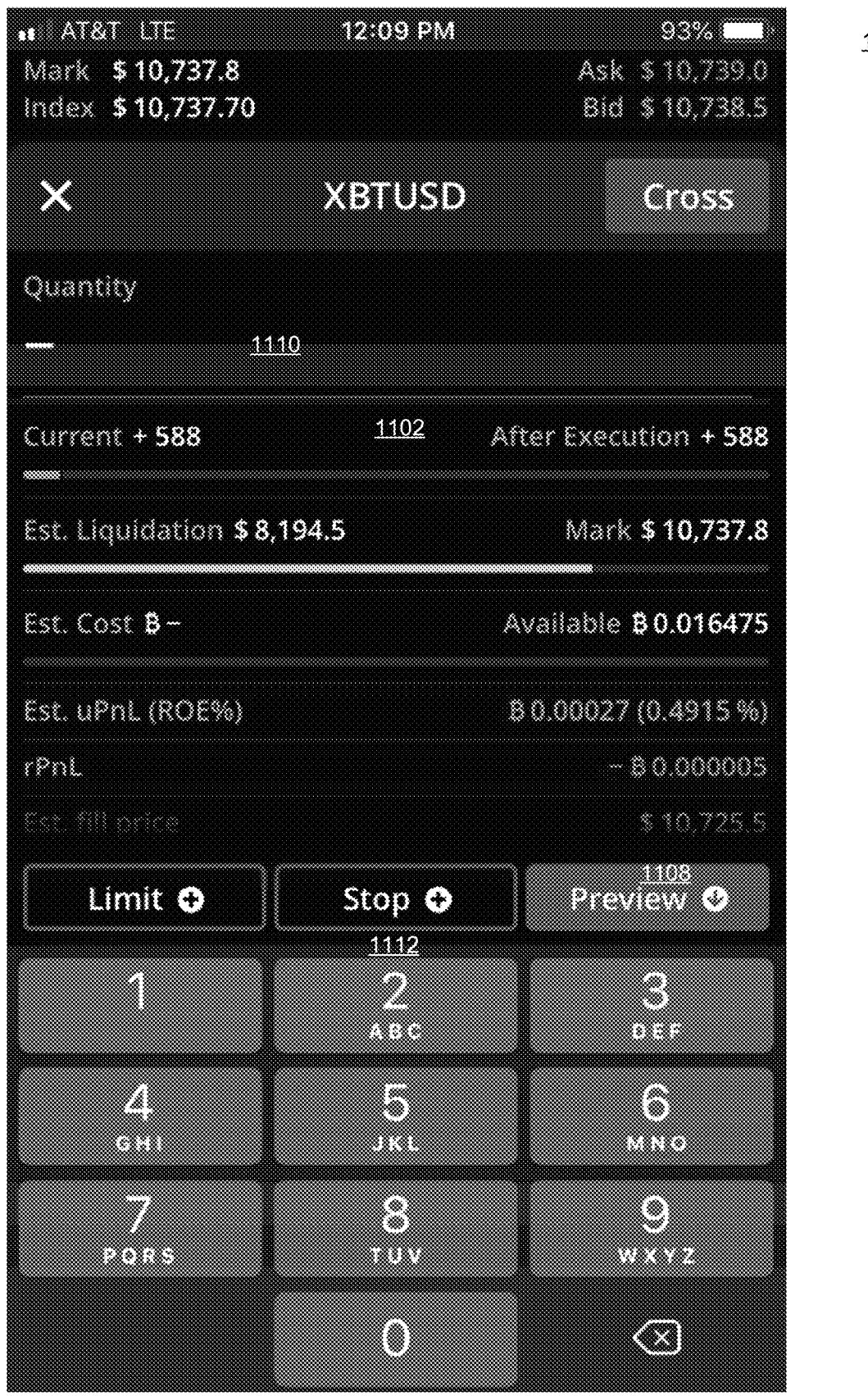
FIG. 11B illustrates an order interface of a mobile digital currency exchange system, in accordance with various embodiments.

In various embodiments, the order interface 1100 includes an order details frame 1102 which displays current order details such as, for example, a current position, a position after execution of the current order, a liquidation estimation, a calculated PnL, an estimated fill price, and/or the like. The order interface 1100 includes a limit setting button 1104 a stop setting 1106 button and an edit order button 1108. In response to receiving an interaction with the edit order button 1108, the system may display a prompt to edit the order quantity 1110. For example, as shown in FIG. 11B the system may display a keypad 1112 and receive an order quantity via the keypad 1112. The edit order button 1108 may display 'preview' and the system may display the effect on the order details frame 1102 of the new order quantity 1110.

Figure 11C:
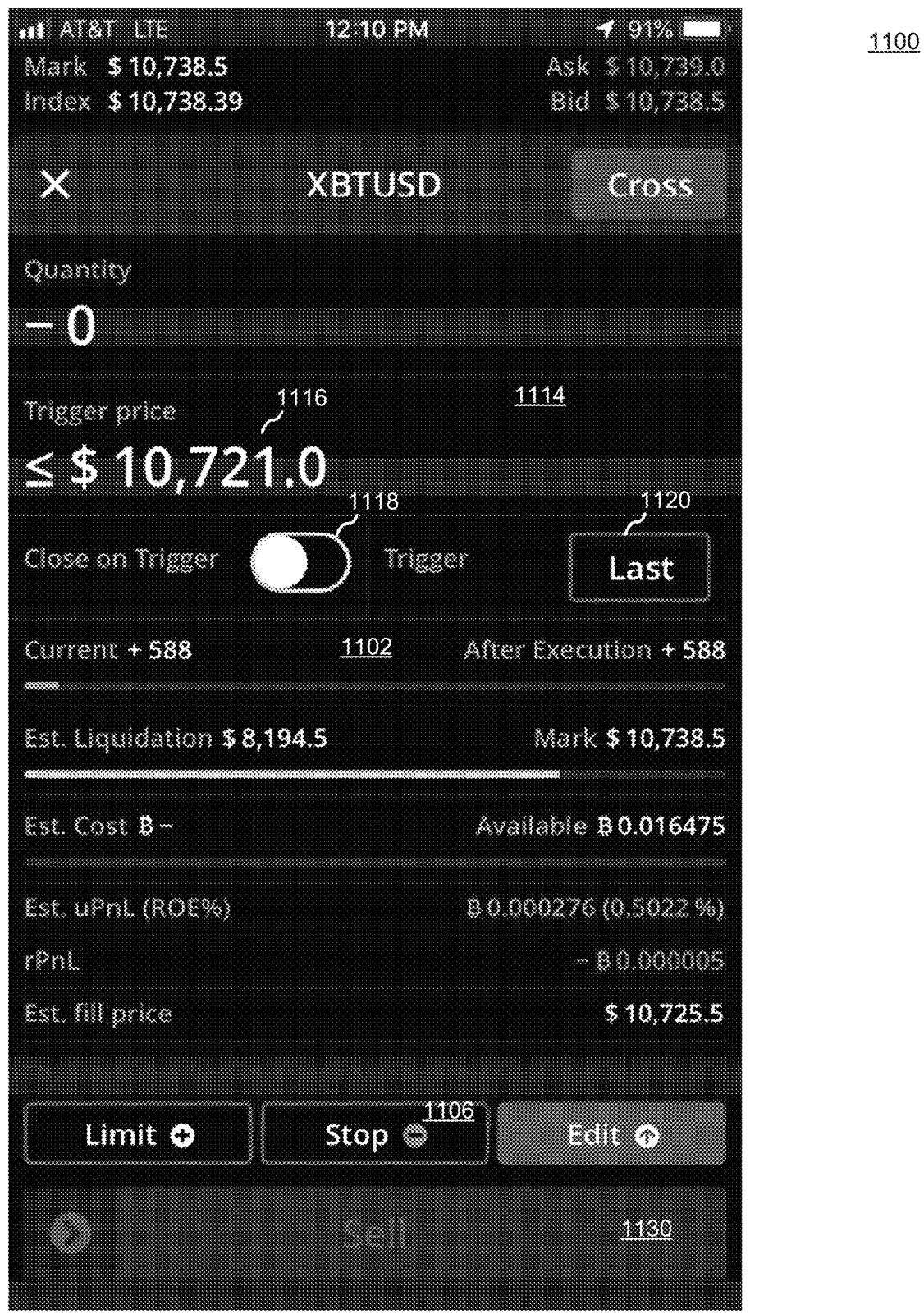
FIG. 11C illustrates an order interface of a mobile digital currency exchange system, in accordance with various embodiments.

In response to receiving an interaction with the stop setting 1106 button, the system may display a stop settings frame 1114 shown in FIG. 11C. The stop setting 1106 button may display an icon indicating expansion of the stop settings frame 1114. The stop settings frame 1114 may be configured to receive order flow inputs used to define a stop order. The stop settings frame 1114 may receive and display order flow inputs such as a trigger price 1116, a close on trigger condition switch 1118, and a last price setting button 1120. For example, in response to an interaction with the trigger price 1116 the system may display the keypad and receive the trigger price input. In response to receiving an interaction with the close on trigger condition switch 1118, the system may set a close on trigger condition of the order. In various embodiments, in response to receiving an interaction with the last price setting button 1120, the system may set the trigger price to a last filled order price of the currency pair on the exchange platform 200.

Figure 11D:
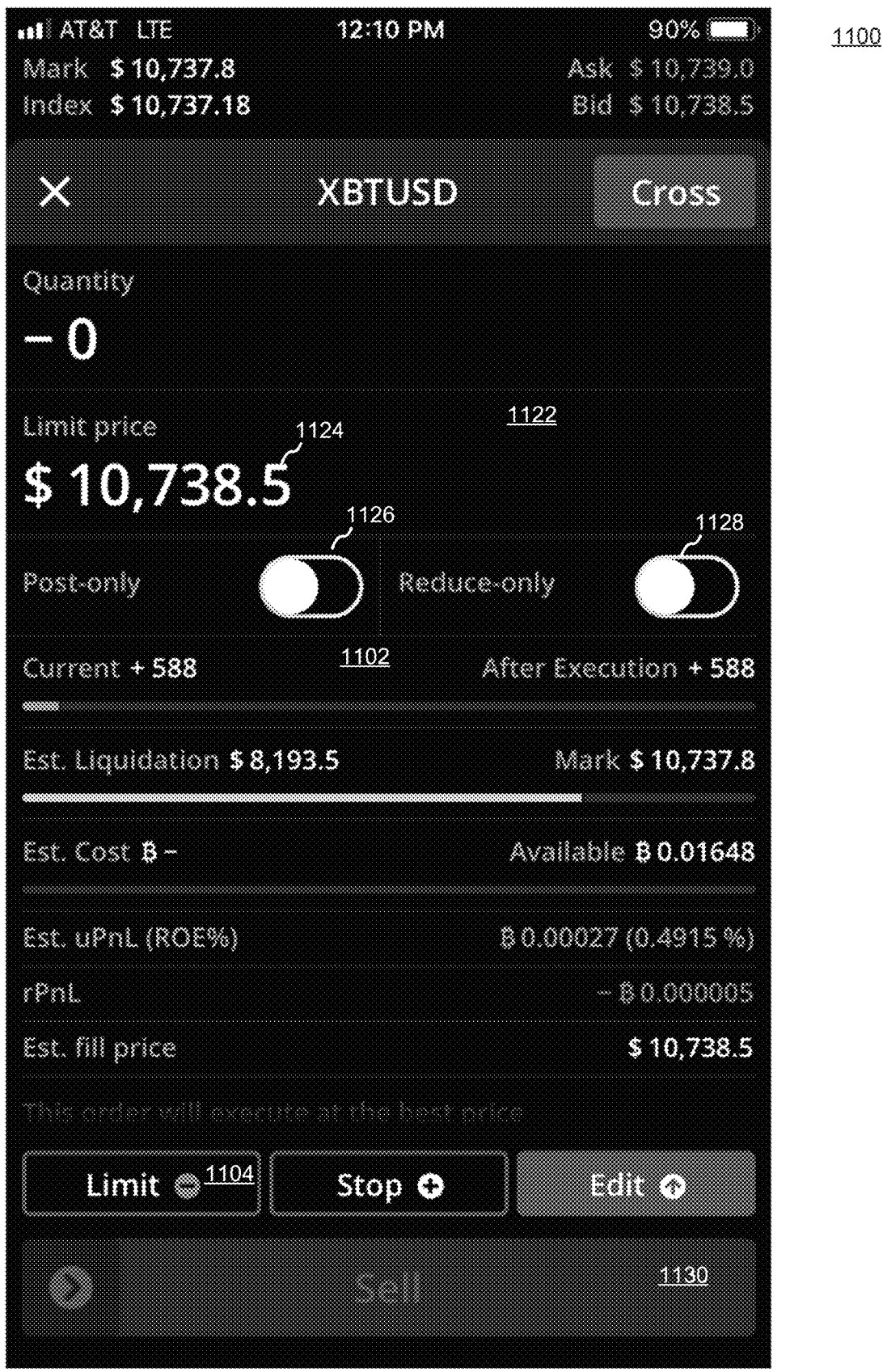
FIG. 11D illustrates an order interface of a mobile digital currency exchange system, in accordance with various embodiments.

In response to receiving an interaction with the limit setting 1104 button, the system may display a limit settings frame 1122 shown in FIG. 11D. The limit setting 1104 button may display an icon indicating expansion of the limit settings frame 1122. The limit settings frame 1122 may be configured to receive order flow inputs used to define a limit order. The limit settings frame 1122 may receive and display order flow inputs such as a limit price 1124, a post-only condition switch 1126, and a reduce-only condition switch 1128. In response to receiving an interaction with the post-only condition switch 1126, the system may set a post-only condition of the order. In this regard, the system may generate a platform command to the trading platform 200 to accept the associated order only if it will not immediately be executed by the trading platform 200. In response to receiving an interaction with the reduce-only condition switch 1128, the system may set a reduce-only condition of the order.

Figure 11E:
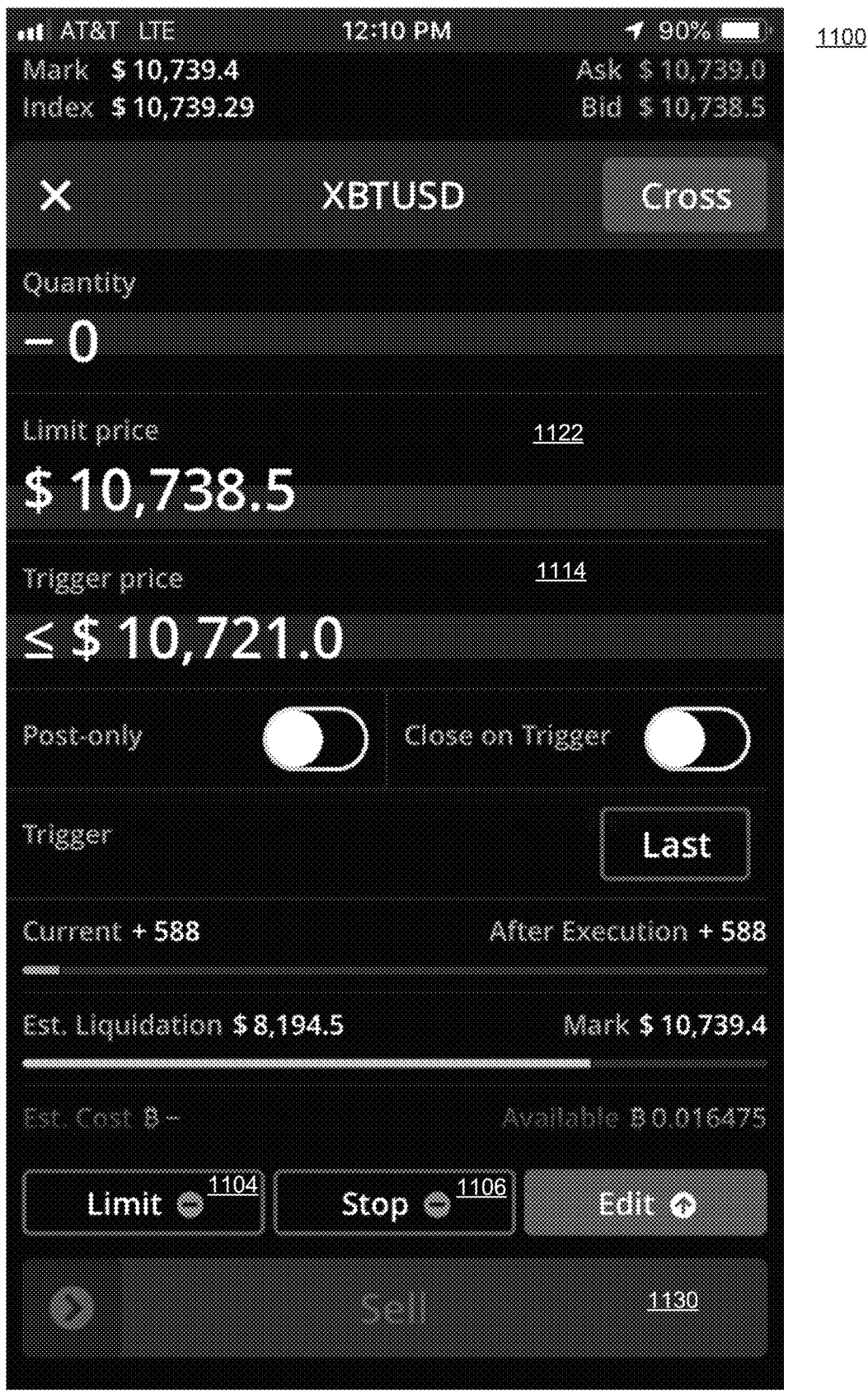
FIG. 11E illustrates an order interface of a mobile digital currency exchange system, in accordance with various embodiments.
Figure 11F:
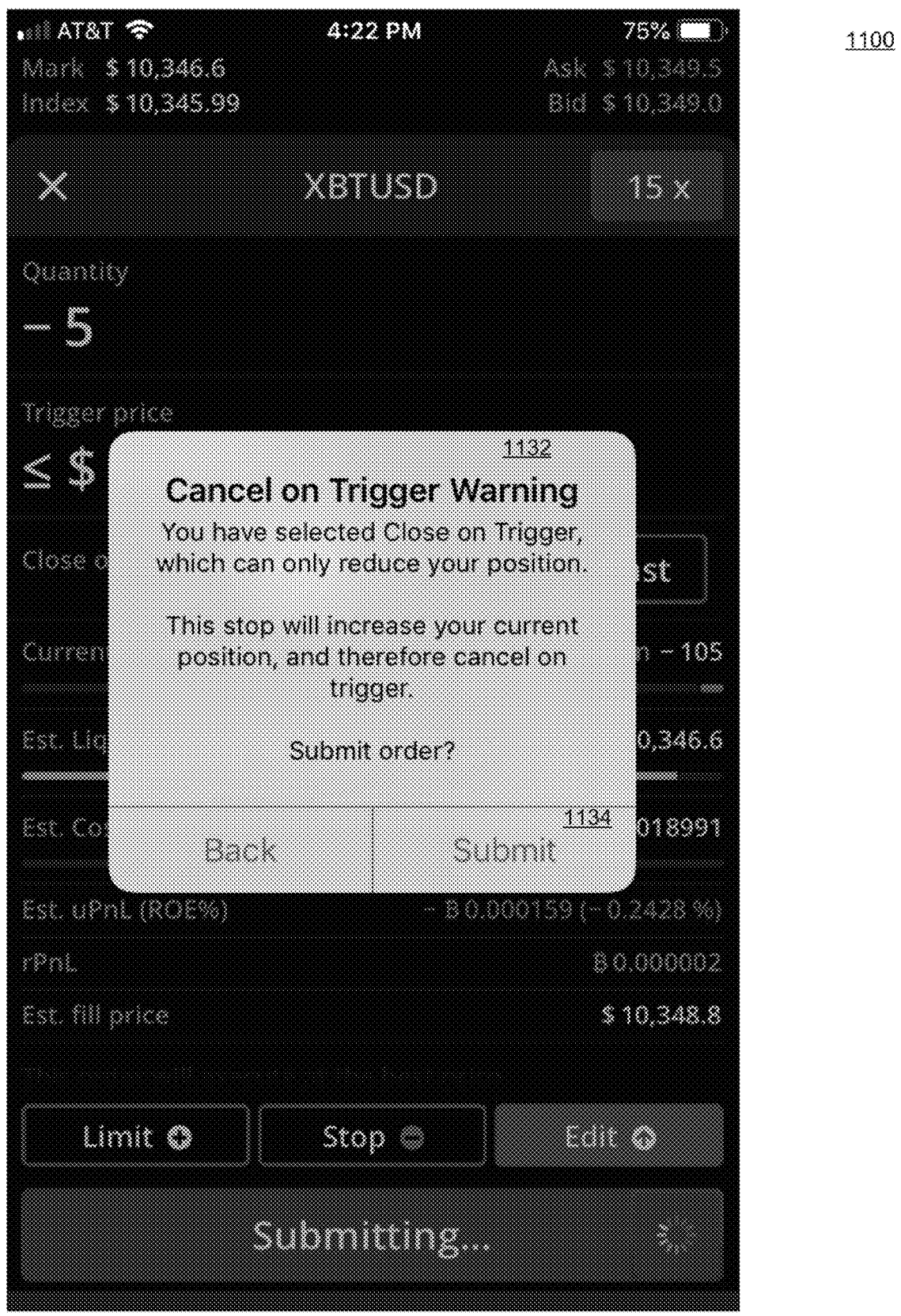
FIG. 11F illustrates an order interface of a mobile digital currency exchange system, in accordance with various embodiments.

In various embodiments and as shown in FIG. 11E, the system may display both the stop settings frame 1114 and the limit settings frame 1122 simultaneously in response to receiving interactions with both the limit setting 1104 button and stop setting 1106 button. In various embodiments, the order interface 1100 may prompt for a confirmation action and, in response to receiving the confirmation action, may generate the platform command based on the received order flow inputs. For example, order interface 1100 may display a 'sell' or 'buy' slider 1130 (which may depend on the interactions with the buy button 910 and sell button 912) and may receive an interaction such as dragging the slider across the order interface 1100. In response to receiving the confirmation action, the system may display a 'submitting' notification in the slider 1130 as illustrated in FIG. 11F. In various embodiments, the system may generate one or more alerts 1132 in response to receiving the confirmation action and may prompt for a re-confirmation input. The system may receive the re-confirmation input, for example, via an interaction with a 'submit' button 1134.

Figure 12A:
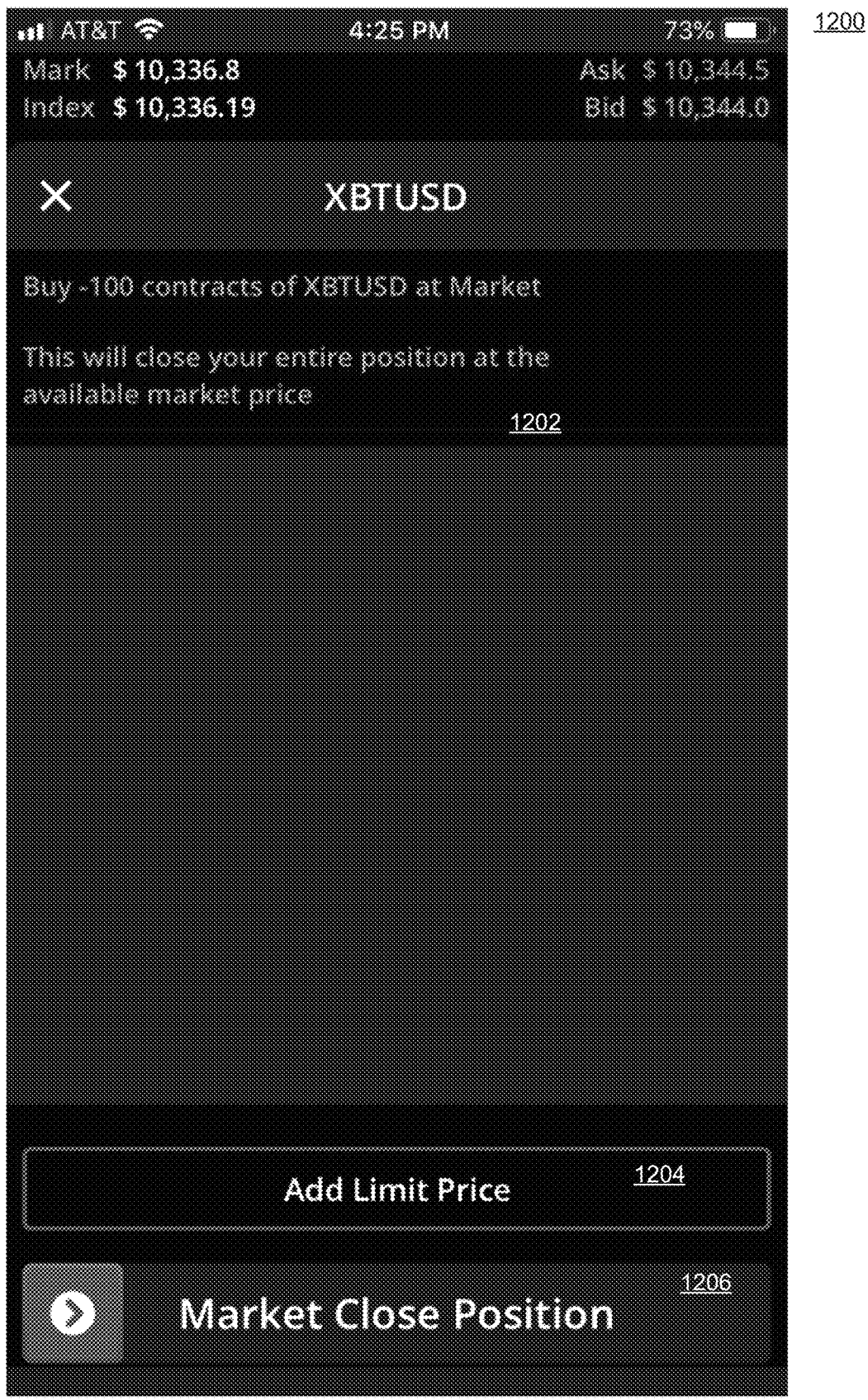
FIG. 12A illustrates a close position interface of a mobile digital currency exchange system, in accordance with various embodiments.
Figure 12B:
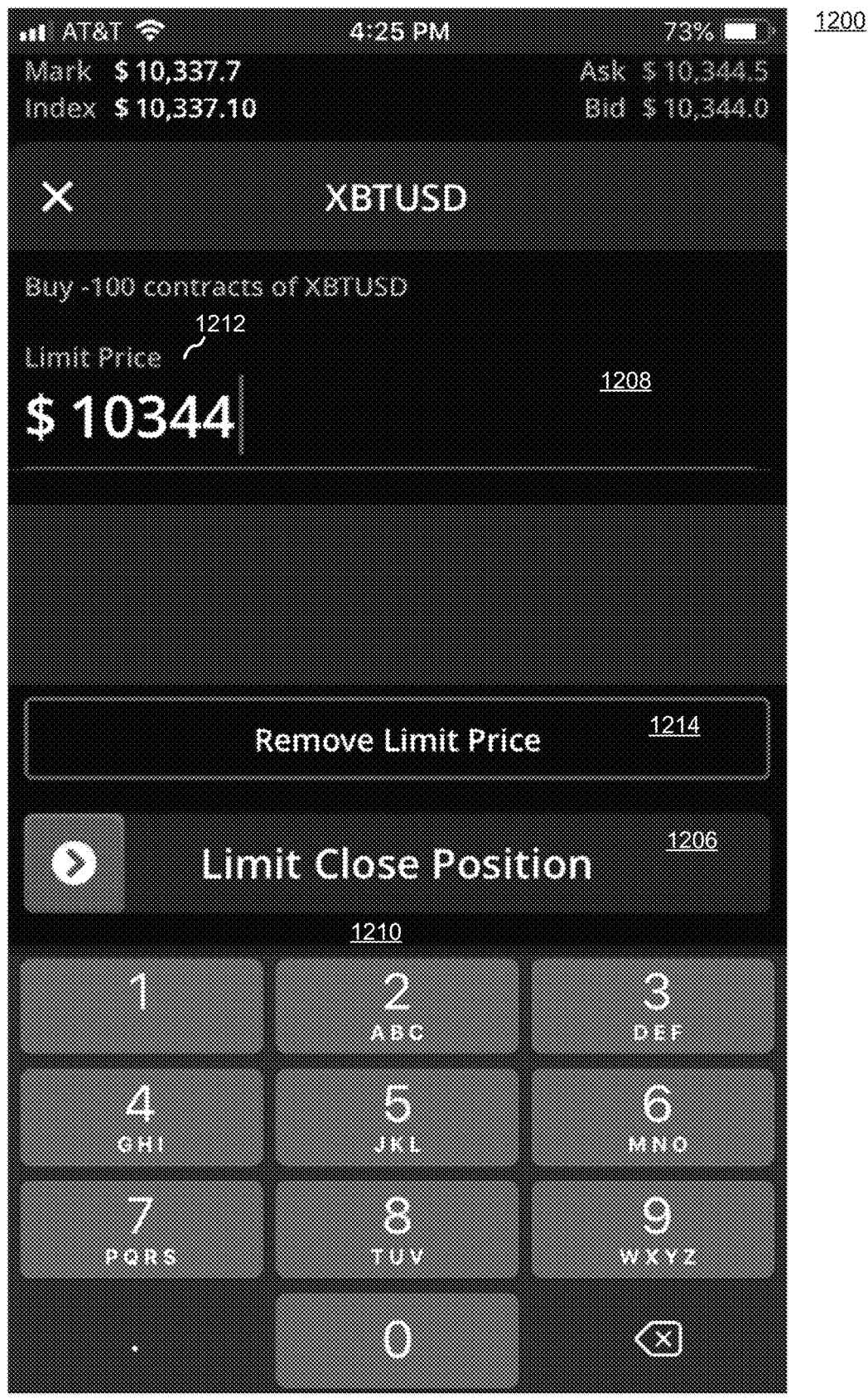
FIG. 12B illustrates a close position interface of a mobile digital currency exchange system, in accordance with various embodiments.

In various embodiments and with additional reference to FIGS. 12A and 12B, a close position interface 1200 of system 100 is illustrated. The close position interface 1200 may be configured to receive order flow inputs used to close an entire position for a selected currency pair. In this regard, the close position interface is configured to generate a platform command set controlling the trading platform to execute a plurality of transactions closing the associated positions. In various embodiments, the close position interface 1200 may display a notifications frame 1202 which describes the platform command set. The close position interface 1200 may include an add limit price button 1204. In response to receiving an interaction with the add limit price button 1204, the system may display a limit settings frame 1208 configured to receive a limit price input (displayed in field 1212). The system may receive the limit price input via a keypad 1210 which may be displayed in response to receiving an interaction with the field 1212. In various embodiments, the system may remove the limit price and revert to a market price order in response to an interaction with the remove limit price button 1214. In various embodiments, the close position interface 1200 may prompt for a confirmation action and, in response to receiving the confirmation action, may generate the platform command set based on the received order flow inputs. For example, close position interface 1200 may display a slider 1206 and may receive an interaction such as dragging the slider across the close position interface 1200.

Figure 13A:
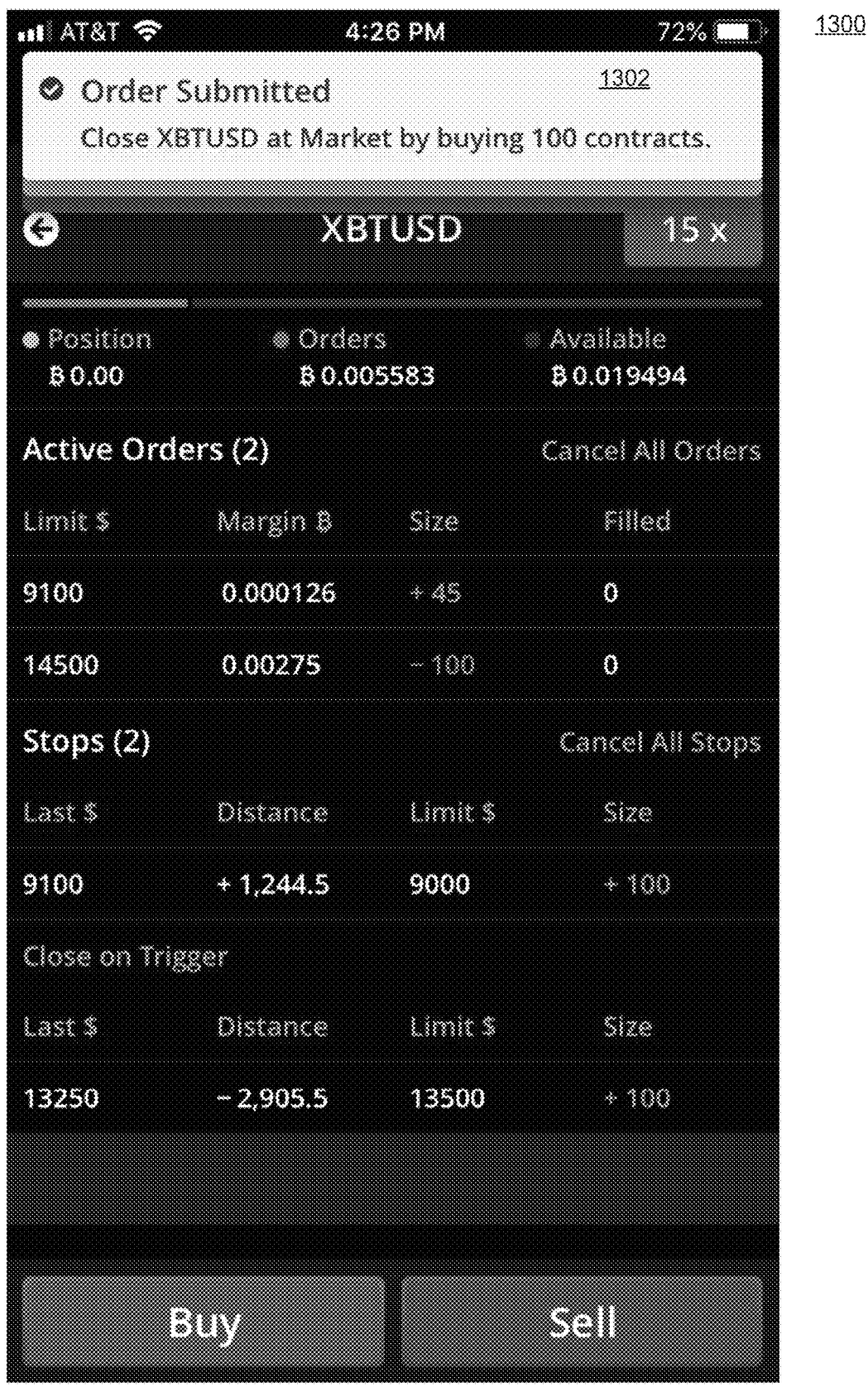
FIG. 13A illustrates an order reporting display of a mobile digital currency exchange system, in accordance with various embodiments.
Figure 13B:
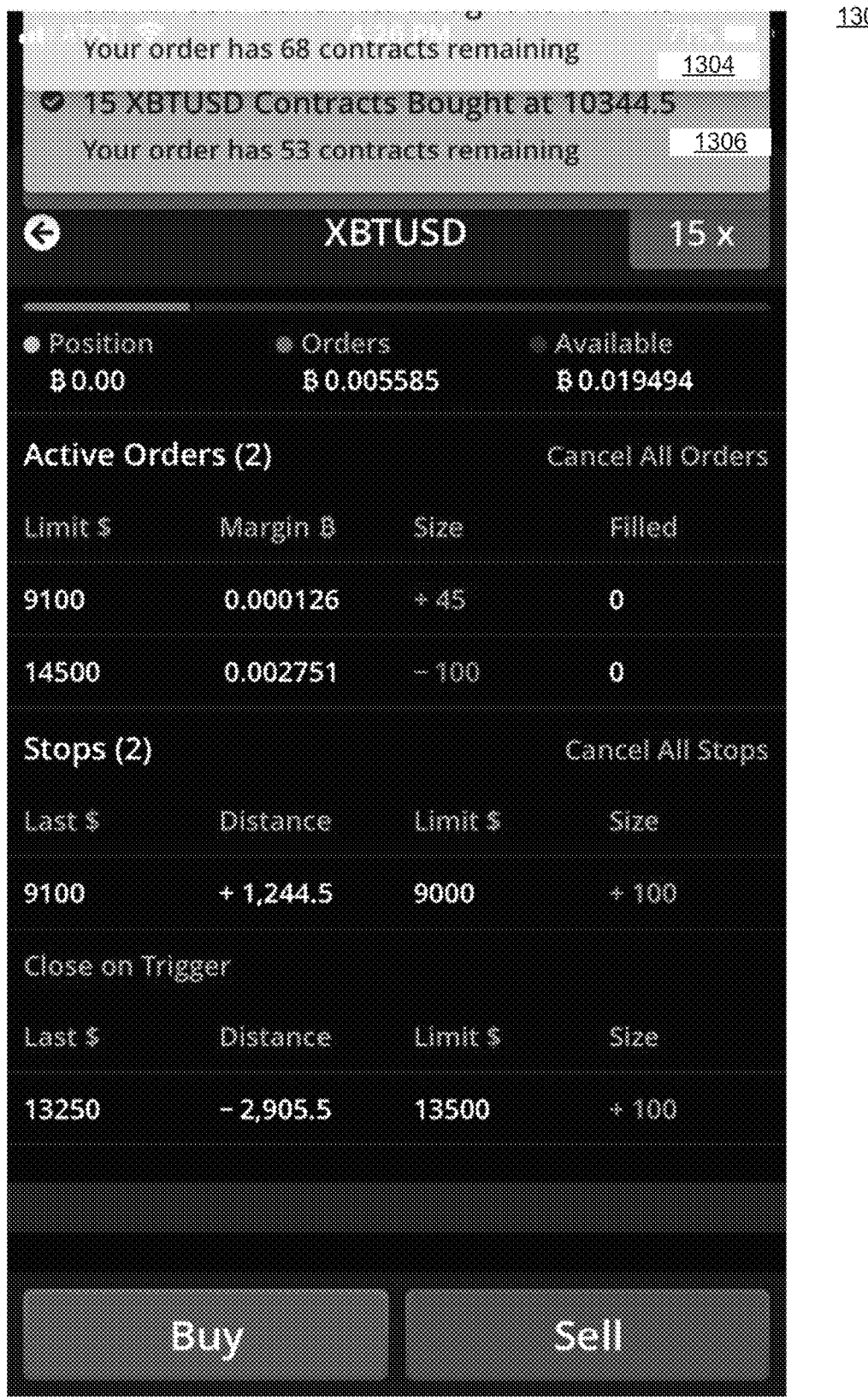
FIG. 13B illustrates an order reporting display of a mobile digital currency exchange system, in accordance with various embodiments.
Figure 13C:
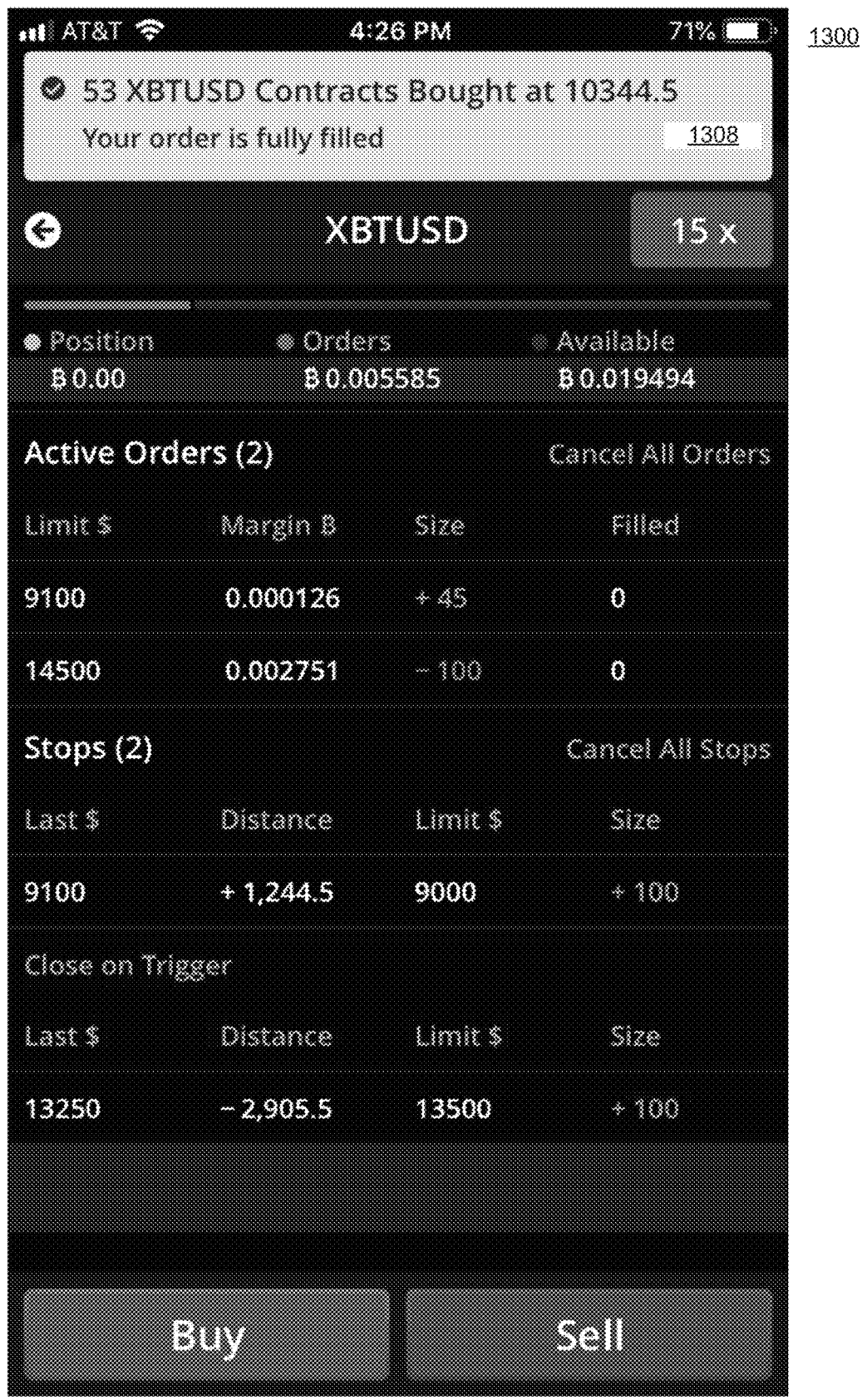
FIG. 13C illustrates an order reporting display of a mobile digital currency exchange system, in accordance with various embodiments.

In various embodiments and with additional reference to FIGS. 13A, 13B, and 13C an order reporting display 1300 of system 100 is illustrated. The order reporting display 1300 may comprise various framed notices which fly in from the top of a screen of the user device 104. For example, an order submitted notification 1302 may include data or a summary of the submitted order such as, 'close XBTUSD at Market by buying 100 contracts'. As shown in FIG. 13B a second execution notice 1304 is flying in over a first execution notice 1306. The execution notices (1304, 1306) may include data about the fill status of the associated order, e.g., '68 contracts remaining' or '53 contracts remaining'. As shown in FIG. 13C, a fully filled notice 1308 may display details on a completed filled order such as price and quantity, e.g. '53 XBTUSD contracts bought at 10344.5'

Figure 14A:
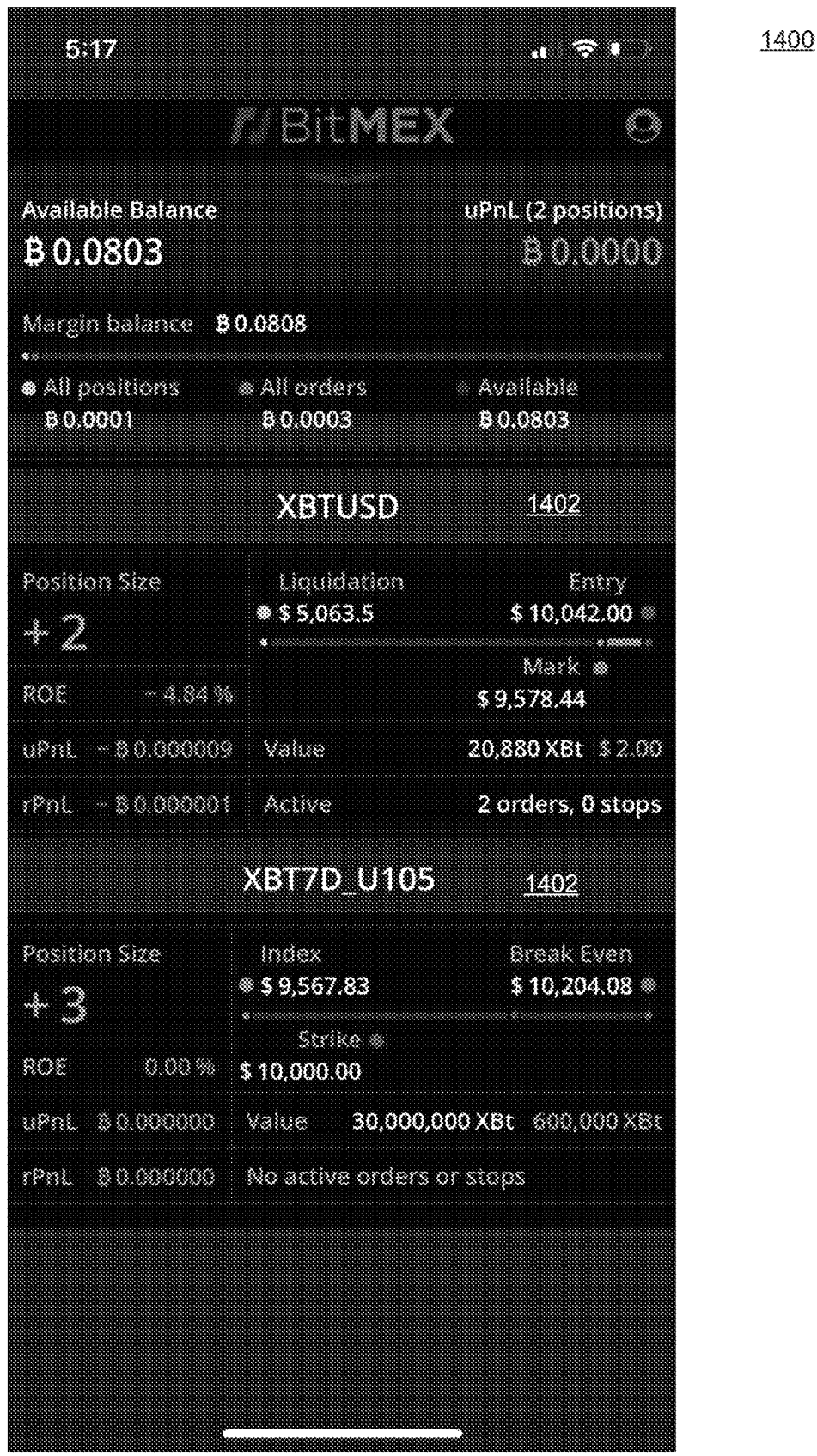
FIG. 14A illustrates a portfolio view page of a mobile digital currency exchange system, in accordance with various embodiments.
Figure 14B:
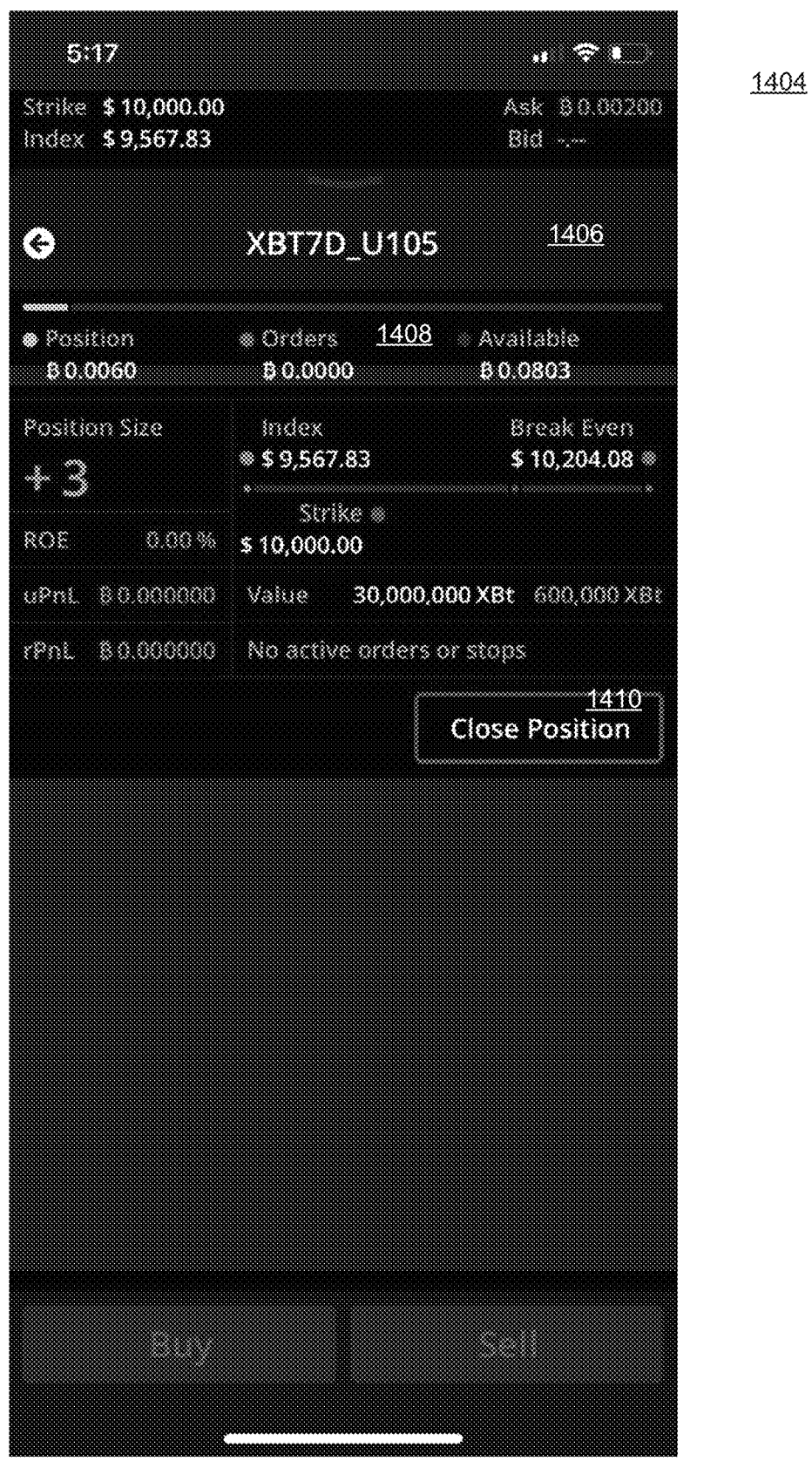
FIG. 14B illustrates a portfolio details view page of a mobile digital currency exchange system, in accordance with various embodiments.
Figure 15A:
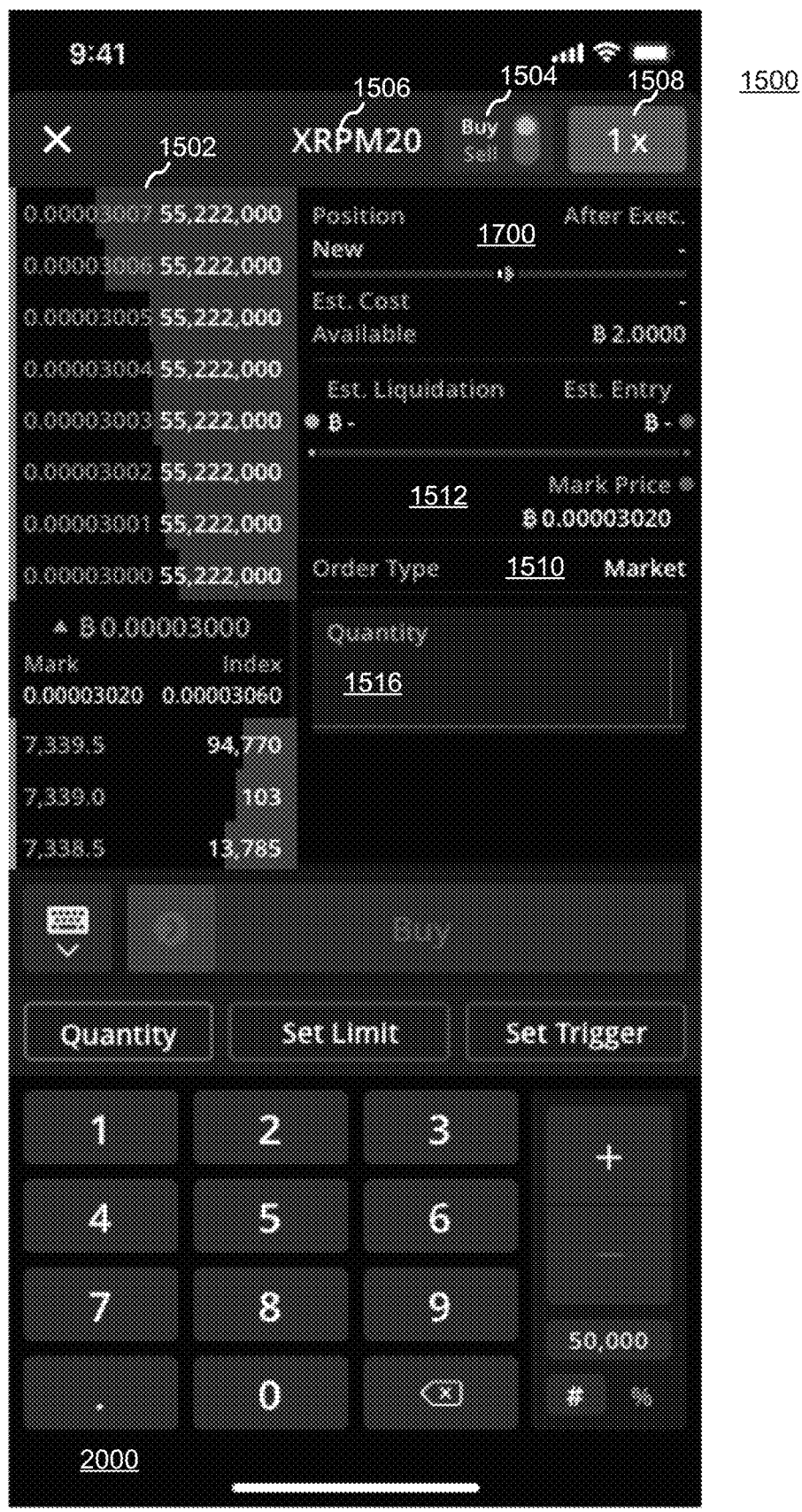
FIG. 15A illustrates an advanced long position interface of a mobile digital currency exchange system, in accordance with various embodiments.
Figure 15B:
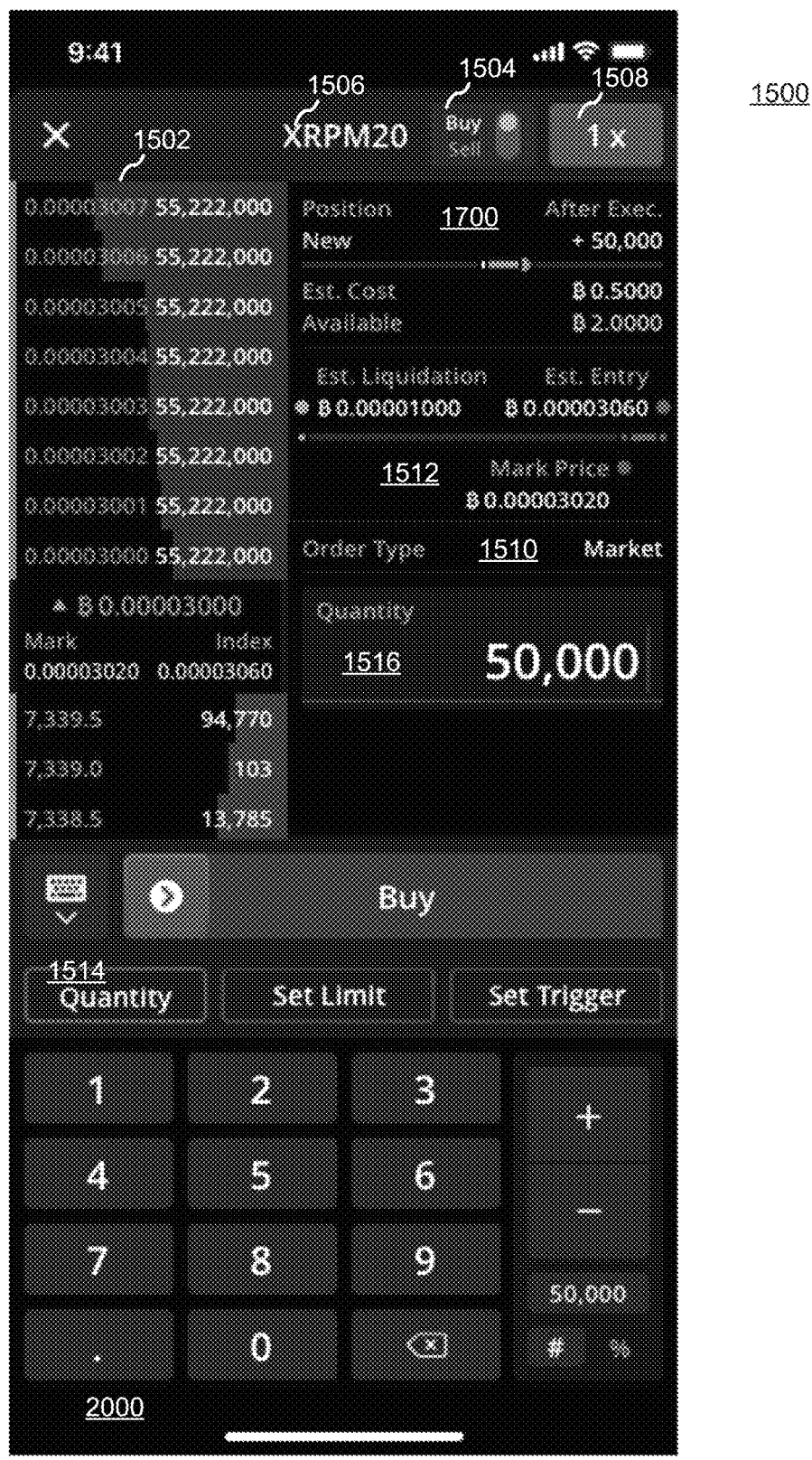
FIG. 15B illustrates an advanced long position interface of a mobile digital currency exchange system, in accordance with various embodiments.
Figure 15C:
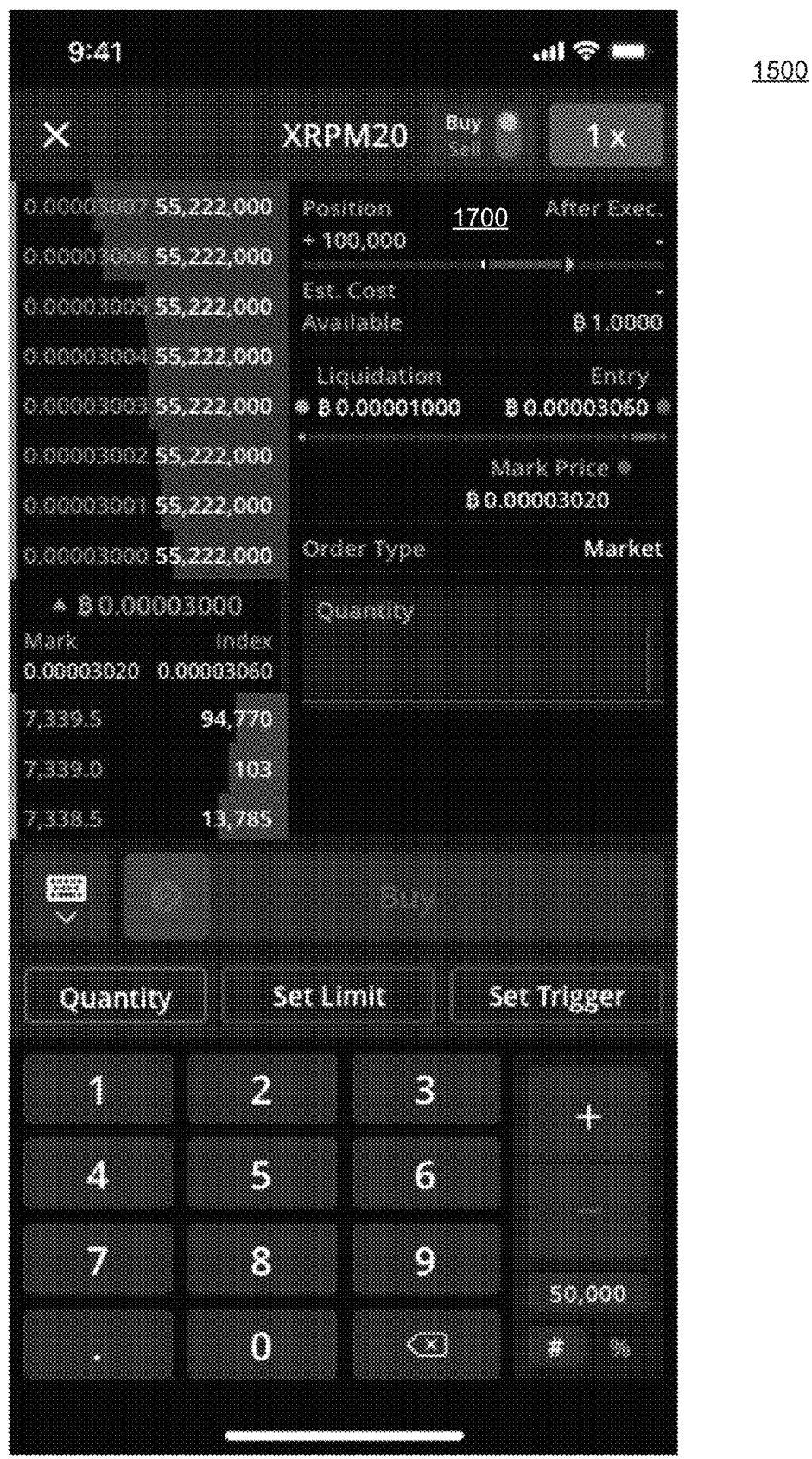
FIG. 15C illustrates editing a long position in the advanced long interface of a mobile digital currency exchange system, in accordance with various embodiments.
Figure 15D:
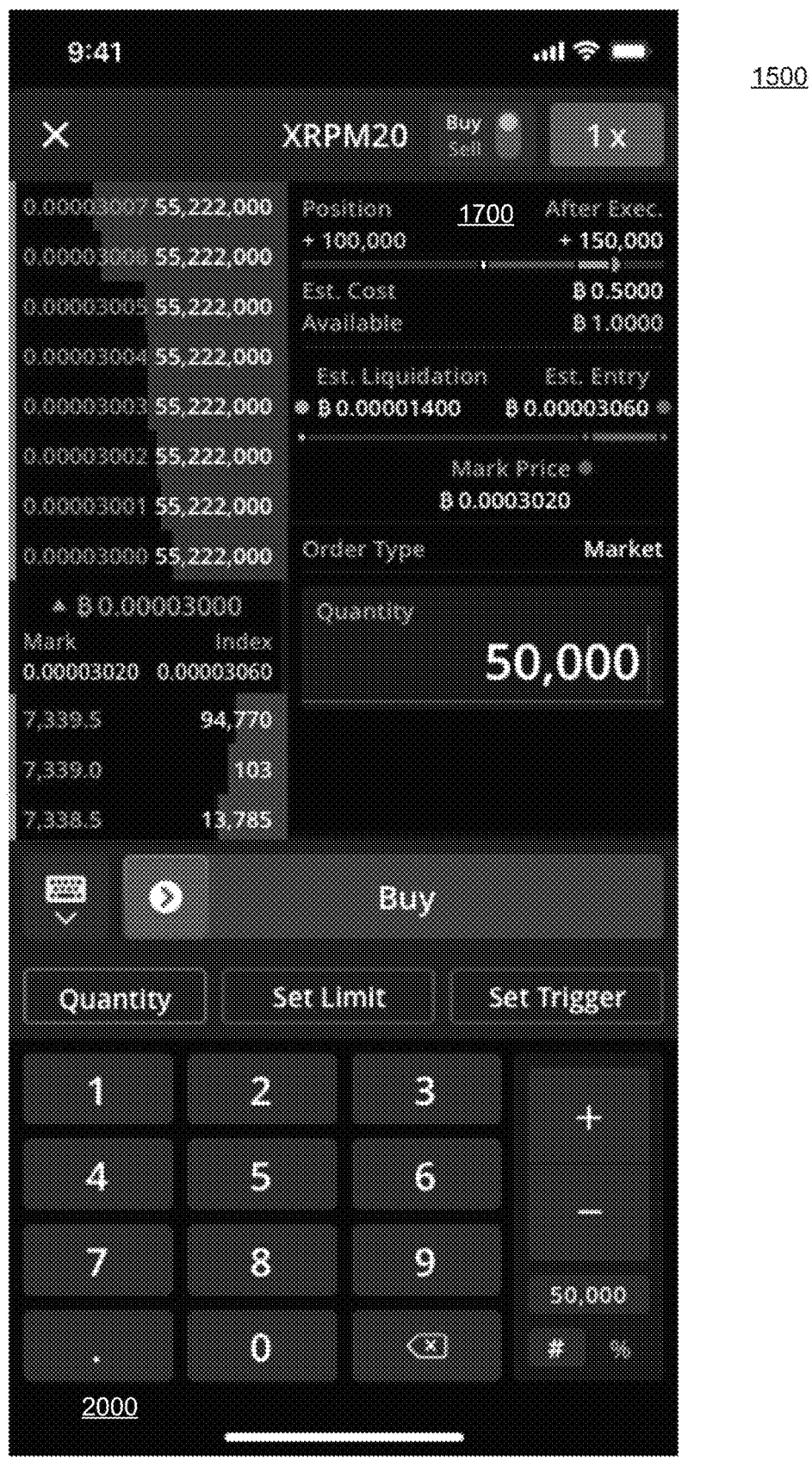
FIG. 15D illustrates editing a long position in the advanced long interface of a mobile digital currency exchange system, in accordance with various embodiments.
Figure 16A:
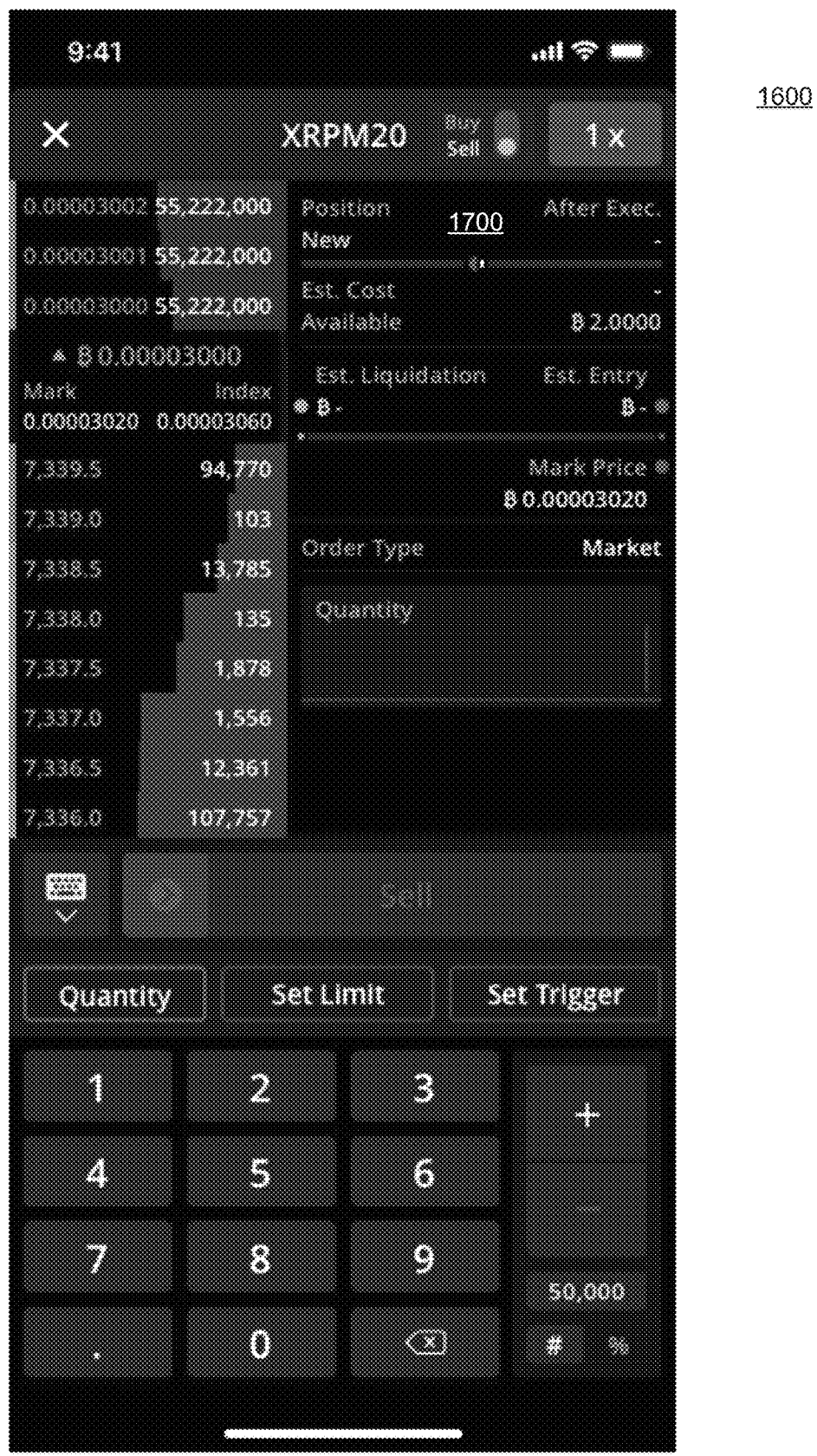
FIG. 16A illustrates an advanced short position interface of a mobile digital currency exchange system, in accordance with various embodiments.
Figure 16B:
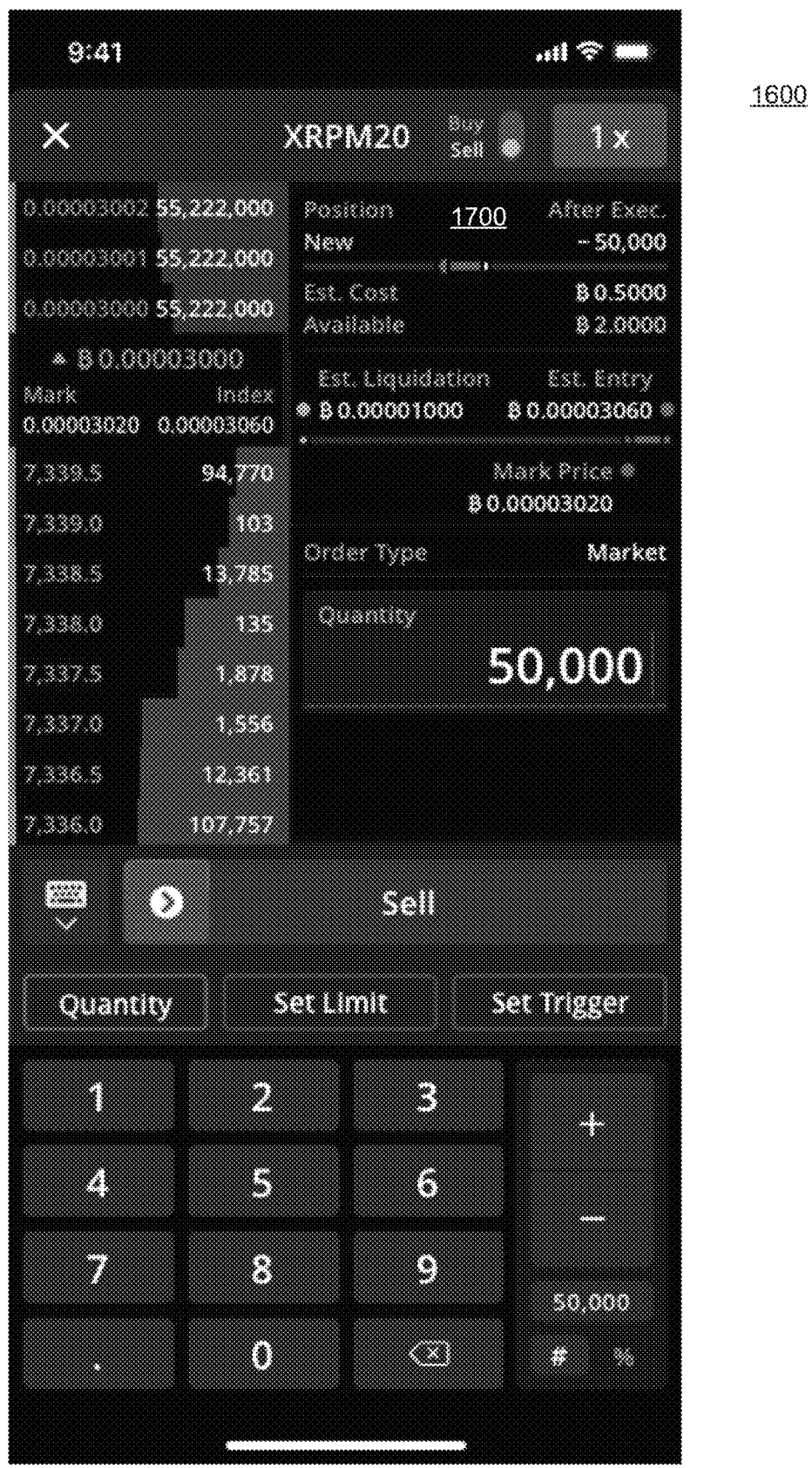
FIG. 16B illustrates an advanced short position interface of a mobile digital currency exchange system, in accordance with various embodiments.
Figure 16C:
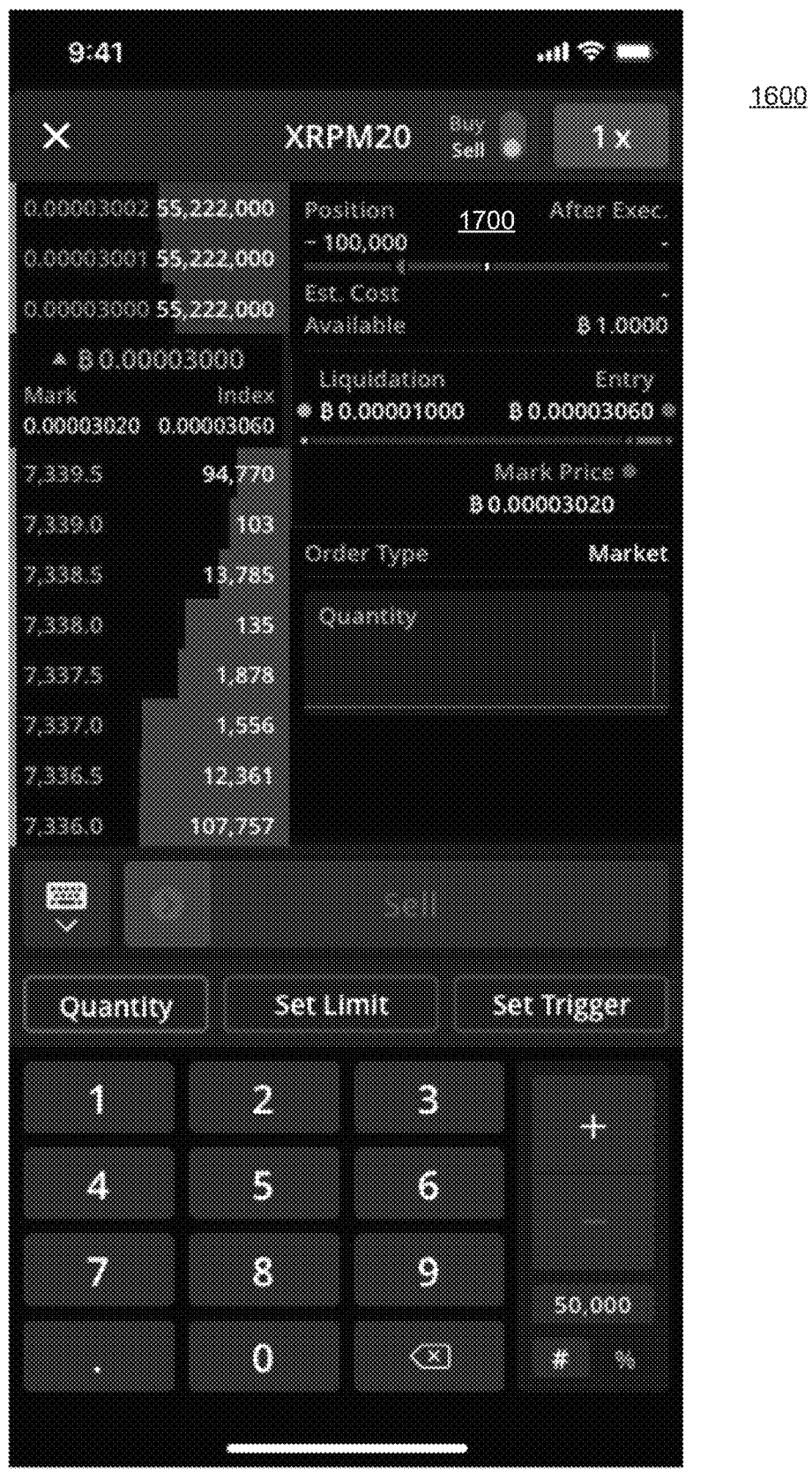
FIG. 16C illustrates editing a short position in the advanced short interface of a mobile digital currency exchange system, in accordance with various embodiments.
Figure 16D:
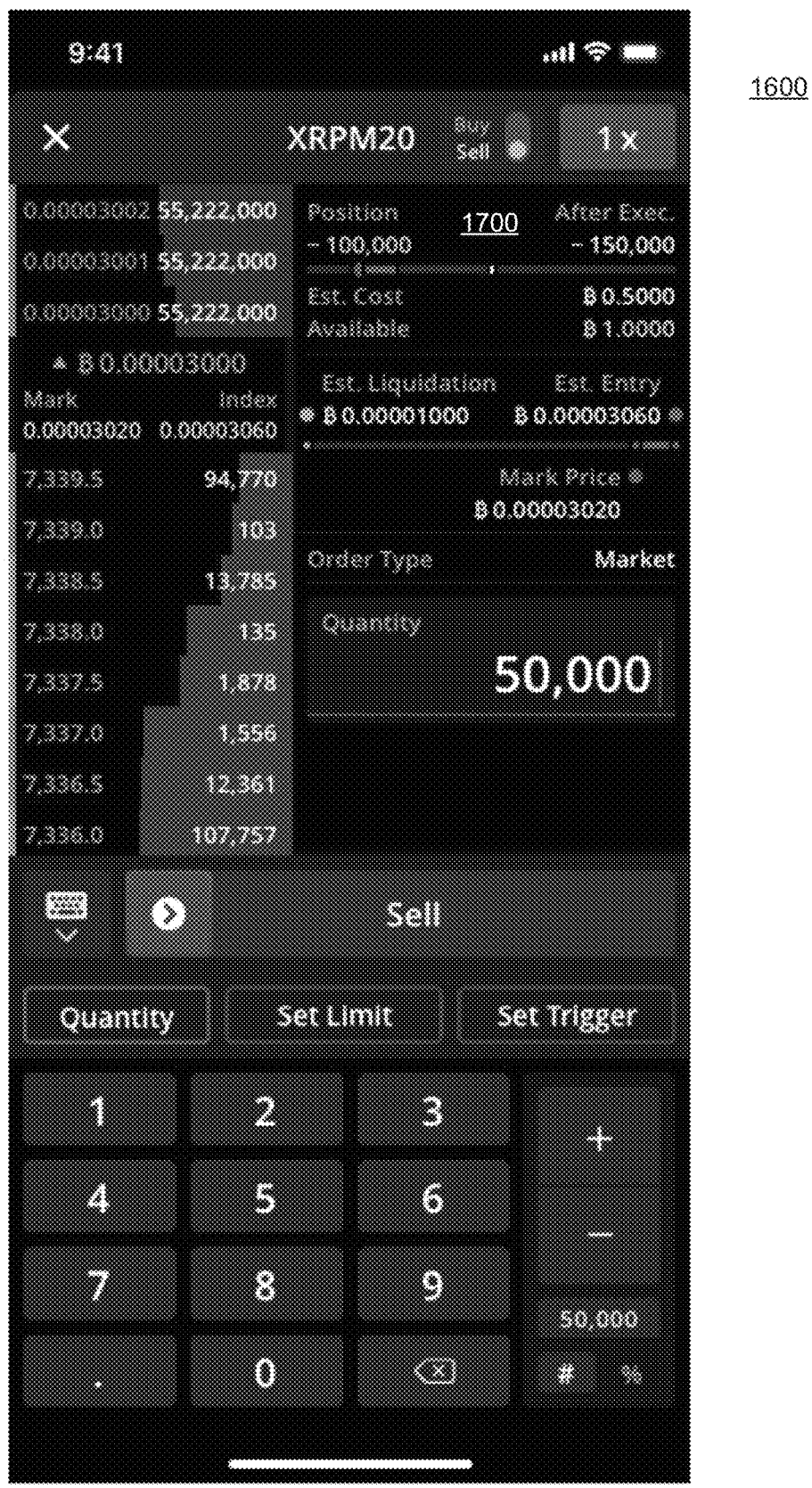
FIG. 16D illustrates editing a short position in the advanced short interface of a mobile digital currency exchange system, in accordance with various embodiments.
Figure 17:
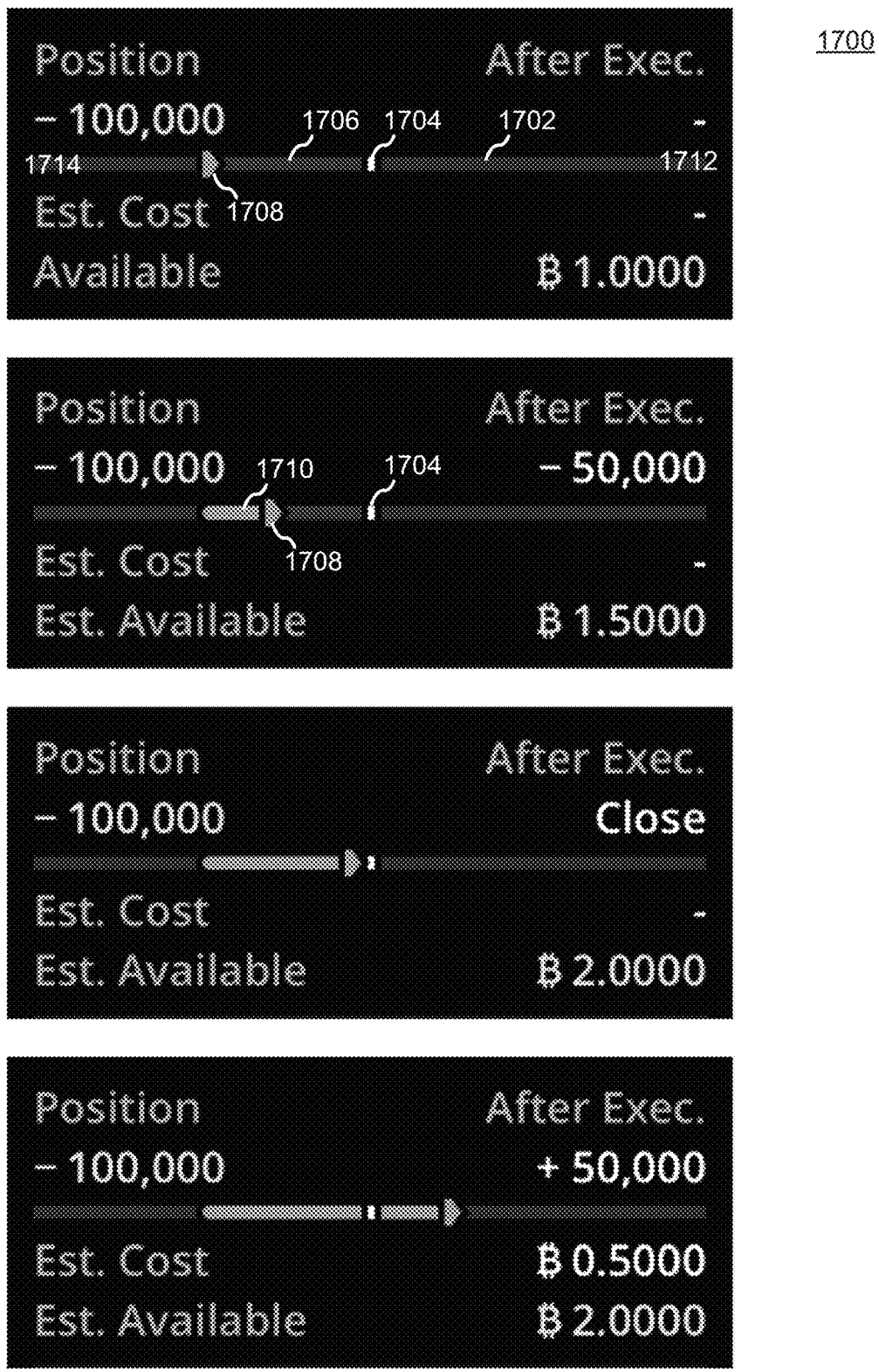
FIG. 17 illustrates details of a dynamic margin position indicator in a mobile digital currency exchange system, in accordance with various embodiments.
Figure 18A:
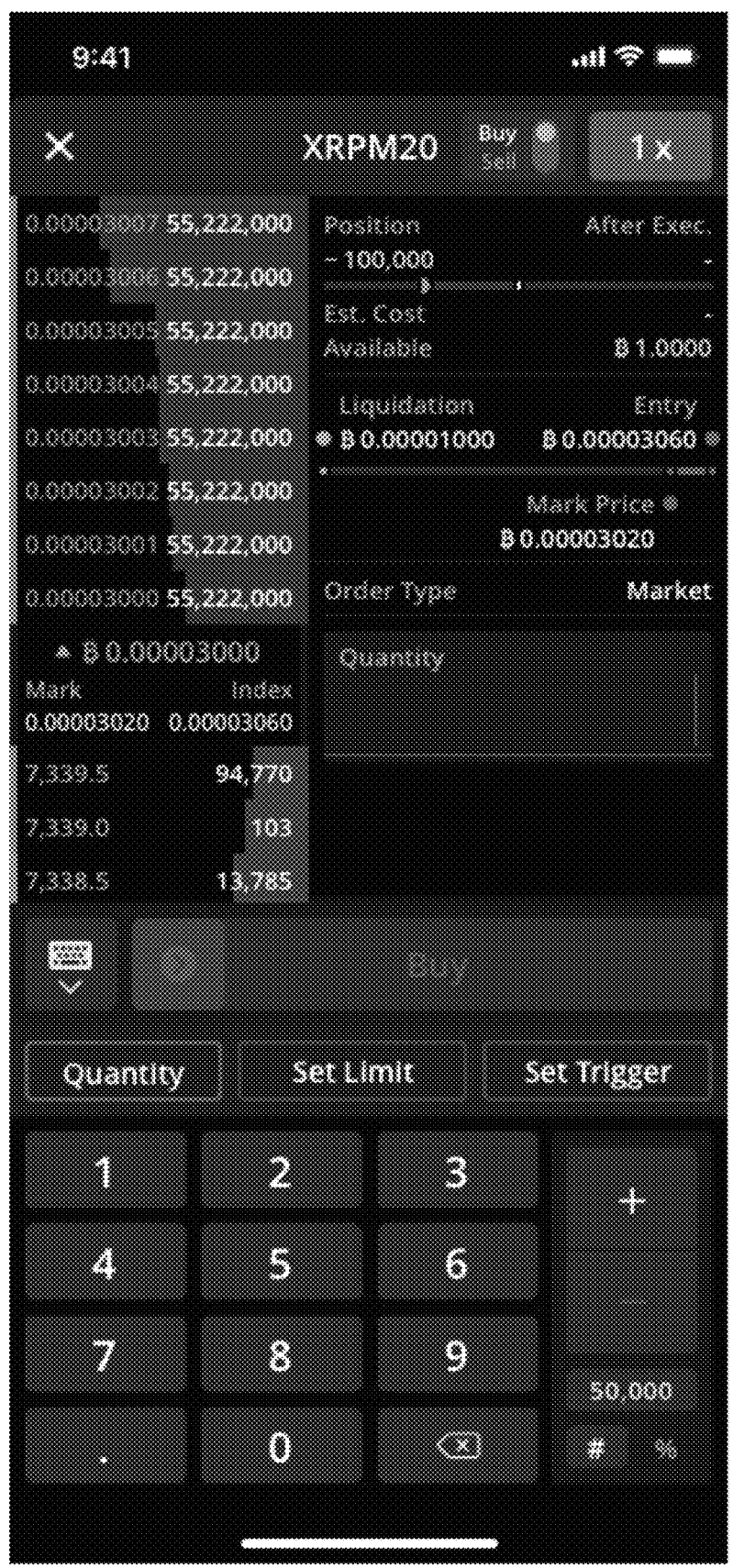
FIG. 18A illustrates operation of a dynamic margin position indicator in editing a short position of the advanced short interface of a mobile digital currency exchange system, in accordance with various embodiments.
Figure 18B:
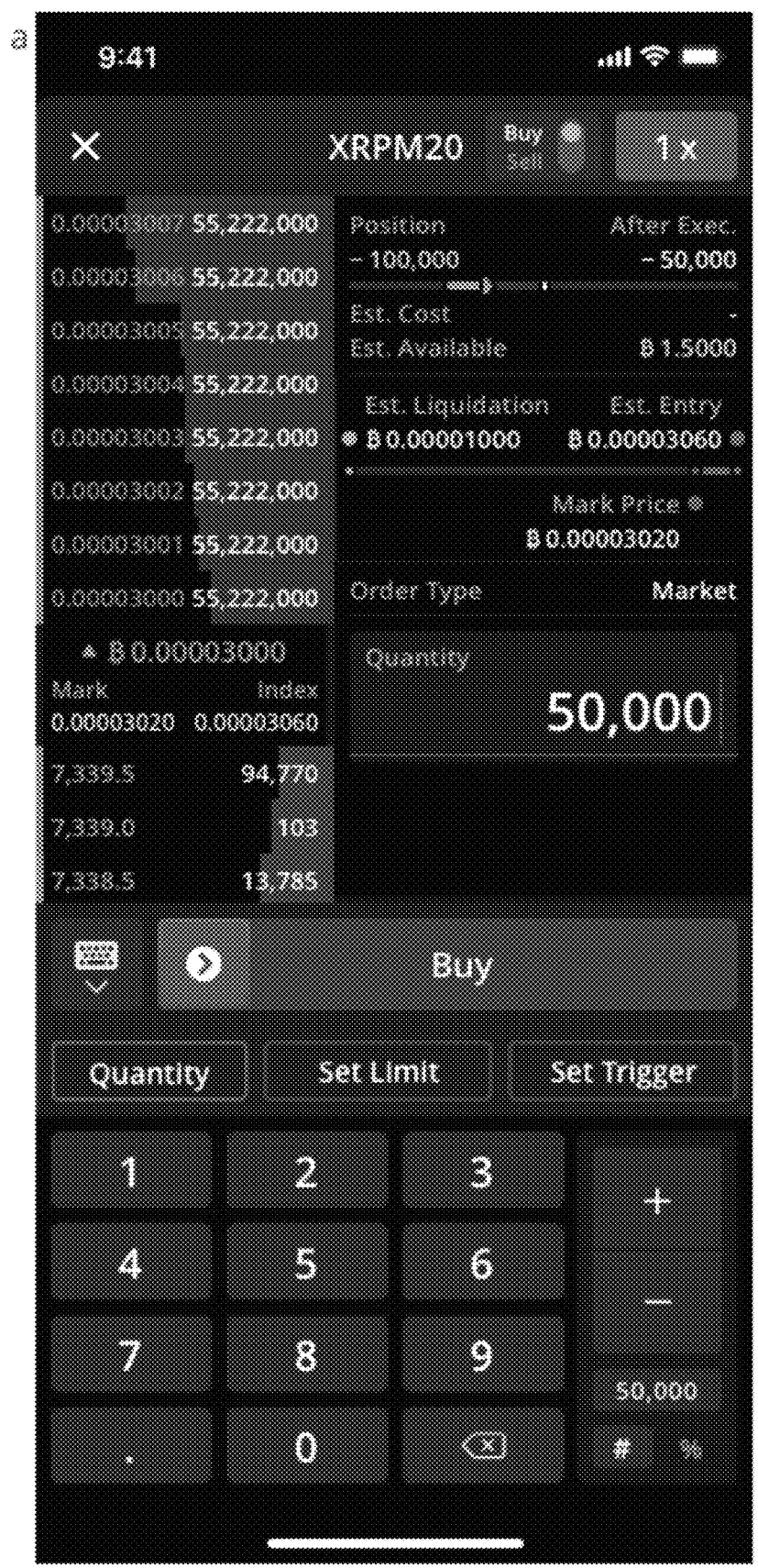
FIG. 18B illustrates operation of a dynamic margin position indicator in reducing a short position of the advanced short interface of a mobile digital currency exchange system, in accordance with various embodiments.
Figure 18C:
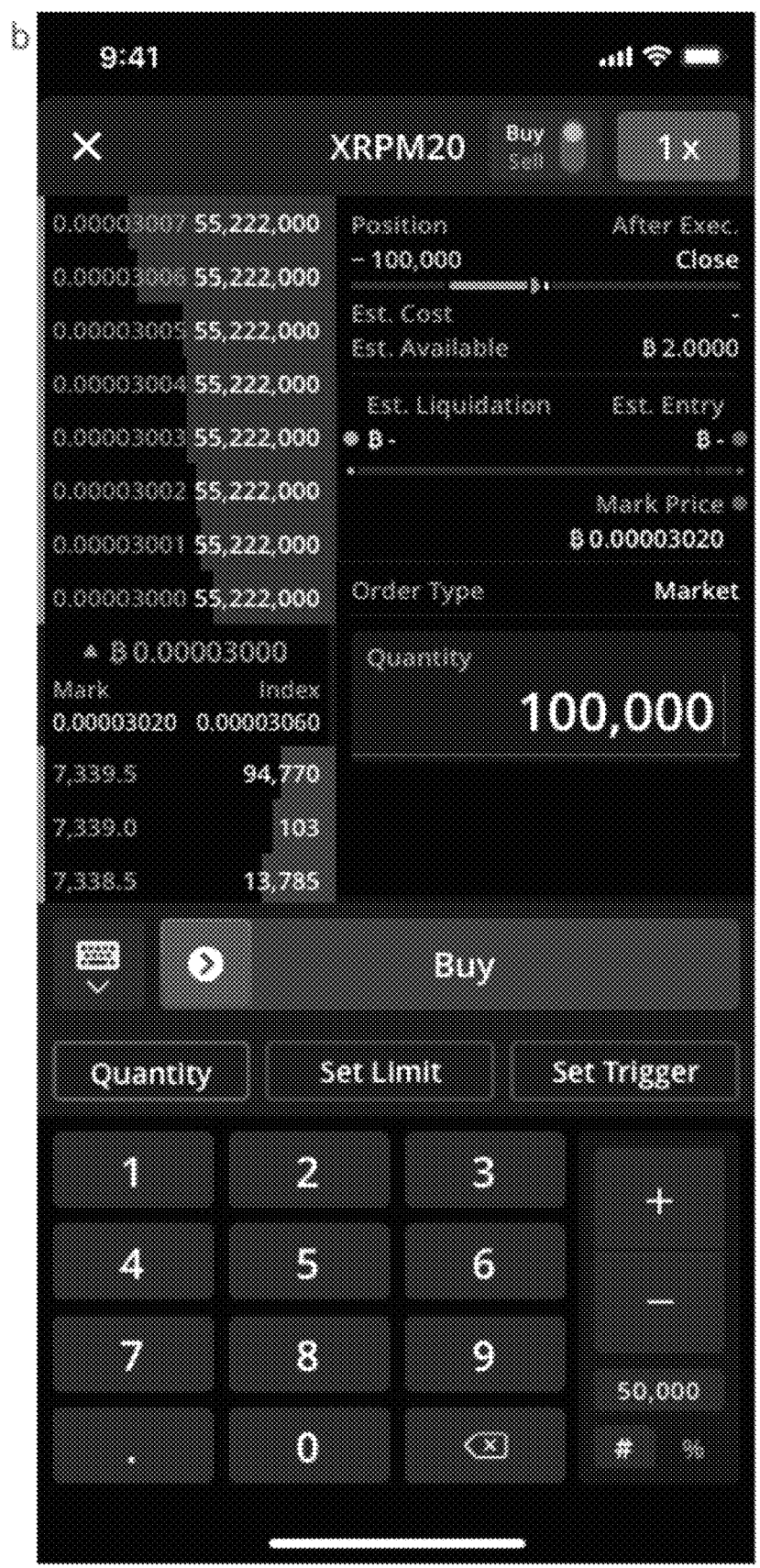
FIG. 18C illustrates operation of a dynamic margin position indicator in closing a short position of the advanced short interface of a mobile digital currency exchange system, in accordance with various embodiments.
Figure 18D:
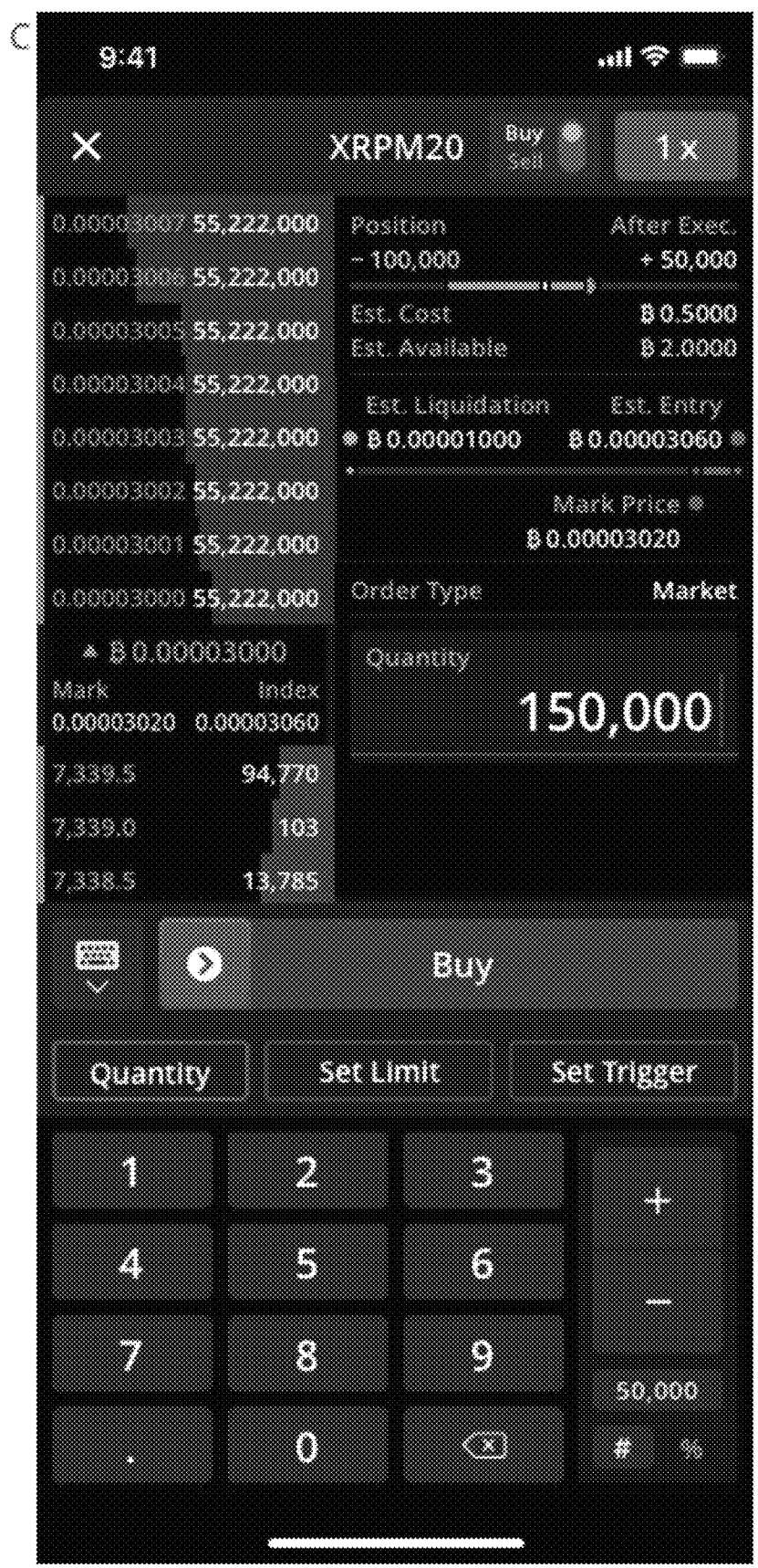
FIG. 18D illustrates operation of a dynamic margin position indicator in reversing a short position of the advanced short interface of a mobile digital currency exchange system, in accordance with various embodiments.
Figure 19A:
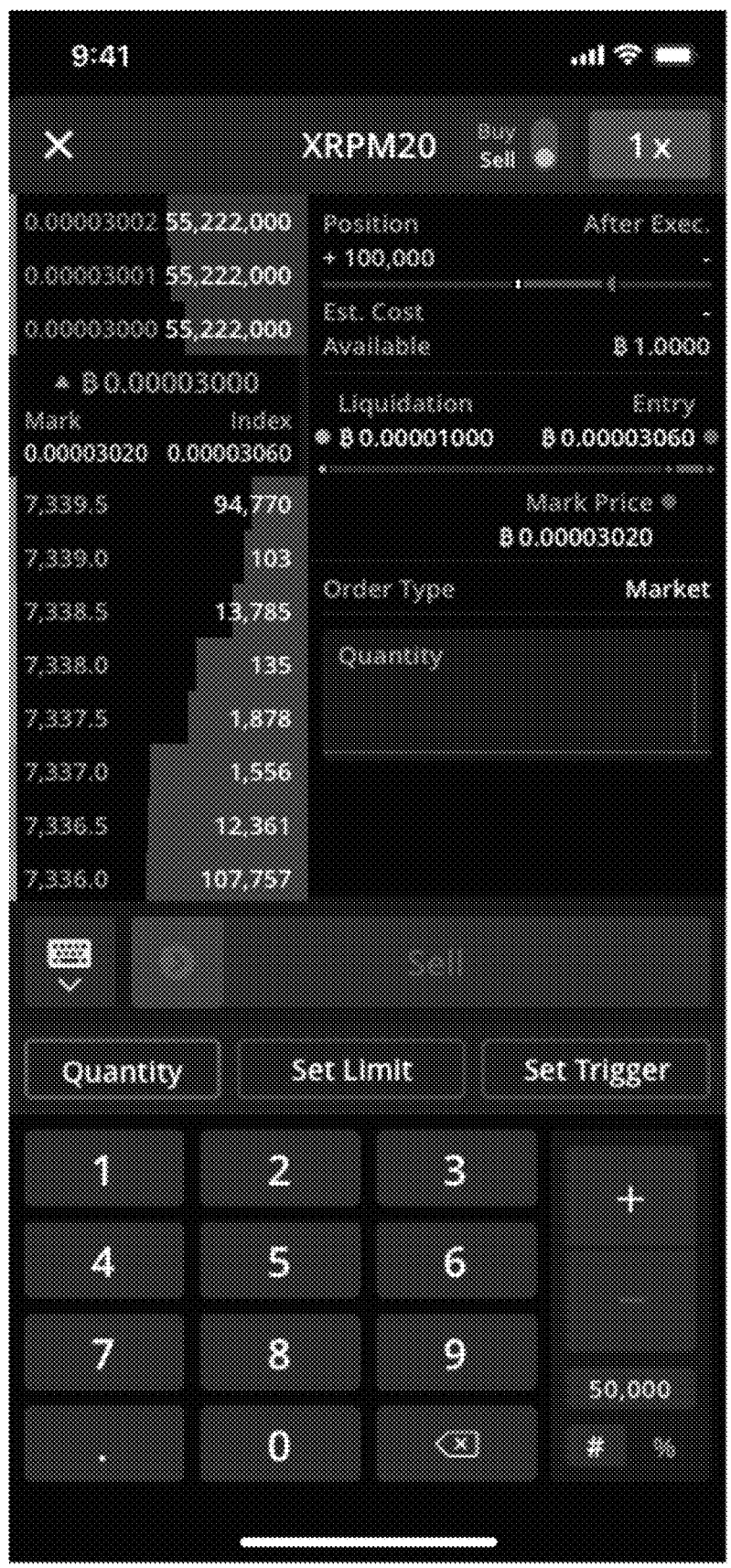
FIG. 19A illustrates operation of a dynamic margin position indicator in editing a long position of the advanced long interface of a mobile digital currency exchange system, in accordance with various embodiments.
Figure 19B:
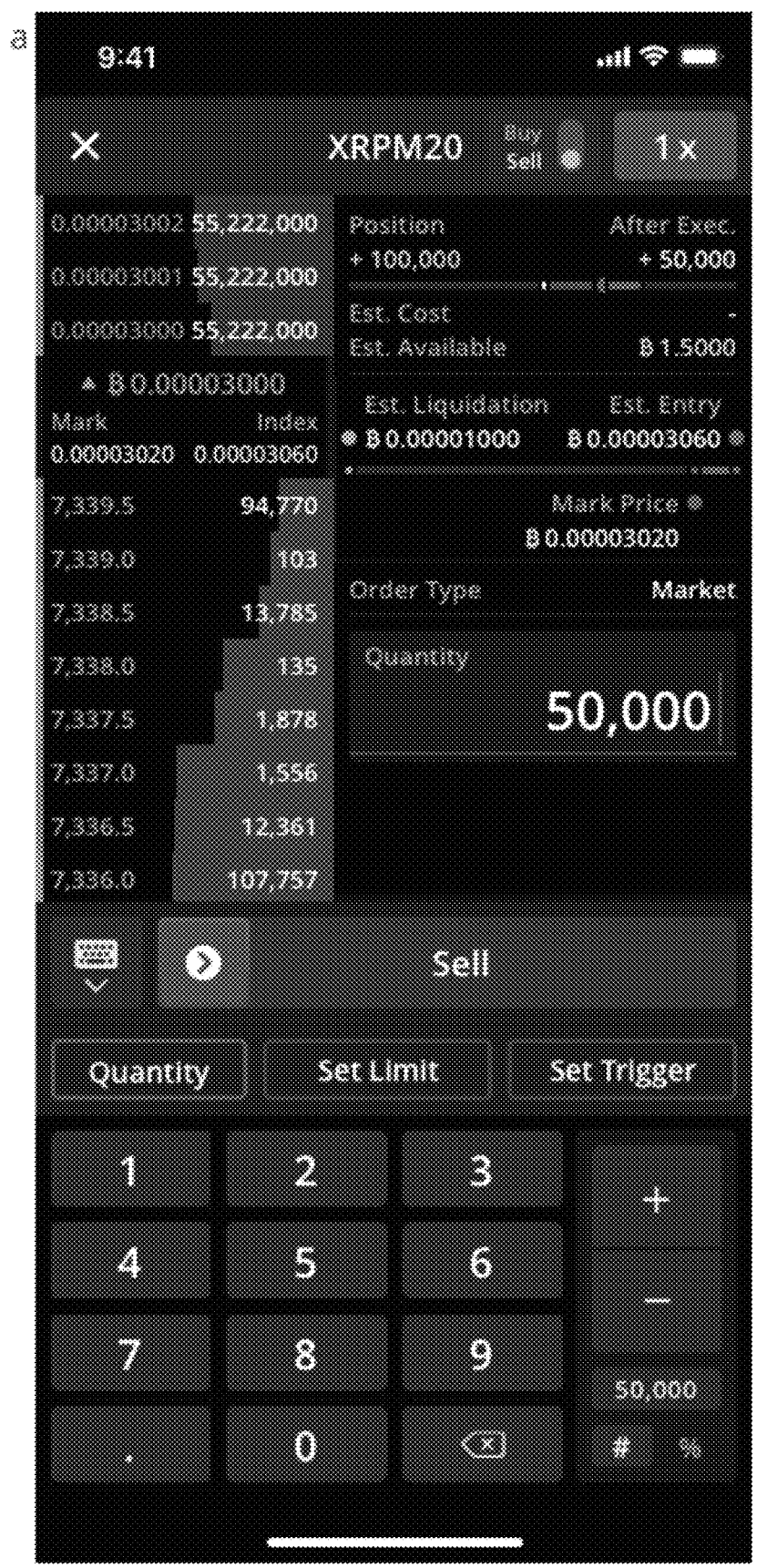
FIG. 19B illustrates operation of a dynamic margin position indicator in reducing a long position of the advanced long interface of a mobile digital currency exchange system, in accordance with various embodiments.
Figure 19C:
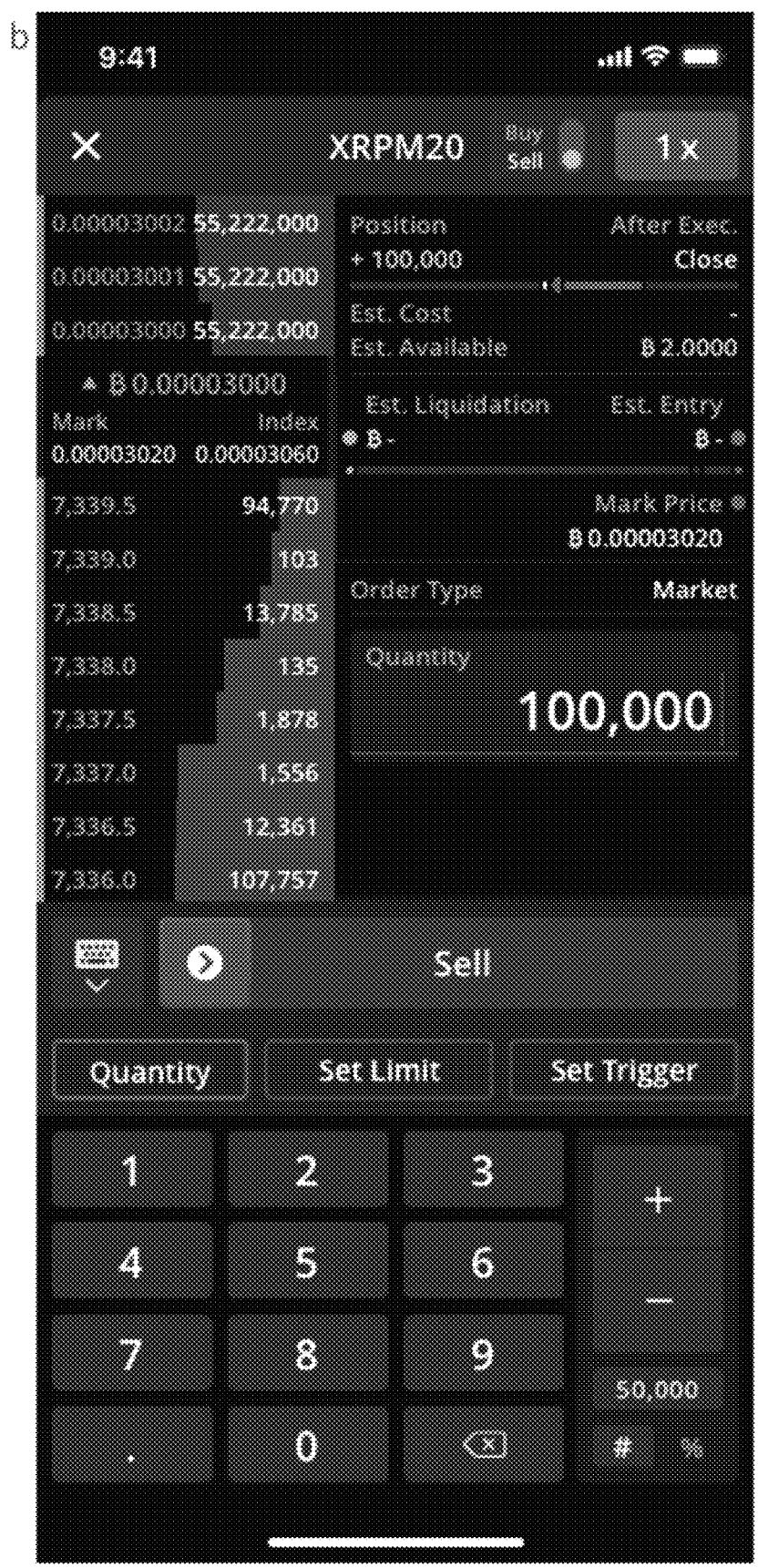
FIG. 19C illustrates operation of a dynamic margin position indicator in closing a long position of the advanced long interface of a mobile digital currency exchange system, in accordance with various embodiments.
Figure 19D:
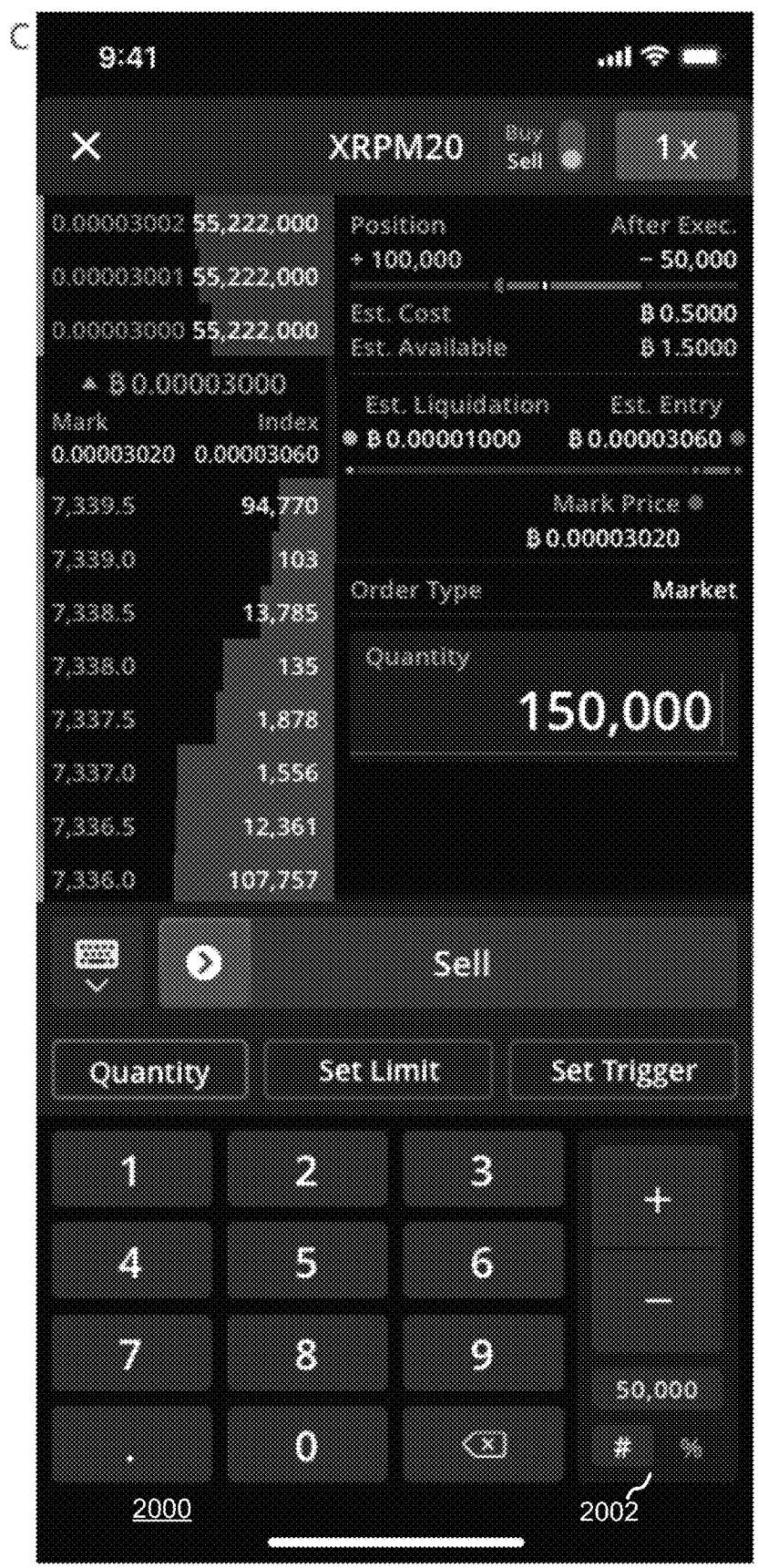
FIG. 19D illustrates operation of a dynamic margin position indicator in reversing a long position of the advanced long interface of a mobile digital currency exchange system, in accordance with various embodiments.
Figure 20:
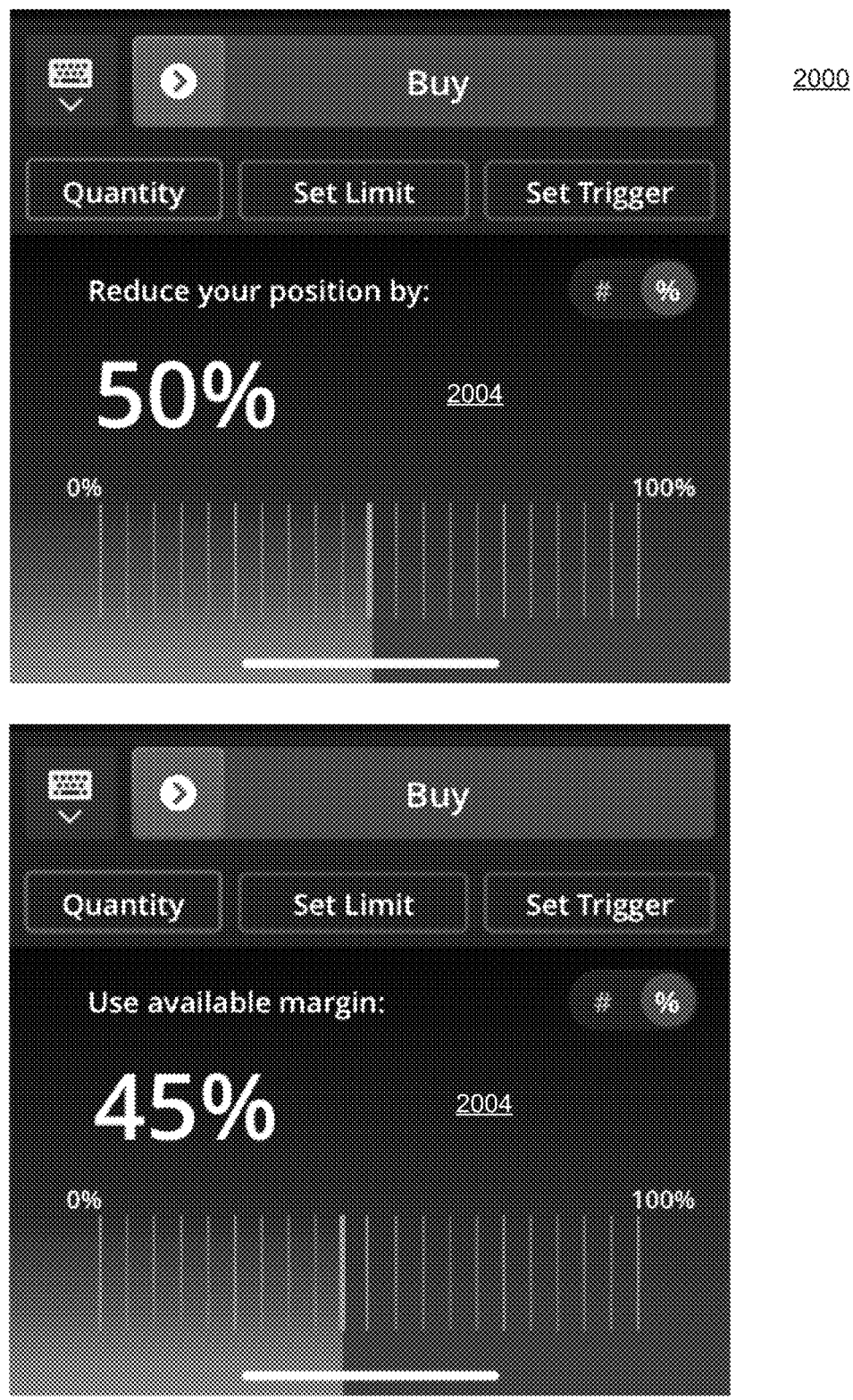
FIG. 20 illustrates a quantity input interface of a mobile digital currency exchange system, in accordance with various embodiments.

In various embodiments and with additional reference to FIGS. 14A and 14B, a portfolio view page 1400 of system 100 is illustrated. The portfolio view page 1400 may be configured to display the composition of a portfolio associated with the user account. For example, the portfolio view page 1400 may include one or more instrument details frames 1402 associated with the various instruments (e.g., currency pairs such as 'XBTUSD', contracts such as 'XBT7D_U105', and/or the like) comprising the portfolio. The instrument details frames 1402 may display instrument related and/or calculated data such as position size, liquidation price, entry price, ROE, PnL, value, active/open orders, stops, and/or the like. In various embodiments and in response to receiving an interaction with an instrument details frame 1402 the system may display a portfolio details view page 1404 as shown in FIG. 14B. The portfolio details view page 1404 may include an additional details frame 1406 which may show a margin composition indicator 1408 associated with the instrument. In various embodiments, the portfolio details view page 1404 may include a close position button 1410. The system may launch a close position process in response to receiving an interaction with the close position button 1410 and may display the close position interface 1200.

In various embodiments, and with combined reference to FIGS. 15A through 20 an advanced position interface of platform 200 is illustrated. The advanced interface may include elements defining a long position interface 1500 and a short position interface 1600. The advanced position interface may include a market depths chart 1502, a buy sell toggle 1504, a currency pair indicator 1506, a leverage setting button 1508, an order type display 1510, a mark price indicator 1512, a quantity selection button 1514, and a quantity input frame 1516. In various embodiments, the advanced position interface may include a dynamic margin position indicator 1700. The dynamic margin position indicator may display a real time calculation of an existing position against a maximum position (based on a current position value and an available margin) associated with a trading account and a currency pair. The dynamic margin position indicator may display in real time the effect of a new order on the existing position and the maximum position.

The dynamic margin position indicator may include a background bar 1702. The system may calculate the background bar size based on the corresponding maximum margin value in a long direction 1712 and a short direction 1714 and display the background bar. The system may calculate a zero position 1704 based on the long direction and the short direction and display a zero indicator on the background bar. In this regard, the background bar may be scaled to indicate the maximum margin available to an account holder in the long and short direction (i.e., either side of the zero point). The system may determine a current position value and display a current position bar 1706 based on the magnitude of the current position value relative to the corresponding maximum margin value. The system may overlay the current position bar on the background bar. The system may receive order data including a currency pair and a quantity. The system may calculate a new position value based on the current position and the quantity. The system may display an arrow 1708 on the background bar indicating the new position value.

In various embodiments, the arrow may be pointed toward the long or the short direction depending on the order type and the quantity. In various embodiments, the system may display a new position bar 1710 overlaid on the background bar. The new position bar may be scaled to the background bar and be displayed based on the difference between the current position and the new position. In various embodiments the new position bar may be displayed relatively brighter than the current position bar. In various embodiments, the new position bar and the current position bar may be color coded based on the long direction and the short direction. For example, if displayed in the long direction the current position bar and the new position bar may be hues and shades of green and if displayed in the short direction may be hues and shades of red. In various embodiments, the system may dynamically alter the length of the new position bar and/or the current position bar based on the order data. In this regard, the dynamic margin position indicator may indicate margin that is currently—or will be after execution of the order—assigned to the user's position. Further, the dynamic margin position indicator may thereby indicate margin that will be returned to the user's available balance after executing an order reducing a position.

In various embodiments, the system may receive a request to change the quantity of an order and recalculate margin requirements based on either the last traded price, or by using the received order data and may update the dynamic margin position indicator in response. The system may receive a request to add a limit price. In response, the system may change margin calculations of the dynamic margin position indicator from an estimation based on the last traded or order book data, to an absolute price based on a limit price received in the order data. In various embodiments, the system may receive a request to change the limit price and may recalculate the margin requirements based on a new limit price. In various embodiments, the system may receive a request to add or change a trigger price. In response, the system may change margin calculations of the dynamic margin position indicator to use the trigger as an estimated execution price. The system may update the display of the dynamic margin position indicator including any of the current position bar, the new position bar, the background bar, and/or the arrow in response to recalculating the margin requirements and/or changing the margin calculations.

In various embodiments, the system may receive quantity data via a quantity input interface 2000. In various embodiments, the quantity input interface may display a keypad comprising numerical buttons, a value toggle, a decimal point button, and a backspace button. In various embodiments, the quantity input interface may include an interface type toggle 2002 configured to change the interface type between a numerical type and a percentage type. In response to a user selecting the percentage type toggle, the system may display a percentage tape scale 2004. The tape scale may extend between a 0% position and a 100% position. The system may receive a percentage type input based on, for example, a user dragging along the tape scale to a desired position on the tape scale. The system may display a numeric indication of the selected percentage input.

Figure 21:
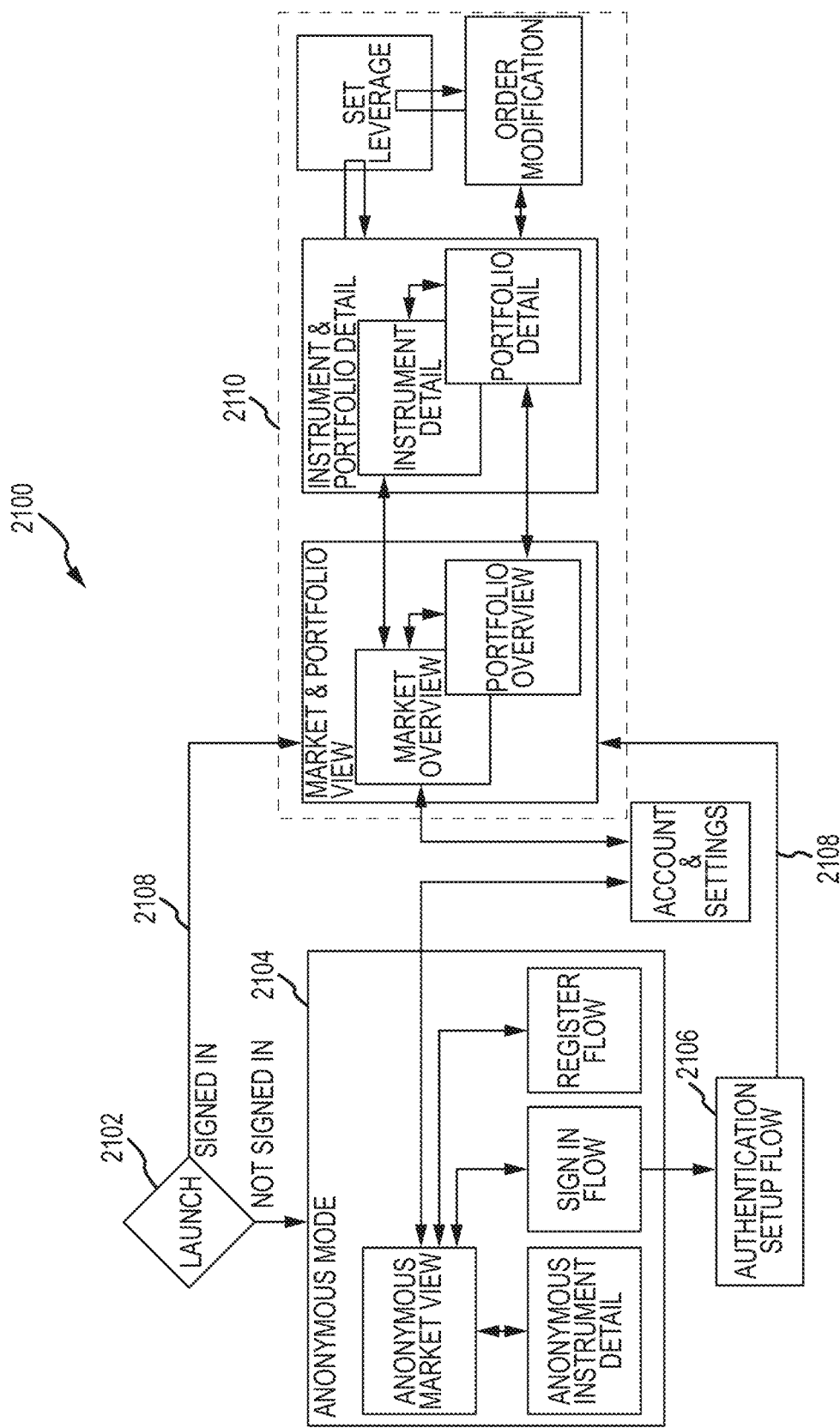
FIG. 21 illustrates a first launch process of a mobile digital currency exchange system, in accordance with various embodiments.

With reference to FIG. 21, a launch process 2100 of a system 100 is illustrated in accordance with various embodiments. The system may receive a launch command including a sign-in data. The system may determine an operational mode based on the sign in data 2102. Where the sign-in data does not comprise authentication data, the system may start an anonymous mode process 2104. In response, the system may start an authentication setup process 2106 which may generate an authentication request based on the sign-in data. In various embodiments, in response to receiving an authentication data 2108 the system may start a trading interface process 2110. The system may display a trading interface comprising a portfolio drawer. The portfolio drawer display may display portfolio information associated with the authentication data and/or sign in data.

Figure 22:
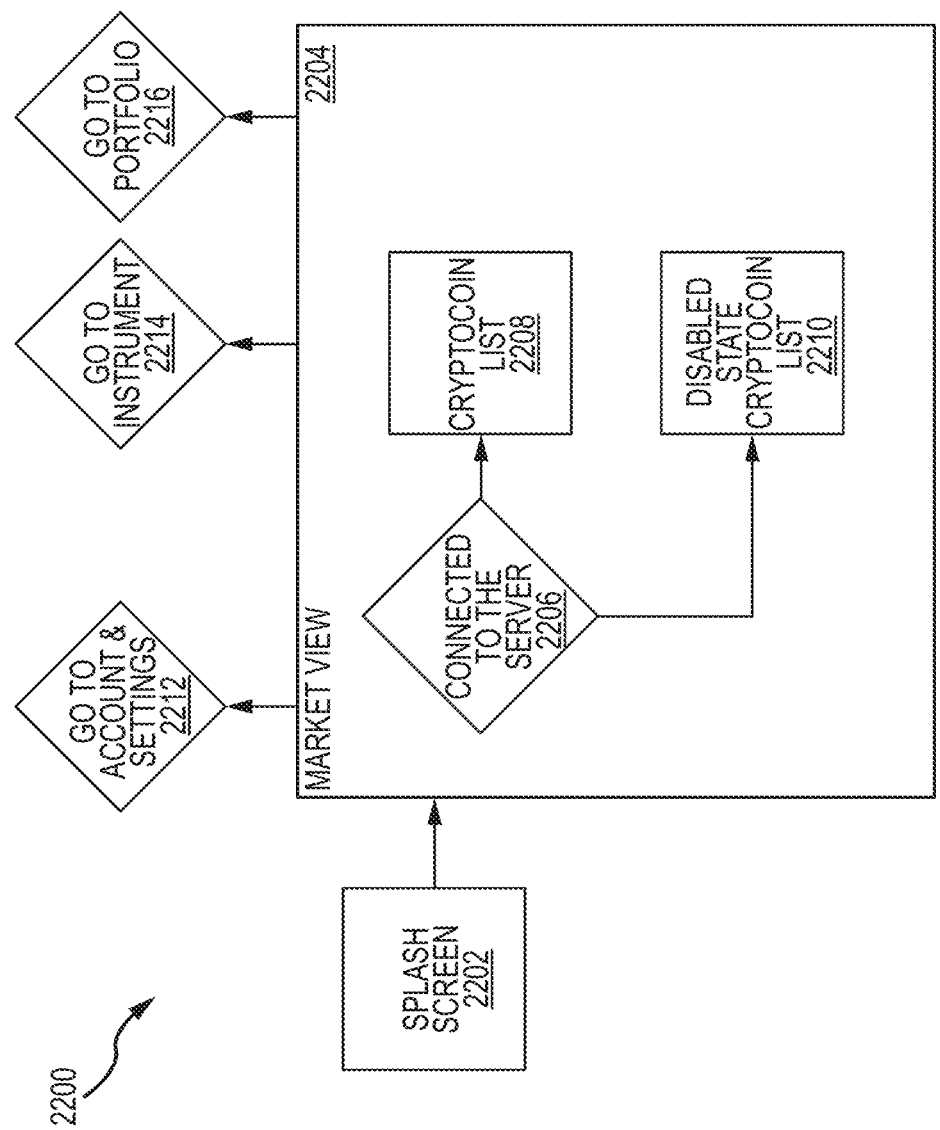
FIG. 22 illustrates a market view process of a mobile digital currency exchange system, in accordance with various embodiments.

In various embodiments and with additional reference to FIG. 22, a market view page process 2200 of system 100 is illustrated. In response to receiving the authentication data 2108 the system may display a splash screen 2202 and may then display a market view page 2204. The system may initiate a connection 2206 with trading platform 200 and receive data from the trading platform 200. For example, the system may populate the market view page 2204 with a cryptocoin list 2208 and/or a disabled state cryptocoin list 2210. In various embodiments, the market view page 2204 may be configured to receive one or more inputs from the user device 104. For example, the market view page 2204 may be configured to receive an account and settings section 2212, a go to instrument selection 2214, and a go to portfolio selection 2216.

Figure 23:
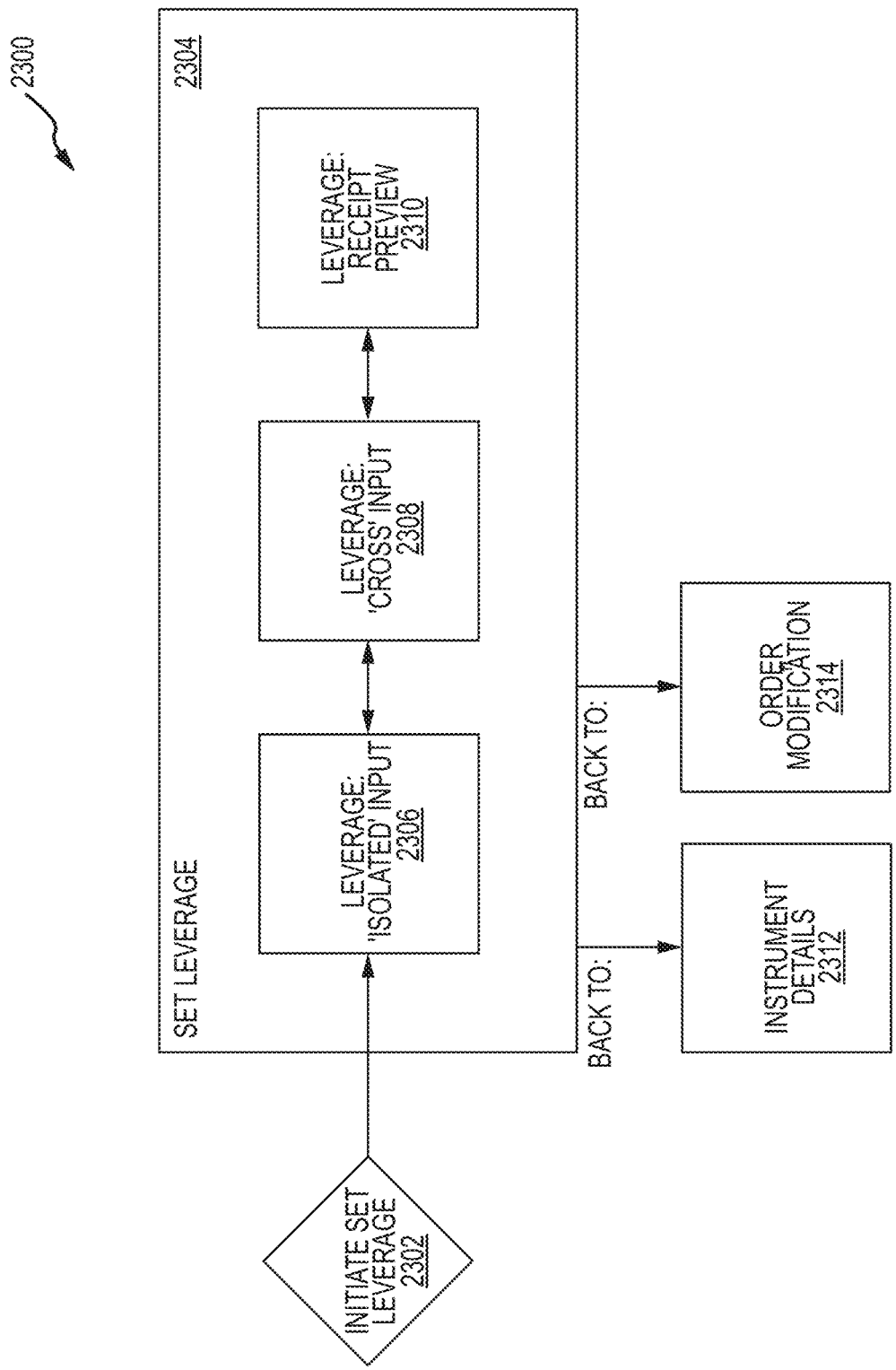
FIG. 23 illustrates a set leverage process of a mobile digital currency exchange system, in accordance with various embodiments.

In various embodiments and with additional reference to FIG. 23 a leverage setting page process 2300 of system 100 is illustrated. In response to receiving an initiate set leverage input 2302 from a user device 104. The system may display a set leverage page 2304 such as, for example, leverage setting interface 1000. The set leverage page 2304 may be configured to receive and/or display one or more inputs to initialize leverage associated input states such as, for example, a leverage isolated input 2306, a leverage cross input 2308, and a leverage receipt preview 2310. In response to initializing the leverage associated input states, the system may display one of an instrument details 2312 page or an order modification page 2314.

Figure 24:
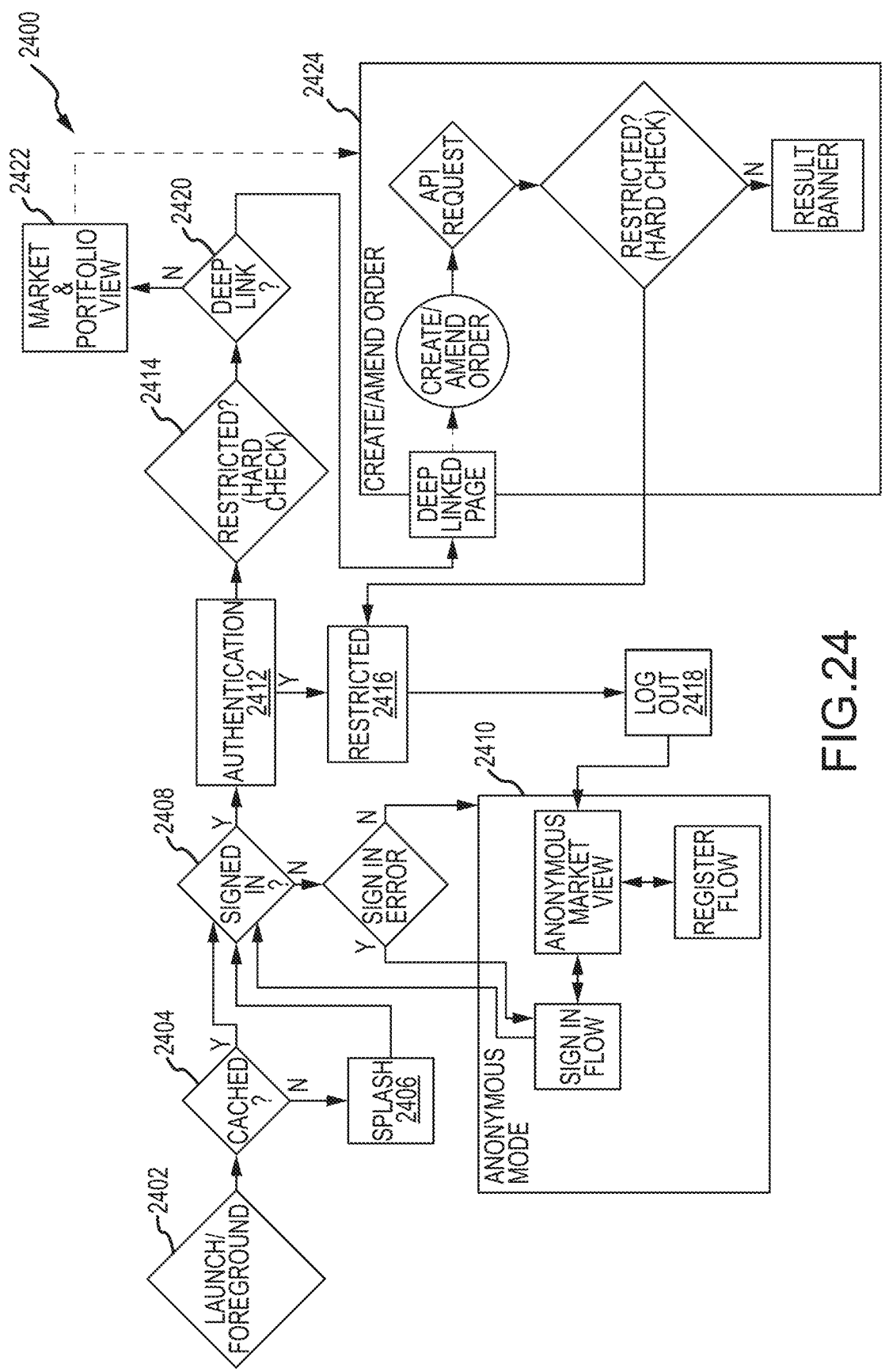
FIG. 24 illustrates a second launch process of a mobile digital currency exchange system, in accordance with various embodiments.

In various embodiments and with additional reference to FIG. 24 a second launch process 2400 of system 100 is illustrated. User device 104 may receive a command 2402 to launch the native application 110. In response the system may determine whether the native application 110 is cached locally on the user device 104 (2404). The system may display a splash screen 2406 in response to determining an uncashed condition and proceed to cache the native application 110. Otherwise the system may determine a sign-in state (2408). In response to a failed sign-in state, the system may proceed to an anonymous mode process 2410. Otherwise, the system may proceed to an authentication process 2412 and display an authentication page (e.g., authentication interface 510). In various embodiments, the system may determine whether authentication is restricted 2414 and drop to a restricted process 2416 which may force a logout event 2418 and return to the anonymous mode process 2410. If authentication is not restricted, the system may perform a deep link check 2420. In response, the system may launch a market and portfolio view process 2422 or a create/amend order process 2424.

Figure 25:
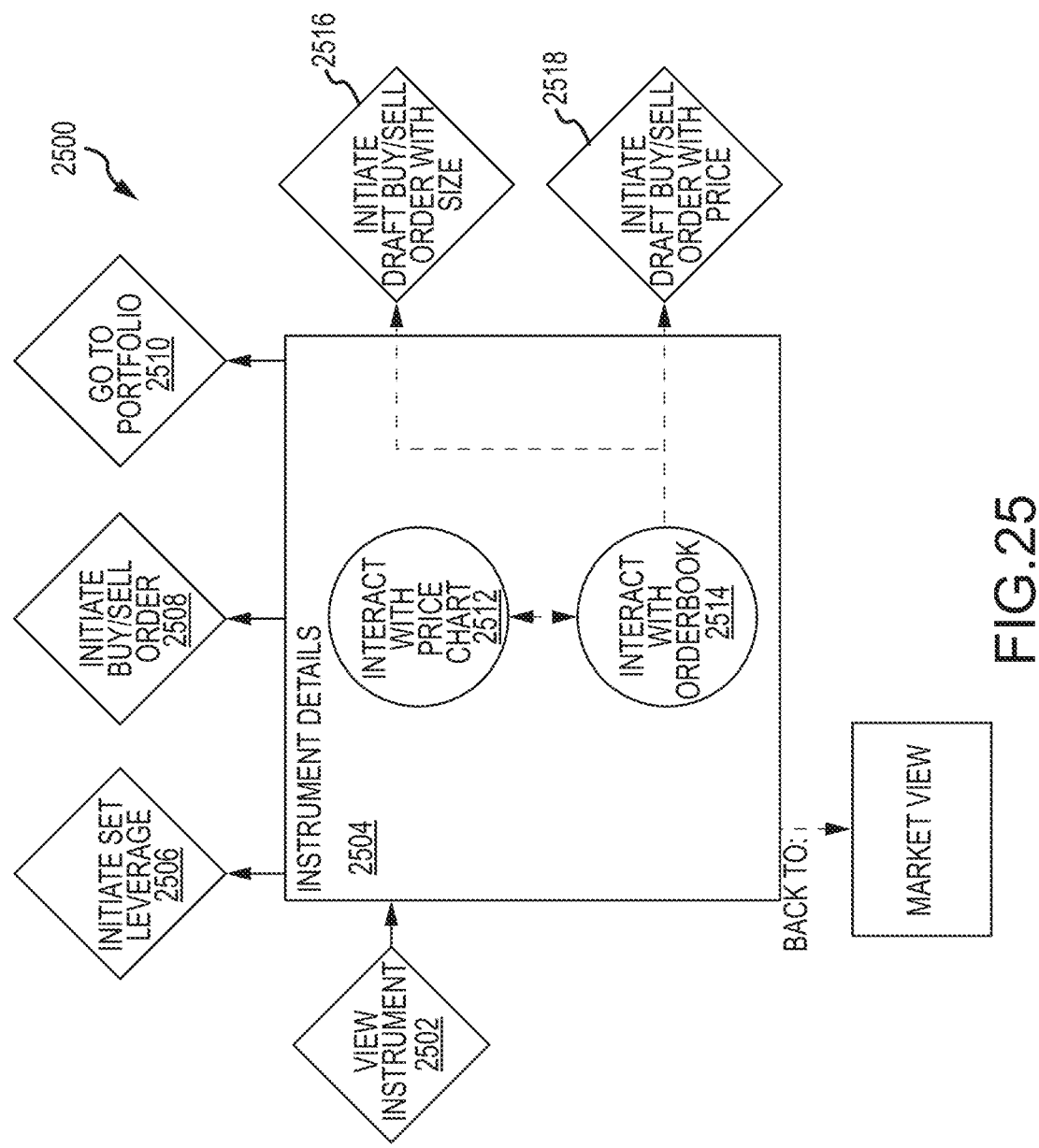
FIG. 25 illustrates an instrument details process of a mobile digital currency exchange system, in accordance with various embodiments.

In various embodiments and with additional reference to FIG. 25, an instrument details page process 2500 of system 100 is illustrated. The system may receive a view instrument action 2502 and, in response, display an instrument details page 2504. The instrument details page 2504 may be configured to generate an initiate set leverage action 2506, initiate buy/sell order action 2508, or go to portfolio action 2510. The system may receive an interaction with a price chart 2512 or an interaction with an orderbook 2514 via the instrument details page 2504. In response the system may start an order flow process. For example, the system may generate an initiate draft buy/sell order with size action 2516 or may generate an initiate draft buy/sell order with price action 2518.

Figure 26:
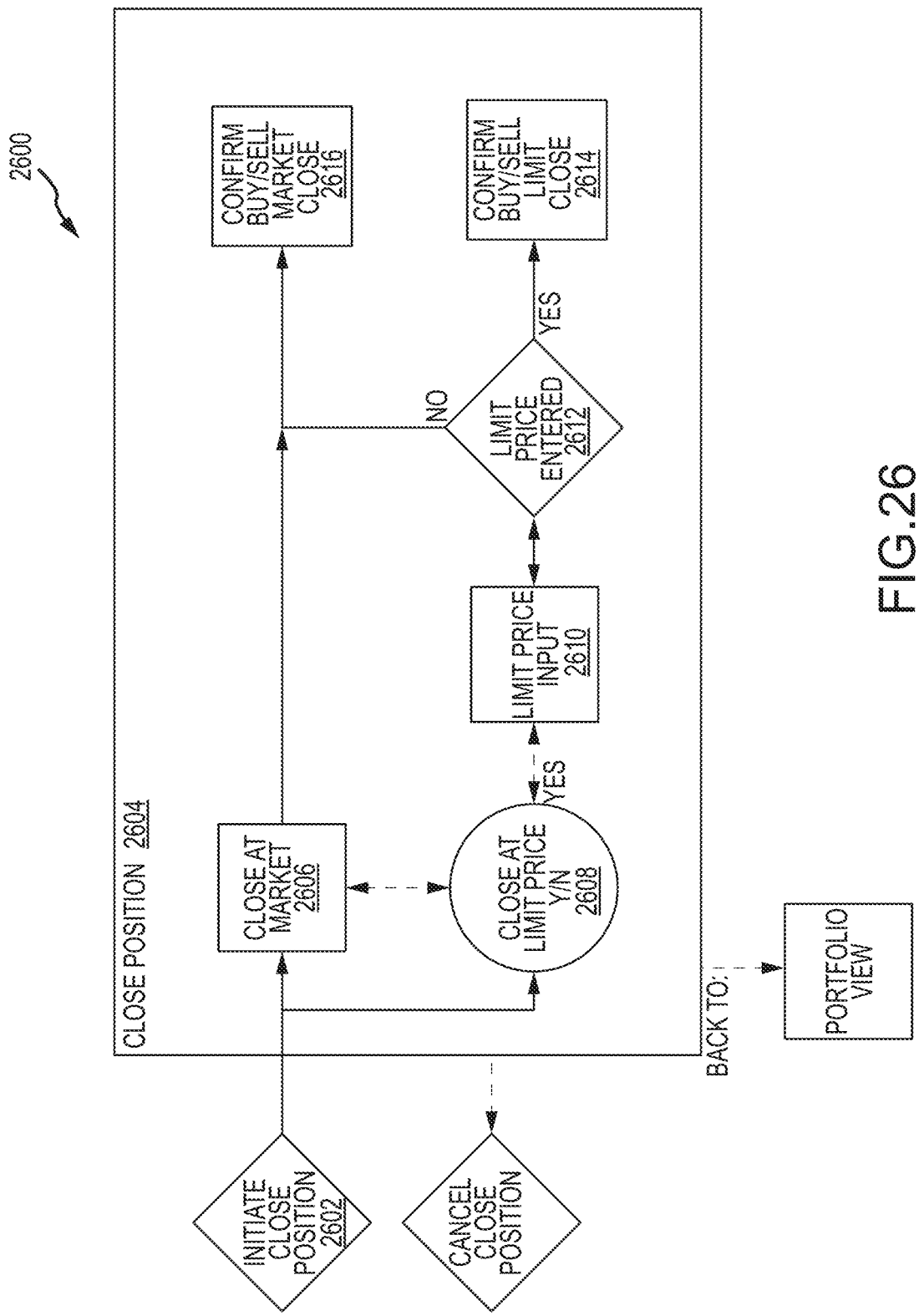
FIG. 26 illustrates a close position process of a mobile digital currency exchange system, in accordance with various embodiments.

In various embodiments and with additional reference to FIG. 26, an close position page process 2600 of system 100 is illustrated. The system may receive an initiate close position action 2602 and in response display a close position page 2604 (e.g., close position interface 1200). The process may initialize to a close at market state 2606 and may determine a transition to close at limit price 2608 based on receiving a state selection. The system may receive a limit price input 2610. The system may determine whether the limit price input is entered (i.e., non-zero value) 2612. In response to determine an entered limit price, the system may await confirmation of a limit close state 2614. Otherwise the system will await confirmation of a market close state 2616.

Figure 27:
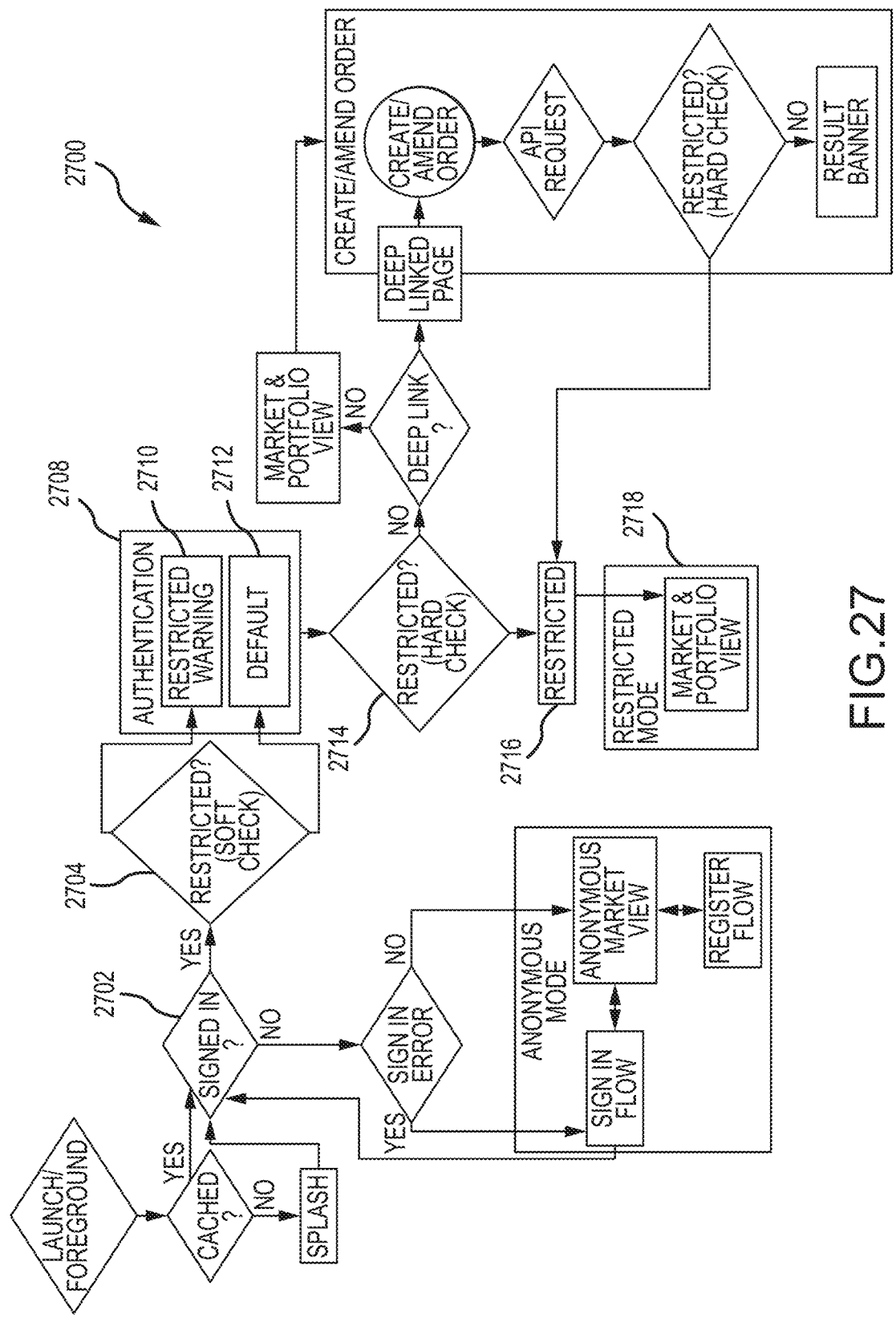
FIG. 27 illustrates a third launch process of a mobile digital currency exchange system, in accordance with various embodiments.

In various embodiments and with additional reference to FIG. 27 a third launch process 2700 of system 100 is illustrated. Process 2700 includes steps, systems, and features of process 2400, but incorporates a restricted mode process. In response to determining a sign-in state 2702, the system may perform a restricted authentication soft check 2704. In response to the a restricted authentication soft check, the system may set a restricted warning state 2710 or a default state 2712 of authentication process 2708. In various embodiments, the system may perform a hard check of whether authentication is restricted 2714. The system may drop to a restricted process 2716 in response to a restricted result from the hard check. In various embodiments, the restricted process 2716 may enable a restricted mode 2718 of the market and portfolio view process.

Figure 28:
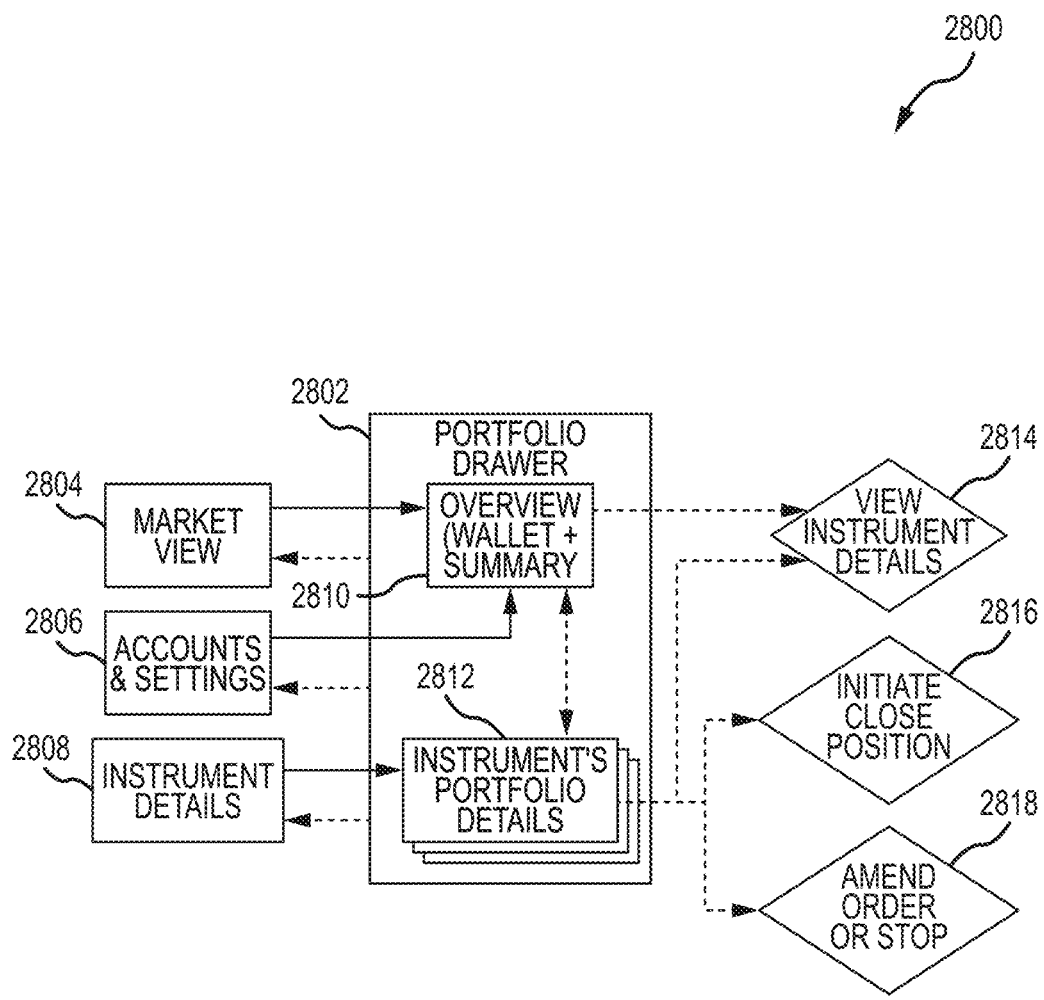
FIG. 28 illustrates a portfolio drawer process of a mobile digital currency exchange system, in accordance with various embodiments.

In various embodiments and with additional reference to FIG. 28, a portfolio drawer process 2800 of system 100 is illustrated. The system may display a portfolio drawer page 2802 in response to an interaction with a market view page 2804, an accounts and settings page 2806, and/or an instrument details page 2808. The system may display an overview page 2810 of the portfolio drawer page 2802 in response to the interactions with the market view page 2804 and the accounts and settings page 2806. The system may display an instrument's portfolio details page 2812 in response to the interaction with the instrument details page 2808. The overview page 2810 may be configured to generate a view instrument details action 2814. In response to generating the view instrument details action 2814 the system may display the instrument details page 2808. In various embodiments, the instrument's portfolio details page 2812 may be configured to generate an initiate close position action 2816, an amend order or stop action 2818, and the view instrument details action 2814. In various embodiments, the system may display the close position interface in response to the initiate close position action 2816 and may display the order interface in response to the amend order or stop action 2818.

Figure 29A:
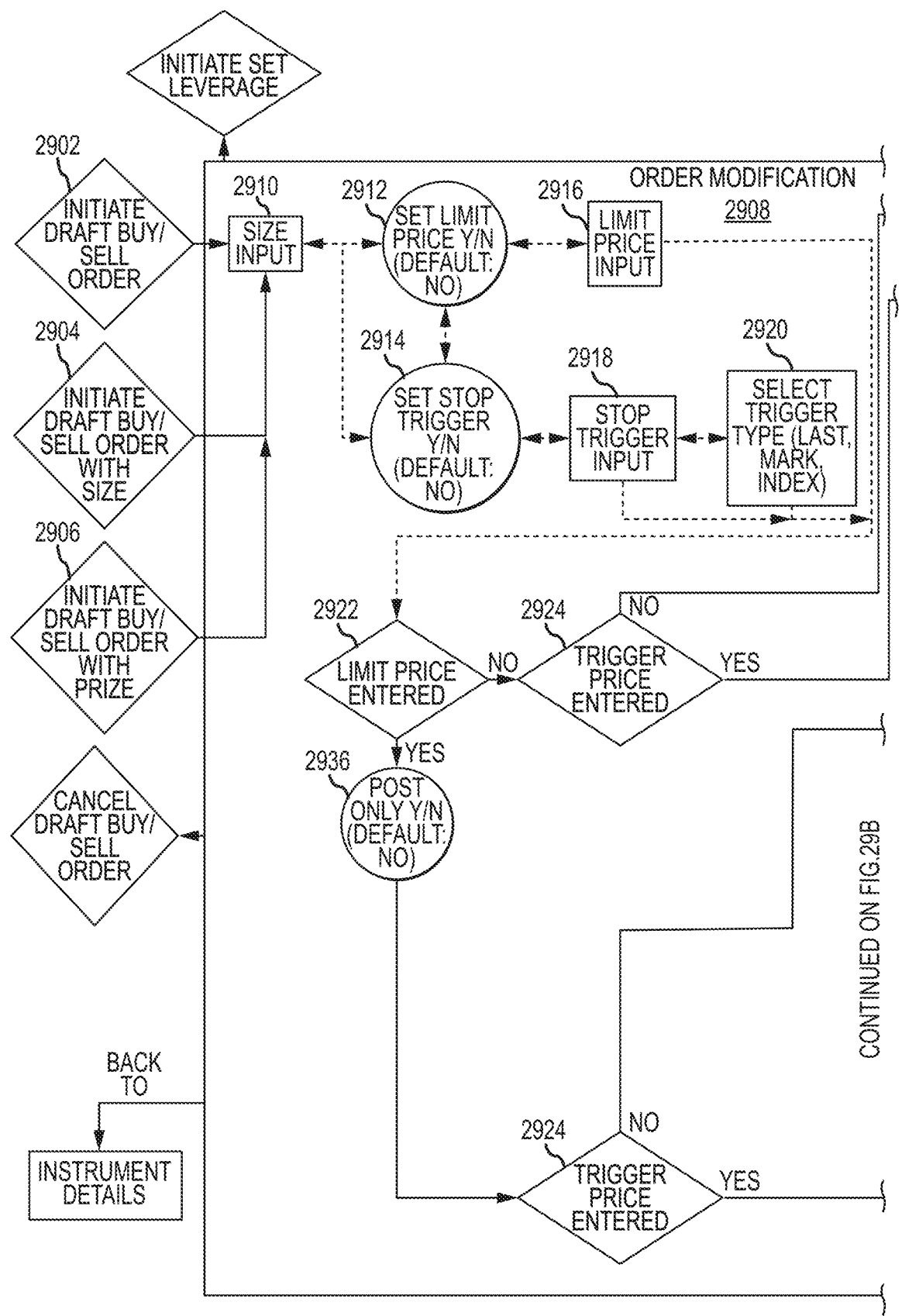
FIG. 29A illustrates an order modification process of a mobile digital currency exchange system, in accordance with various embodiments.
Figure 29B:
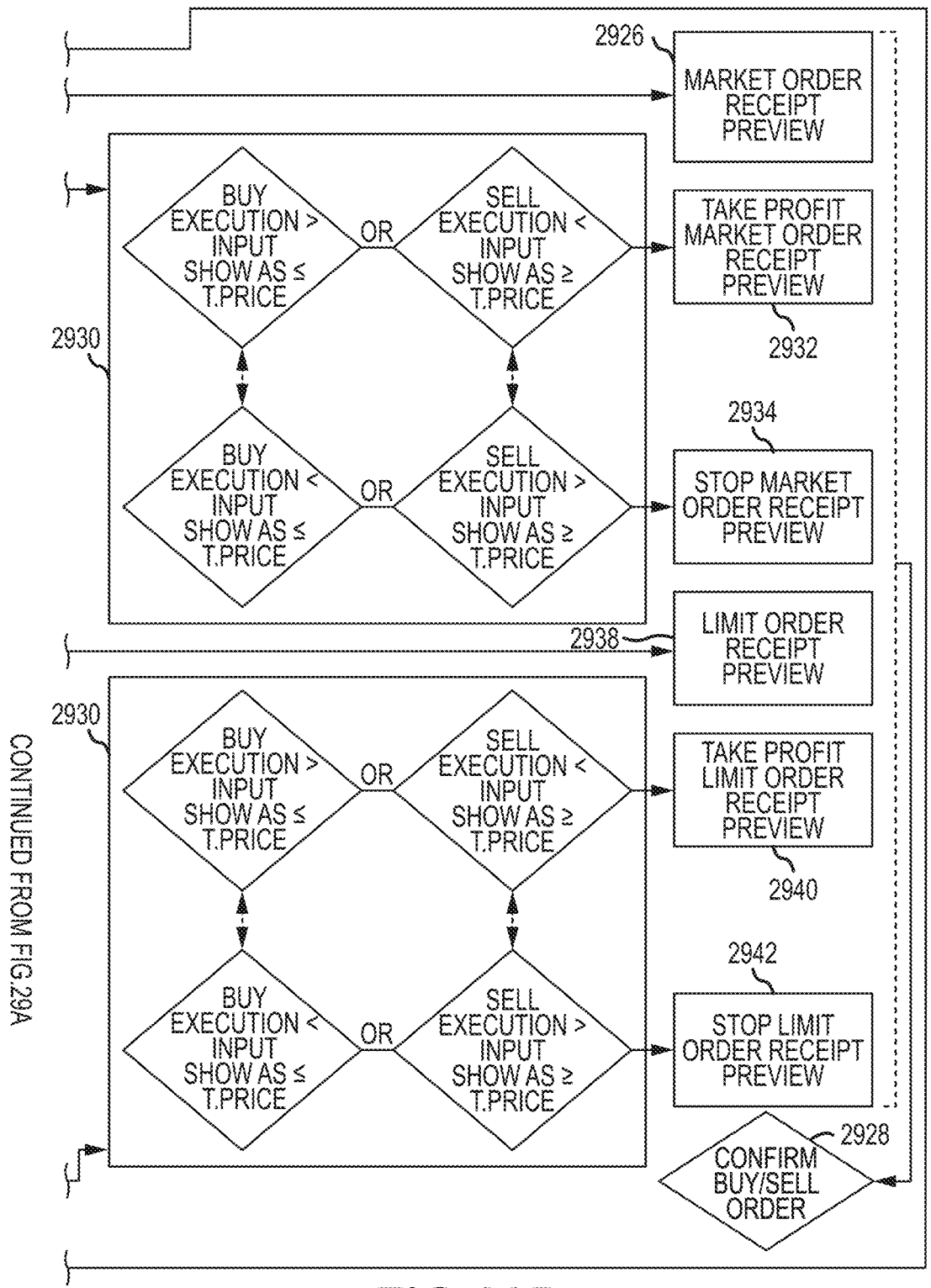
FIG. 29B illustrates an order modification process of a mobile digital currency exchange system, in accordance with various embodiments.

In various embodiments and with additional reference to FIGS. 29A and 29B, an order modification process 2900 of system 100 is illustrated. In various embodiments, the order modification process may be initiated in response to receiving any of an initiate draft buy/sell order action 2902, a initiate draft buy/sell order with size action 2904, or an initiate draft buy/sell order with price action 2906. The system may display an order modification page 2908 in response. The system may receive a size input 2910. The system may check for a limit price setting 2912 and may check for a stop trigger setting 2914. In response to the limit price setting 2912, the system may await a limit price input 2916. In response to the stop trigger setting 2914, the system may await a stop trigger input 2918 and a trigger type input 2920. In response to receiving the inputs (2916, 2918, 2920) the system may check for an entered limit price 2922 and, if none, may check for a trigger price entered 2924. If no trigger price entered, the system may display a market order receipt preview 2926 and generate a confirm buy/sell order action 2928.

If a trigger price is entered, the system may execute a direction finding process 2930 based on the trigger price input and the trigger type input. The system may display a take profit market order receipt preview 2932 or a stop market order receipt preview 2934 based on the outcome of direction finding process 2930 and proceed to generate the confirm buy/sell order action 2928. If a limit price is entered the system may determine a post only option 2936 and, if no trigger price is entered, the system may display a limit order receipt preview 2938 and proceed to generate the confirm buy/sell order action 2928. If a limit price and a trigger price are entered, the system may execute a direction finding process 2930 based on the trigger price input and the trigger type input. The system may display a take profit limit order receipt preview 2940 or a stop limit order receipt preview 2942 based on the outcome of direction finding process 2930 and proceed to generate the confirm buy/sell order action 2928.

Figure 30A:
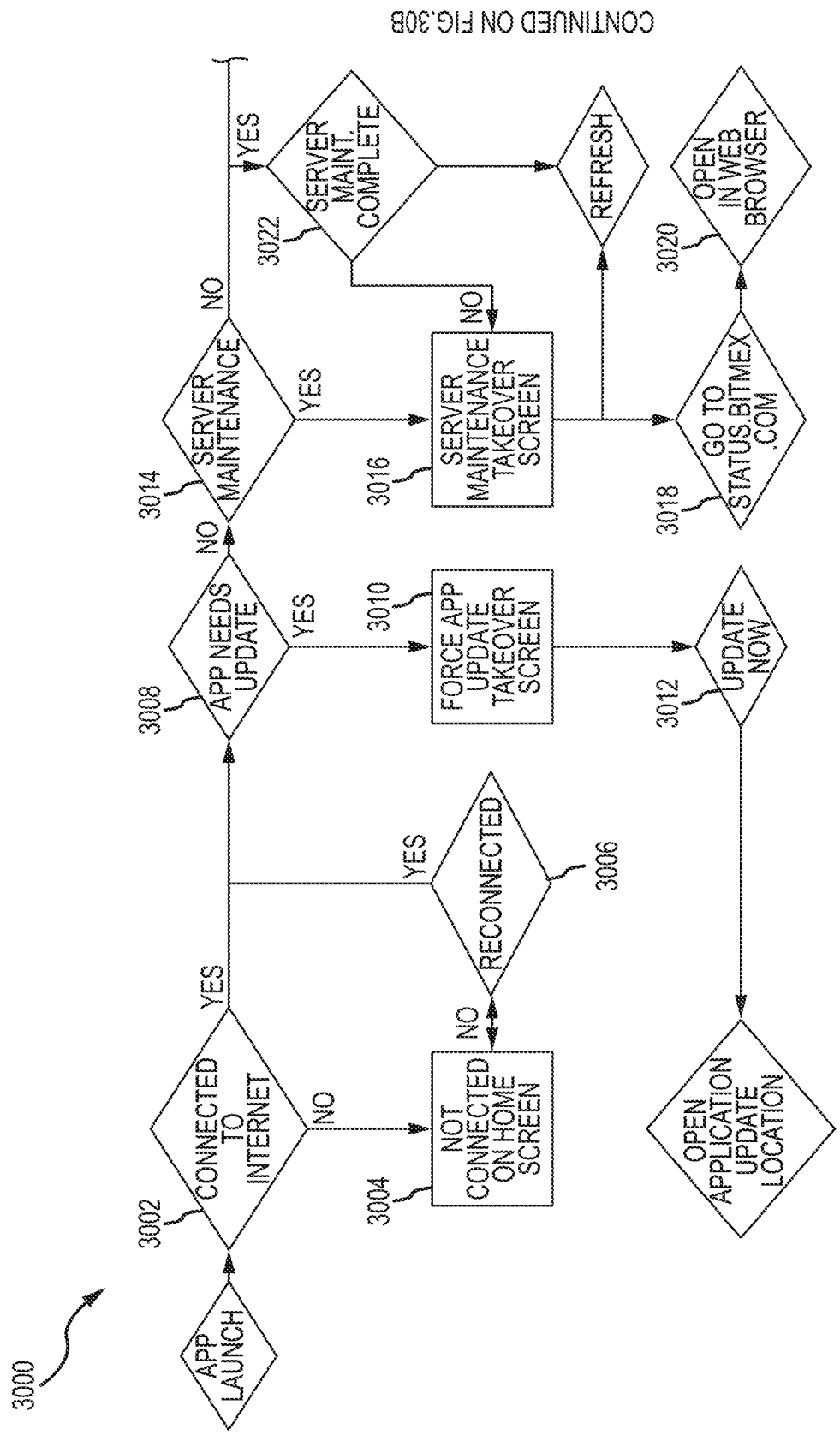
FIG. 30A illustrates a maintenance process of a mobile digital currency exchange system, in accordance with various embodiments.
Figure 30B:
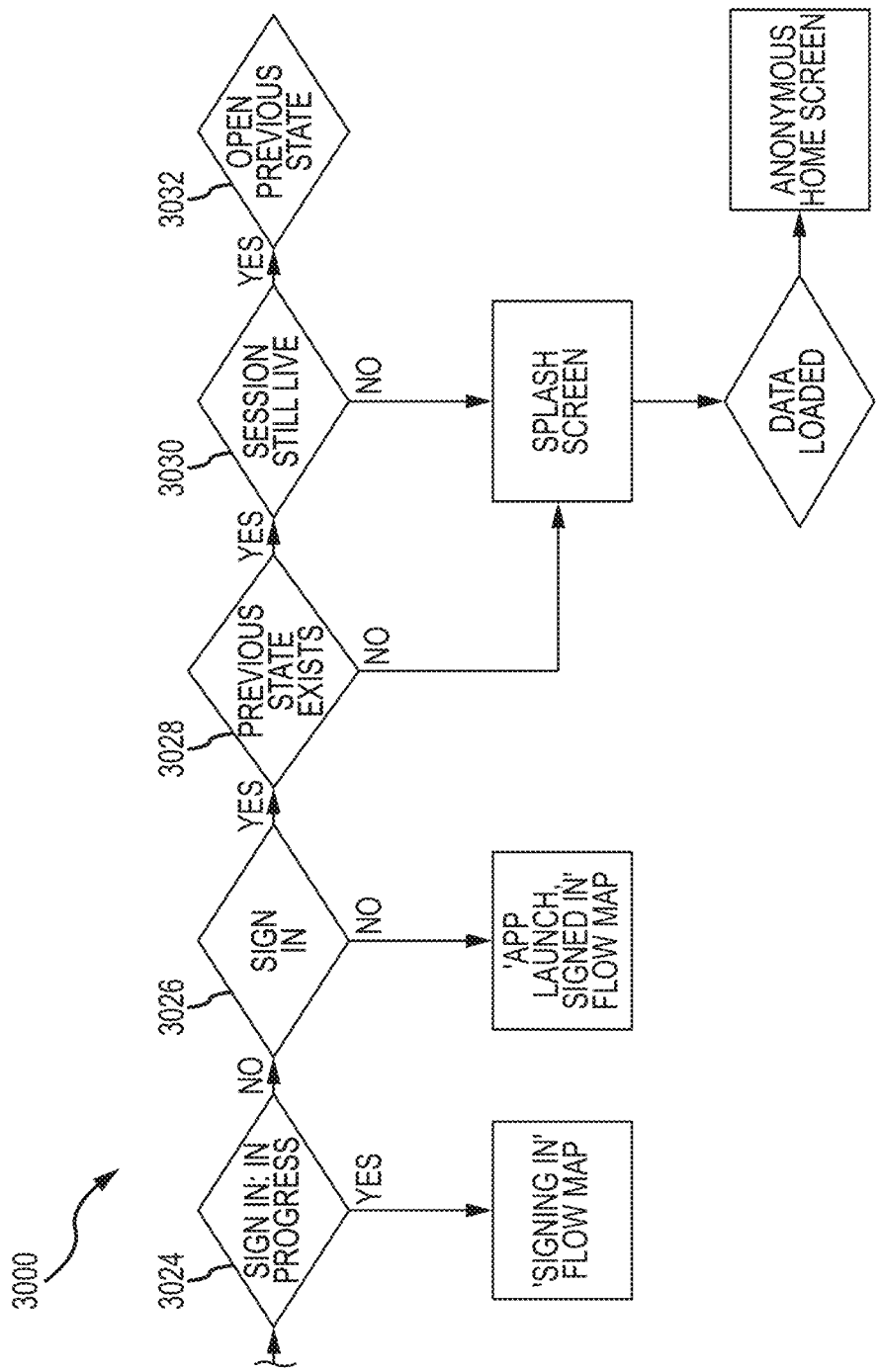
FIG. 30B illustrates a maintenance process of a mobile digital currency exchange system, in accordance with various embodiments.

In various embodiments and with additional reference to FIGS. 30A and 30B, a maintenance process 3000 of system 100 is illustrated. Native application 110 may be launched on user device 104 and determine a connection to a wide area network 3002. In response to determining a connection failure, the system may enter a not connected state 3004 and display a disconnected status. In response to entering the not connected state 3004, the system may start a reconnection process 3006. In response to determining a connected state, the system may check for updates 3008. In response to determining an available update the system may enter a forced update state 3010 and await an update now action 3012. Otherwise, the system may check for a server maintenance state 3014. In response to determining active server maintenance, the system may enter a server maintenance state 3016 and generate a status page punch-out action 3018. In response to the status page punch-out action 3018, the system may launch 3020 a web browser of the user device 104. While in the server maintenance state 3016 the system may check for completed server maintenance 3022. In response to determining completed server maintenance the system may check for sign-in process state 3024. If sign in is not in process the system may check for a signed-in state 3026. If the signed-in state is true then the system proceeds to check for prior state data of the native app 110 (3028). If prior state data exists, the system may determine whether the prior session is still live 3030. If the prior session is still live then the process progresses to open the prior state 3032.

Figure 31A:
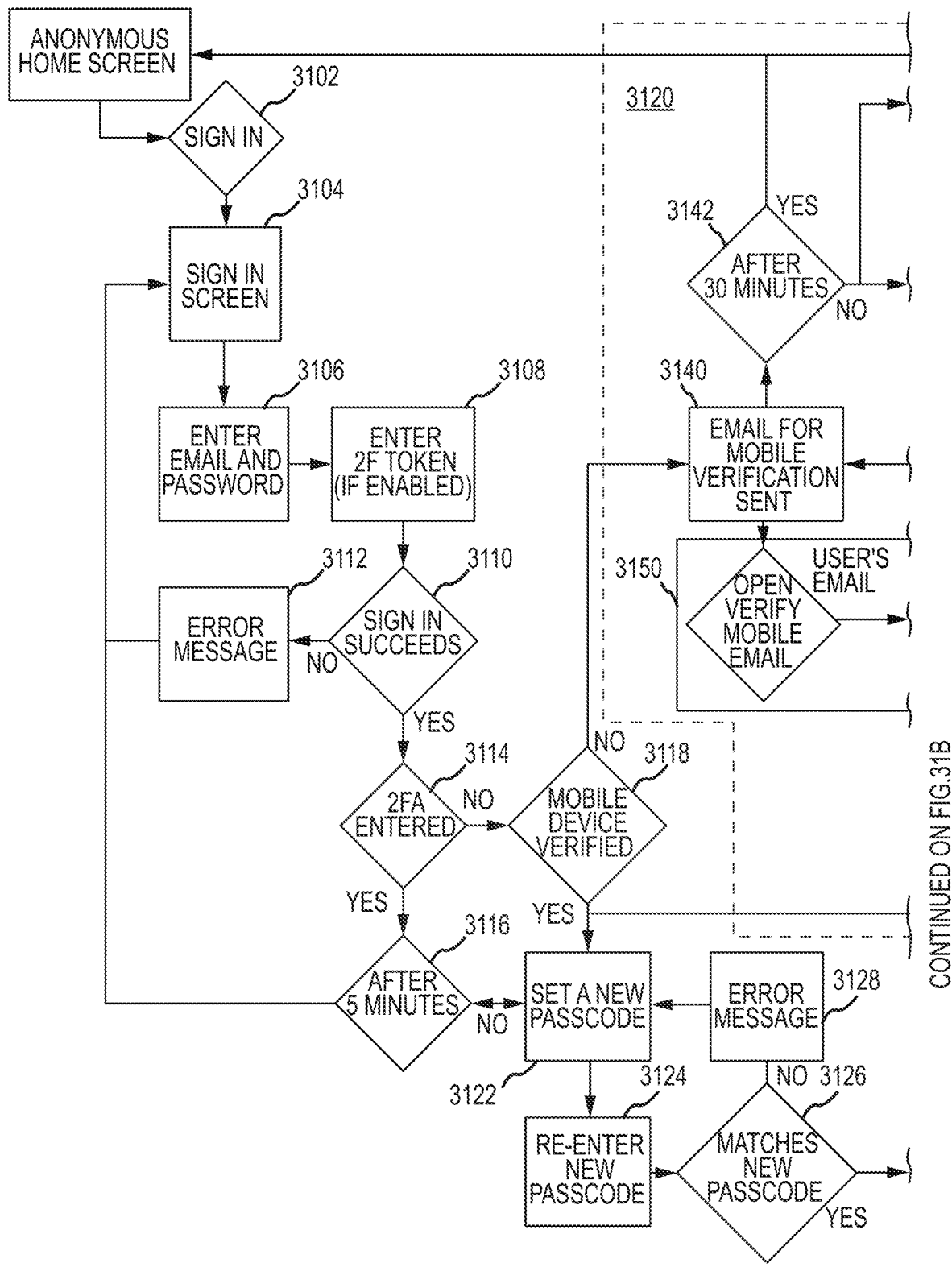
FIG. 31A illustrates a sign-in process of a mobile digital currency exchange system, in accordance with various embodiments.
Figure 31B:
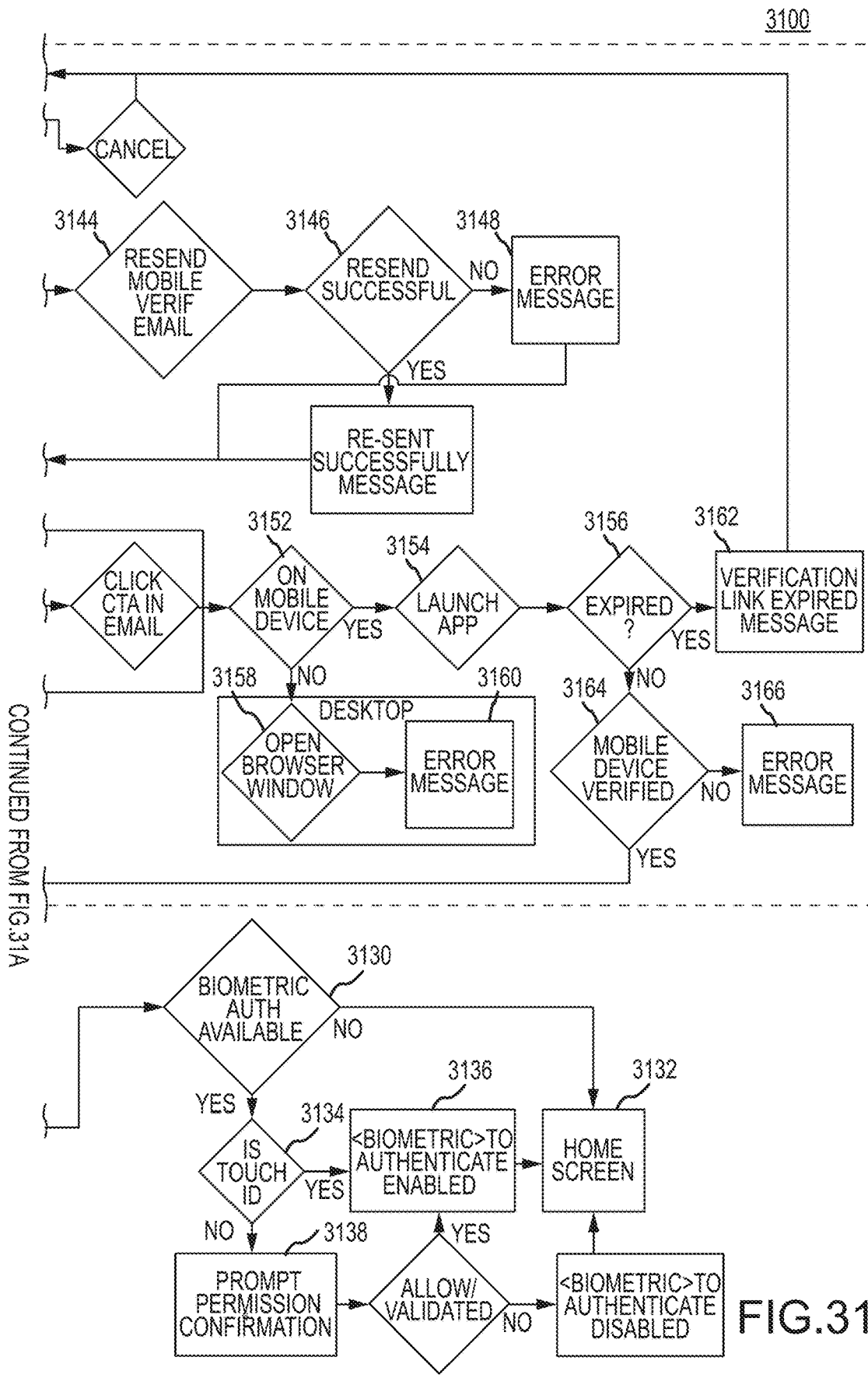
FIG. 31B illustrates a sign-in process of a mobile digital currency exchange system, in accordance with various embodiments.

In various embodiments and with additional reference to FIGS. 31A and 31B, a sign-in process 3100 of system 100 is illustrated. The system may receive a sign-in action 3102 and display a sign in screen 3104 in response. The system may receive an email and a password 3106. The system may receive an authentication token 3108. The system may determine a success state of the sign-in based on the email and the password 3110. In response to a failed success state, the system may display an error message 3112 and return to the sign in screen 3104. Otherwise, the system may progress to determine receipt of the authentication token 3114. If no token is entered, the system may progress to a five (5) minute wait state 3116 for entry of the authentication token. The system may exit the wait state 3115 to the sign in screen 3104. In response to receiving the authentication token the system may determine a mobile device verification state 3118. In response to determining an unverified device, the system may launch a device verification subprocess 3120. Otherwise the system may progress to a set new passcode prompt 3122. The system may receive the passcode and prompt for reentry of the passcode 3124. The system may compare the passcodes to determine a match 3126. The system may return an error in response to a mismatch 3128. Otherwise, the system may determine available biometric authentication 3130. If biometric authentication is unavailable, the system may progress to display the home screen 3132. Otherwise, the system may check if touch ID is available 3134. If true, the system may start a biometric authentication process 3136. Else, the system may prompt for permissions to activate touch ID 3138 and either start the biometric authentication process or disable the biometric authentication process based on the permissions.

In various embodiments, in response to launching the device verification subprocess 3120 the system may transmit a verification link for mobile device verification 3140. The system may enter a 30 minute wait state 3142 while awaiting an interaction with the verification link. While in the wait state 3142, the system may retransmit the verification link 3144. The system may determine whether the retransmission was successful 3146 and, if not, may display an error message 3148. The system may determine an interaction with the verification link 3150. The system may determine whether the interaction with the verification link is via the mobile device 104 (3152). If false, the system may generate a web-browser punch out action 3158. In response to the punch out action, the system may display an error message 3160. If true, the system may launch the native app 110 of the mobile device 104 (3154). The system may check if the verification link is expired 3156. If true, the system may display a verification link expired message 3162 and recycle to transmit a new verification link. Else, the system may determine the device verified 3164. If false, the system may generate a verification error message 3166.

Figure 32A:
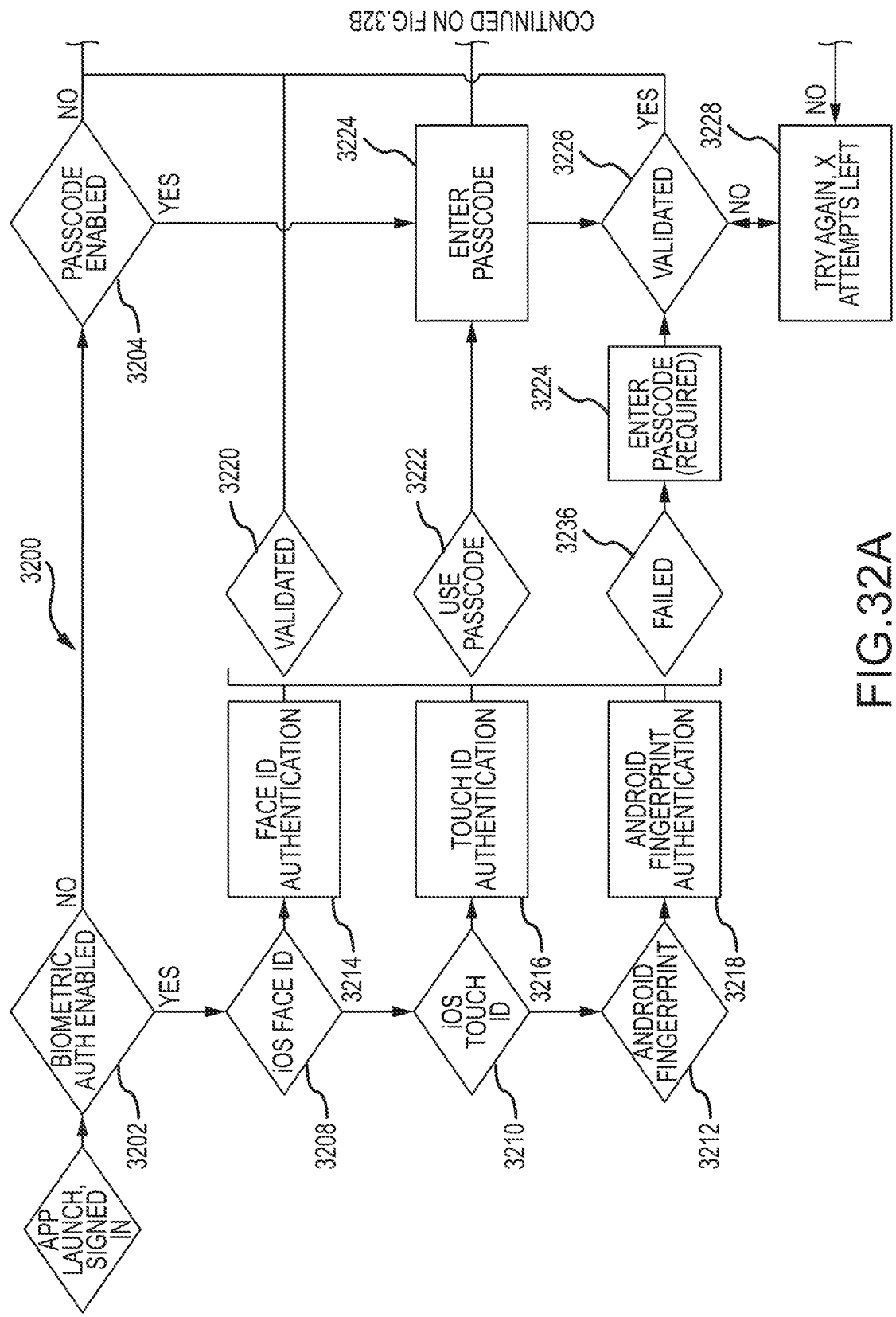
FIG. 32A illustrates a sign-in process of a mobile digital currency exchange system, in accordance with various embodiments.

In various embodiments and with additional reference to FIGS. 32A and 32B, a biometric authentication process 3200 of system 100 is illustrated. The system may determine a biometric authentication enabled state 3202. If false, the system may determine a passcode enabled state 3204. If false, the system may enter a recycle process 3206 and recycle to a previous state or progress to the home screen. In response to determining a true biometric authentication enabled state, the system may check for a device specific authentication state such as a face ID state 3208, a touch ID state 3210, or a fingerprint ID state 3212. In response, the system may launch a corresponding device specific biometric authentication process. For example, face ID authentication process 3214, touch ID authentication process 3216, and fingerprint authentication process 3218. Any of the authentication processes 3214, 3216, 3218 may return a biometric validated state 3220 and the system may progress to the recycle process 3206. In various embodiments, in response to a passcode enabled state 3222 any of the processes 3214, 3216, 3218 may prompt for entry of a passcode 3224. They system may receive the passcode and may determine a validated passcode state 3226. In response to the validated passcode state and the biometric validated state the system may progress to the recycle process 3206. Else, the system may progress to a failed attempt process 3228 and increment a failed attempt state counter 3230. In response to the failed attempt state counter exceed a threshold, the system may force a sign-out event 3232. In response, the system may display an error message 3234 and return to the sign-in screen. In various embodiments, any of the processes 3214, 3216, 3218 may return a biometric failed state 3236. In response the system may prompt for entry of the passcode 3224.

Via use of the interface, processes, and techniques disclosed in FIGS. 1 through 32, a user of the system may more readily visualize and understand the effect of proposed transactions. In this manner, the user can make quicker and/or better informed decisions regarding the proposed transactions, resulting in transactions that more closely track the user's desired outcomes (for example, by reducing and/or eliminating delays in entering transaction details, reducing and/or eliminating delays associated with user consideration or evaluation of a proposed transaction, and/or the like). Moreover, by reducing the amount of time a mobile application embodying and/or utilizing the system may need to be operative on a mobile device in order to effectuate a desired transaction, device battery life may be improved, network congestion may be reduced, and/or other improvements to operation of the mobile device or other computing or communications systems may be realized.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and communicative changes may be made without departing from the spirit and scope of the disclosure. Thus, the detailed description herein is presented for purposes of illustration only and not of limitation. For example, the steps recited in any of the method or process descriptions may be executed in any suitable order and are not limited to the order presented. Moreover, certain of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example: (i) a trading account and (ii) an order (e.g., contract, security, future) and/or digital channel. Moreover, the associating may occur at any point, in response to any suitable action, event, or period of time. The associating may occur at predetermined intervals, periodic, randomly, once, more than once, or in response to a suitable request or action. Any of the information may be distributed and/or accessed via any suitable method, for example a software enabled link, wherein the link may be sent via an email, text, post, social network input, and/or any other method known in the art.

The process flows and screenshots depicted in the figures are merely embodiments and are not intended to limit the scope of the disclosure. For example, the steps recited in any of the method or process descriptions may be executed in any suitable order and are not limited to the order presented. It will be appreciated that the following description makes appropriate references not only to the steps and user interface elements depicted in the figures, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) may be stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, solid-state storage devices, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, Windows mobile, Android, Apple iOS, Blackberry, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language, for example such as C, C++, C#, Java, Javascript, Javascript Object Notation (JSON), VBScript, Macromedia Cold Fusion, Cobol, active server pages, Perl, assembly, PHP, awk, Python, Visual Basic, SQL Stored Procedures, PL/SQL, any Unix shell script, and/or extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as Javascript, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows applications, webpages, websites, web forms, prompts, etc. Practitioners will appreciate that the illustrated steps described herein may comprise, in any number of configurations, including the use of windows applications, webpages, web forms, popup windows applications, prompts, and the like. It should be further appreciated that the multiple steps as illustrated and described may be combined into single webpages and/or windows applications but have been expanded for the sake of simplicity. In other cases, steps illustrated and described as single process steps may be separated into multiple webpages and/or applications but have been combined for simplicity.

In various embodiments, the software elements of the system may also be implemented using a Javascript run-time environment configured to execute Javascript code outside of a web browser. For example, the software elements of the system may also be implemented using Node.js components. Node.js programs may implement several modules to handle various core functionalities. For example, a package management module, such as NPM, may be implemented as an open source library to aid in organizing the installation and management of third-party Node.js programs. Node.js programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, Microsoft company's Internet Information Services (IIS), Transaction Server (MTS) service, and an SQL Server database, are used in conjunction with Microsoft operating systems, Windows web server software, and Microsoft Commerce Server. Additionally, components such as Access software, SQL Server database, Oracle software, Sybase software, Informix software, MySQL software, Interbase software, etc., may be used to provide an Active Data Object (ADO) compliant database management system. In one embodiment, the Apache web server is used in conjunction with a Linux operating system, a MySQL database, and Perl, PHP, Ruby, and/or Python programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows, Linux, Unix, Solaris, MacOS, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., Websphere, Weblogic, jBoss, Postgres Plus Advanced Server, etc.). In various embodiments, the server may include web servers (e.g., Apache, IIS, Google Web Server, and/or the like).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system as well as various conventional support software and drivers typically associated with computers. The web-client may also run Microsoft Edge, Internet Explorer, Mozilla Firefox, Google Chrome, Apple Safari, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, Javascript programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (e.g., 192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM (Armonk, N.Y.), various database products available from Oracle Corporation (Redwood Shores, Calif.), Microsoft Access or SQ1 Server by Microsoft Corporation (Redmond, Wash.), MySQL by MySQL AB (Uppsala, Sweden), MongoDB, Redis, Apache Cassandra, hBase by Apache, MapR-DB by the MAPR corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other sub sets.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, instrument, contract details, issuer, buyer, seller, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant, smartphone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of mobile digital currency exchanges and an order flow process, but the disclosure and claims include specific rules for implementing the outcome of the mobile digital currency exchanges and the order flow process and that render information into a specific format that is then used and applied to create the desired results of the mobile digital currency exchanges and the order flow process, as set forth in *McRO, Inc. v. Bandai Namco Games America Inc.* (Fed. Cir. case number 15-1080, Sep. 13, 2016). In other words, the outcome of the mobile digital currency exchange can be performed by many different types of rules and combinations of rules, and this disclosure includes various embodiments with specific rules. While the absence of complete preemption may not guarantee that a claim is eligible, the disclosure does not sufficiently preempt the field of mobile digital currency exchanges at all. The disclosure acts to narrow, confine, and otherwise tie down the disclosure so as not to cover the general abstract idea of just a mobile digital currency exchange. Significantly, other systems and methods exist for mobile digital currency exchanges, so it would be inappropriate to assert that the claimed invention preempts the field or monopolizes the basic tools of mobile digital currency exchanges. In other words, the disclosure will not prevent others from providing mobile digital currency exchanges, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or to just "apply it" to an abstract process. The disclosure and claims may also be directed to improvements to software with a specific implementation of a solution to a problem in the software arts.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method, comprising:

receiving, by a computer-based system and through an authentication request, authentication data including an authentication token;

transmitting, by the computer-based system, a verification link for mobile device verification as part of a device verification process;

launching, by the computer-based system, a native application;

determining, by the computer-based system using the native application, a connected state based on the authentication data and the authentication token;

checking, by the computer-based system, for updates, in response to determining a connected state;

entering, by the computer-based system, a forced update state, in response to determining an available update and an update now action;

checking, by the computer-based system, for a server maintenance state;

entering, by the computer-based system, a server maintenance state, in response to determining active server maintenance;

determining, by the computer-based system, completed server maintenance;

checking, by the computer-based system, for sign-in process state based on the sign-in data, in response to the determining the completed server maintenance;

checking, by the computer-based system, for a signed-in state based on the sign-in data, in response to a sign in not being in process;

checking, by the computer-based system, for prior state data of the native application, in response to the signed-in state being true;

determining, by the computer-based system, whether the prior session is still live, in response to the prior state data existing;

opening, by the computer-based system, a prior state based on the prior state data, in response to the prior session being still live, to minimize network congestion;

displaying, by the computer-based system, a trading interface of the prior state comprising a portfolio drawer based on the authentication data, wherein the portfolio drawer is displayed responsively to an interaction with each of a market view page, an accounts and settings page, and an instrument details page and comprises an instrument detail display and an account summary display;

receiving, by the computer-based system and through the trading interface, an instrument detail selection;

responsive to the receiving the instrument detail selection, generating, by the computer-based system, an advanced position interface to update the prior state;

receiving, by the computer-based system and through the advanced position interface, a first order flow input for an asset of a trading account, the first order flow input disposed in a data entry field on the advanced position interface, the first order flow input including a first quantity associated with a currency pair, the currency pair including the asset;

determining, by the computer-based system, a long direction maximum margin and a short direction maximum margin based on a current position value and an available margin;

calculating, by the computer-based system, a zero position margin based on the long direction maximum margin and the short direction maximum margin;

determining, by the computer-based system and through a dynamic margin position determination step, a first dynamic margin position associated with the trading account, wherein the dynamic margin position determination step comprises calculating the first dynamic margin position based on each of the current position value, the available margin of the trading account, and the first order flow input;

displaying, by the computer-based system and through the advanced position interface, a dynamic margin position indicator including the zero position margin, the long direction maximum margin, the short direction maximum margin, and the first dynamic margin position, wherein the dynamic margin position indicator is scaled based on the long direction maximum margin and the short direction maximum margin;

receiving, by the computer-based system and through the advanced position interface, a second order flow input including a second quantity associated with the currency pair, the second quantity different from the first quantity;

responsive to the receiving the second order flow input, repeating the dynamic margin position determination step with the second order flow input to generate a second dynamic margin position, the second dynamic margin position based on a second position value determined from the currency pair, the second quantity, and the current position value; and adjusting, by the computer-based system and in real-time, the dynamic margin position indicator to transition the first dynamic margin position to the second dynamic margin position, the second dynamic margin position displayed on the dynamic margin position indicator relative to the current position value and between the short direction maximum margin and the long direction maximum margin, wherein the dynamic margin position indicator is dynamically displayed prior to the execution of the first order flow input or the second order flow input on a digital currency exchange, in response to a selection based on the dynamic margin position indicator, executing the second order flow input on the digital currency exchange.

2. The method of claim 1, wherein the first order flow input comprises at least one of a buy order, a sell order, an order modification, a leverage setting, or a close position command.

3. The method of claim 1, further comprising starting, by the computer-based system, an anonymous mode process in response to the sign-in data.

4. The method of claim 1, wherein the dynamic margin position indicator is adjusted from the first dynamic margin position to the second dynamic margin position prior to execution of an order reflective of the second order flow input.

5. The method of claim 1, wherein the second dynamic margin position is displayed on the dynamic margin position indicator relative to the current position value on a background bar of the dynamic margin position indicator in response to the adjusting the dynamic margin position indicator.

6. The method of claim 1, further comprising:
receiving, by the computer-based system, a third order flow input including the currency pair and an adjusted quantity, and
responsive to the receiving the third order flow input, adjusting, by the computer-based system and in real-time, the dynamic margin position indicator to transition the second dynamic margin position to a third dynamic margin position, the third dynamic margin position displayed on the dynamic margin position indicator relative to the current position value and between the short direction maximum margin and the long direction maximum margin.

7. The method of claim 1, wherein the portfolio drawer is associated with a trading account.

8. The method of claim 1, further comprising:
scaling a new position bar to the background bar;
displaying the new position bar overlaid on the background bar based on the difference between the current position value and the new position value; and
dynamically altering a length of at least one of the new position bar or the current position bar based on the order data,
wherein the dynamic margin position indicator indicates the available margin that is assigned to the current position at least one of currently or will be after execution of the order data, and
wherein the dynamic margin position indicator indicates the available margin that is returned to an available balance after executing the order data reducing the current position; and
updating the display of the dynamic margin position indicator including at least one of the current position bar, the new position bar, the background bar or the arrow, in response to recalculating margin requirements or changing margin calculations.

9. The method of claim 1, wherein the real-time adjusting of the dynamic margin position indicator further comprises:
calculating a size of a background bar based on a corresponding maximum margin value in a long direction and a corresponding maximum margin value in a short direction;
displaying the background bar;
calculating a zero position based on the long direction and the short direction;
display a zero indicator at the zero position on the background bar;
scaling the background bar to indicate the maximum margin available to an account holder in the long direction and the maximum margin available to the account holder in the short direction;
displaying the current position bar based on the magnitude of the current position value relative to the corresponding maximum margin value;
overlaying the current position bar on the background bar;
receiving order data including a currency pair and a quantity;
calculating a new position value based on the current position value and the quantity;
displaying an arrow on the background bar indicating the new position value; and
pointing the arrow toward the long direction or the short direction based on on an order type of the order data and the quantity.

10. The method of claim 1, further comprising receiving, by the computer-based system, sign-in data associated with the trading account.

11. The method of claim 1, wherein the trading account includes the asset and the available margin, the asset including the current position value based on a current value of the asset and a current quantity of the asset.

12. The method of claim 1, wherein the dynamic margin position indicator visualization improves understanding of the effect of the execution of the first order flow input or the second order flow input on a digital currency exchange.

13. A computer-based system comprising:
one or more processors; and
one or more tangible, non-transitory memories configured to communicate with the one or more processors,
the one or more tangible, non-transitory memories having instructions stored thereon that, in response to execution by the one or more processors, cause the one or more processors to perform operations comprising:
receiving, by the one or more processors and through an authentication request, authentication data including an authentication token;
transmitting, by the one or more processors, a verification link for mobile device verification as part of a device verification process;
launching, by the one or more processors, a native application;
determining, by the one or more processors using the native application, a connected state based on the authentication data and the authentication token;
checking, by the one or more processors, for updates, in response to determining a connected state;
entering, by the one or more processors, a forced update state, in response to determining an available update and an update now action;
checking, by the one or more processors, for a server maintenance state;
entering, by the one or more processors, a server maintenance state, in response to determining active server maintenance;
determining, by the one or more processors, completed server maintenance;
checking, by the one or more processors, for sign-in process state based on the sign-in data, in response to the determining the completed server maintenance;
checking, by the one or more processors, for a signed-in state based on the sign-in data, in response to a sign in not being in process;
checking, by the one or more processors, for prior state data of the native application, in response to the signed-in state being true;
determining, by the one or more processors, whether the prior session is still live, in response to the prior state data existing;
opening, by the one or more processors, a prior state based on the prior state data, in response to the prior session being still live, to minimize network congestion;
displaying, by the one or more processors, a trading interface of the prior state comprising a portfolio drawer based on the authentication data,
wherein the portfolio drawer is displayed responsively to an interaction with each of a market view page, an accounts and settings page, and an instrument details page and comprises an instrument detail display and an account summary display;
receiving, by the one or more processors and through the trading interface, an instrument detail selection;
responsive to the receiving the instrument detail selection, generating, by the one or more processors, an advanced position interface to update the prior state;
receiving, by the one or more processors and through the advanced position interface, a first order flow input for an asset of a trading account, the first order flow input disposed in a data entry field on the advanced position interface, the first order flow input including a first quantity associated with a currency pair, the currency pair including the asset;
determining, by the one or more processors, a long direction maximum margin and a short direction maximum margin based on a current position value and an available margin;
calculating, by the one or more processors, a zero position margin based on the long direction maximum margin and the short direction maximum margin;
determining, by the one or more processors and through a dynamic margin position determination step, a first dynamic margin position associated with the trading account, wherein the dynamic margin position determination step comprises calculating the first dynamic margin position based on each of the current position value, the available margin of the trading account, and the first order flow input;
displaying, by the one or more processors and through the advanced position interface, a dynamic margin position indicator including the zero position margin, the long direction maximum margin, the short direction maximum margin, and the first dynamic margin position, wherein the dynamic margin position indicator is scaled based on the long direction maximum margin and the short direction maximum margin;
receiving, by the one or more processors and through the advanced position interface, a second order flow input including a second quantity associated with the currency pair, the second quantity different from the first quantity;
responsive to the receiving the second order flow input, repeating the dynamic margin position determination step with the second order flow input to generate a second dynamic margin position, the second dynamic margin position based on a second position value determined from the currency pair, the second quantity, and the current position value; and
adjusting, by the one or more processors and in real-time, the dynamic margin position indicator to transition the first dynamic margin position to the second dynamic margin position, the second dynamic margin position displayed on the dynamic margin position indicator relative to the current position value and between the short direction maximum margin and the long direction maximum margin, wherein the dynamic margin position indicator is dynamically displayed prior to the execution of the first order flow input or the second order flow input on a digital currency exchange, in response to a selection based on the dynamic margin position indicator, executing the second order flow input on the digital currency exchange.

14. An article of manufacture including one or more non-transitory, tangible computer readable storage mediums having instructions stored thereon that, in response to execution by a computer-based system, cause the computer-based system to perform operations comprising:

receiving, by the computer-based system and through an authentication request, authentication data including an authentication token;

transmitting, by the computer-based system, a verification link for mobile device verification as part of a device verification process;

launching, by the computer-based system, a native application;

determining, by the computer-based system using the native application, a connected state based on the authentication data and the authentication token;

checking, by the computer-based system, for updates, in response to determining a connected state;

entering, by the computer-based system, a forced update state, in response to determining an available update and an update now action;

checking, by the computer-based system, for a server maintenance state;

entering, by the computer-based system, a server maintenance state, in response to determining active server maintenance;

determining, by the computer-based system, completed server maintenance;

checking, by the computer-based system, for sign-in process state based on the sign-in data, in response to the determining the completed server maintenance;

checking, by the computer-based system, for a signed-in state based on the sign-in data, in response to a sign in not being in process;

checking, by the computer-based system, for prior state data of the native application, in response to the signed-in state being true;

determining, by the computer-based system, whether the prior session is still live, in response to the prior state data existing;

opening, by the computer-based system, a prior state based on the prior state data, in response to the prior session being still live, to minimize network congestion;

displaying, by the computer-based system, a trading interface of the prior state comprising a portfolio drawer based on the authentication data, wherein the portfolio drawer is displayed responsively to an interaction with each of a market view page, an accounts and settings page, and an instrument details page and comprises an instrument detail display and an account summary display;

receiving, by the computer-based system and through the trading interface, an instrument detail selection;

responsive to the receiving the instrument detail selection, generating, by the computer-based system, an advanced position interface to update the prior state;

receiving, by the computer-based system and through the advanced position interface, a first order flow input for an asset of a trading account, the first order flow input disposed in a data entry field on the advanced position interface, the first order flow input including a first quantity associated with a currency pair, the currency pair including the asset;

determining, by the computer-based system, a long direction maximum margin and a short direction maximum margin based on a current position value and an available margin;

calculating, by the computer-based system, a zero position margin based on the long direction maximum margin and the short direction maximum margin;

determining, by the computer-based system and through a dynamic margin position determination step, a first dynamic margin position associated with the trading account, wherein the dynamic margin position determination step comprises calculating the first dynamic margin position based on each of the current position value, the available margin of the trading account, and the first order flow input;

displaying, by the computer-based system and through the advanced position interface, a dynamic margin position indicator including the zero position margin, the long direction maximum margin, the short direction maximum margin, and the first dynamic margin position, wherein the dynamic margin position indicator is scaled based on the long direction maximum margin and the short direction maximum margin;

receiving, by the computer-based system and through the advanced position interface, a second order flow input including a second quantity associated with the currency pair, the second quantity different from the first quantity;

responsive to the receiving the second order flow input, repeating the dynamic margin position determination step with the second order flow input to generate a second dynamic margin position, the second dynamic margin position based on a second position value determined from the currency pair, the second quantity, and the current position value; and adjusting, by the computer-based system and in real-time, the dynamic margin position indicator to transition the first dynamic margin position to the second dynamic margin position, the second dynamic margin position displayed on the dynamic margin position indicator relative to the current position value and between the short direction maximum margin and the long direction maximum margin, wherein the dynamic margin position indicator is dynamically displayed prior to the execution of the first order flow input or the second order flow input on a digital currency exchange, in response to a selection based on the dynamic margin position indicator, executing the second order flow input on the digital currency exchange.

* * * * *